(12) United States Patent
Suzuki et al.

(10) Patent No.: US 6,727,669 B2
(45) Date of Patent: Apr. 27, 2004

(54) MOTOR-DRIVEN POWER STEERING APPARATUS

(75) Inventors: Hiroshi Suzuki, Kariya (JP); Atsuo Sakai, Kariya (JP); Kazuhiko Ito, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/244,557

(22) Filed: Sep. 17, 2002

(65) Prior Publication Data

US 2003/0071587 A1 Apr. 17, 2003

(30) Foreign Application Priority Data

Sep. 18, 2001 (JP) ........................................ 2001-283396

(51) Int. Cl.[7] ................................................ H02P 1/00
(52) U.S. Cl. ........................ 318/139; 318/594; 180/446
(58) Field of Search ................................. 318/139, 254, 318/439, 138, 599, 812, 811; 180/446

(56) References Cited

U.S. PATENT DOCUMENTS 6,427,104 B1 * 7/2002 Matsushita et al. ............ 701/41
6,431,307 B2 * 8/2002 Yoshida ....................... 180/446

* cited by examiner

Primary Examiner—Karen Masih
(74) Attorney, Agent, or Firm—Oblon, Spivak, McClelland, Maier & Neustadt, P.C.

(57) ABSTRACT

A motor-driven power steering apparatus includes a motor for generating assisting force to be imparted to a steering mechanism, a control signal generation section for generating a motor control signal on the basis of at least steering torque applied to a steering wheel, a motor drive unit for driving the motor in accordance with the motor control signal, and a step-up circuit provided between a battery to the motor drive unit. The step-up circuit includes a step-up coil whose one end is connected to the battery, a first switching element connected between the other end of the step-up coil and the ground, a second switching element connected between the other end of the step-up coil and an output terminal, and a capacitor connected between the output terminal and the ground and smoothing output voltage appearing at the output terminal. The apparatus further includes a step-up circuit control unit which detects the output voltage and controls the first and second switching elements on the basis of difference between a target output voltage and the detected output voltage. During power generation periods, at least the first switching element is turned on and off in order to increase the output voltage supplied to the motor through step-up operation. During regeneration periods, at least the second switching element is turned on and off.

27 Claims, 52 Drawing Sheets

20: MOTOR-DRIVEN POWER STEERING CONTROLLER
(STEP-UP CIRCUIT CONTROLLER)

POWER GENERATION

REGENERATION

POWER GENERATION

HEAVY LOAD

LIGHT LOAD

20: MOTOR-DRIVEN POWER STEERING CONTROLLER
(STEP-UP CIRCUIT CONTROLLER)

S30: CONTINUE ORDINARY STEP-UP CONTROL AND ASSIST CONTROL

S100: TURN WARNING LAMP ON

S90: STOP SUPPLY OF ELECTRICAL POWER TO STEP-UP CIRCUIT AND MOTOR (MANUAL STEERING)

20: MOTOR-DRIVEN POWER STEERING CONTROLLER
(STEP-UP CIRCUIT CONTROLLER)

180: CURRENT DETECTOR

S240, S290: TURN WARNING LAMP ON

S250, S300:
 STOP SUPPLY OF ELECTRICAL POWER
 TO STEP-UP CIRCUIT AND MOTOR
 (MANUAL STEERING)

S320: STEP-UP CONTROL AND ASSIST CONTROL

20: MOTOR-DRIVEN POWER STEERING CONTROLLER
(STEP-UP CIRCUIT CONTROLLER)

20: MOTOR-DRIVEN POWER STEERING CONTROLLER
(STEP-UP CIRCUIT CONTROLLER)

MOTOR-DRIVEN POWER STEERING APPARATUS

BACKGROUND OF THE INVENTION

1. Field of the Invention

The present invention relates to a motor-driven power steering apparatus for imparting assist force to a steering system of an automobile or other vehicle by use of a motor, and more particularly to a motor-driven power steering apparatus having a step-up circuit capable of regulating current supplied from an on-vehicle battery to the motor.

2. Description of the Related Art

Conventionally, there has been used a motor-driven power steering apparatus which assists operation of a steering wheel through utilization of rotational force of a motor. In such a motor-driven power steering apparatus, when a driver rotates the steering wheel to steer the vehicle, the motor imparts to a steering mechanism a steering assist force corresponding to a steering torque that the driver applies to the steering wheel.

Incidentally, the above-described motor-driven power steering apparatus is a system that requires large current in order to produce large torque.

Conventionally, since voltage output from an on-vehicle battery (DC 12 V) is applied directly to a motor-driven power steering apparatus, a motor designed to operate at DC 12V is used therein, with the result that large current is supplied to the motor. Therefore, the size of the motor unavoidably increases, and the capacity (thickness) of wiring lines to be used unavoidably increases.

In order to solve the above problem, there has been proposed a motor-driven power steering apparatus capable of regulating current supplied from an on-vehicle battery to a motor (Japanese Patent Application Laid-Open No. 8-127350).

In the motor-driven power steering apparatus, as shown in FIG. 51, a step-up circuit 300 and a step-up circuit controller 301 are provided in a circuit for supplying current to the motor. The step-up circuit 300 is provided between a point P1 to which battery voltage $V_{PIG}$ (DC 12V) is applied from an on-vehicle battery and a point P2 from which voltage is applied to the motor. The step-up circuit 300 includes capacitors C1 and C2, a coil L, a diode D, and a switching transistor Q1.

The step-up circuit controller 301 outputs a duty-ratio drive signal to the transistor Q1 of the step-up circuit 300 in order to control the transistor Q1 according to the duty-ratio drive signal (duty control). By virtue of this duty control, the transistor Q1 performs switching operation as shown in FIG. 52. As a result, accumulation of energy in the coil L and discharge of energy from the coil L are repeated, and high voltage generated by virtue of discharge appears on the cathode side of the diode D. Note that, in FIG. 52, Tα represents an ON period; T represents a pulse cycle; and α represents a duty ratio (on duty). These definitions will be used throughout the present specification. When the transistor Q1 is turned on, current flows through the coil L, and when the transistor Q1 is turned off, the current flowing through the coil L is cut off.

When the current flowing through the coil L is cut off, high voltage is generated on the cathode side of the diode D so as to prevent magnetic flux from changing in response to cut off of the current. Through iteration of this operation, high voltage is generated repeatedly on the cathode side of the diode D. The high voltage is smoothed by means of the capacitor C2 and is fed to the point P2 as output voltage $V_{BPIG}$.

The voltage obtained through step-up effected by the step-up circuit 300 relates to the duty ratio of the duty-ratio drive signal output from the step-up circuit controller 301. When the duty ratio increases, the output voltage $V_{BPIG}$ increases; and when the duty ratio decreases, the output voltage $V_{BPIG}$ decreases.

However, since the conventional step-up circuit 300 uses the diode D as described above, a problem arises when the motor enters a regeneration state. That is, even when the motor enters a regeneration state, current cannot flow from the voltage application point P2 toward the battery B, due to presence of the diode D, so that the output voltage $V_{BPIG}$ increases. Due to this increased voltage, the step-up circuit 300 may be broken. In the example shown in FIG. 51, the capacitor C2 and the diode D, which constitute the step-up circuit 300, may be broken.

SUMMARY OF THE INVENTION

In view of the foregoing, an object of the present invention is to provide a motor-driven power steering apparatus in which a step-up circuit is not broken even when a motor enters a regeneration state.

In order to achieve the above object, the present invention provides a motor-driven power steering apparatus for a vehicle, comprising: a steering mechanism for steering the vehicle in accordance with operation of a steering wheel; a motor mechanically coupled to the steering mechanism and generating assisting force to be imparted to the steering mechanism; control signal generation means for generating a motor control signal on the basis of at least steering torque applied to the steering wheel; motor drive means for driving the motor in accordance with the motor control signal; a step-up circuit provided in a current supply circuit extending from a battery to the motor drive means, the step-up circuit including a step-up coil whose one end is connected to the battery for reception of battery voltage, a first switching element connected between the other end of the step-up coil and the ground, a second switching element connected between the other end of the step-up coil and an output terminal, and a capacitor connected between the output terminal and the ground and smoothing output voltage which is produced by means of the step-up coil and appears at the output terminal; and step-up circuit control means for detecting the output voltage and controlling the first and second switching elements on the basis of difference between a target output voltage and the detected output voltage in such a manner that during power generation periods, at least the first switching element is turned on and off in order to increase the output voltage supplied to the motor through step-up operation, and during regeneration periods, at least the second switching element is turned on and off.

In the motor-driven power steering apparatus having the above-described configuration, the step-up circuit does not break even when the motor enters a regeneration state.

Preferably, the first and second switching elements are each constituted by a field effect transistor. In this case, the reliability and efficiency of the motor-driven power steering apparatus can be improved.

Preferably, the step-up circuit control means turns the first and second switching elements on and off alternately on the basis of the difference between the target output voltage and the detected output voltage in such a manner that during power generation periods, the output voltage supplied to the motor is increased through step-up operation, and during regeneration periods, regenerative current output from the motor flows to the battery.

In this case, the output voltage supplied to the motor can be increased through step-up operation during power generation periods, and regenerative current output from the motor can flow to the battery during regeneration periods.

Preferably, the motor-driven power steering apparatus further comprises steering state judgment means for determining, on the basis of the difference between the target output voltage and the detected output voltage, whether the motor is in a power generation state or in a regeneration state, wherein the step-up circuit control means turns at least one of the first and second switching elements on and off on the basis of the state of the motor determined by the steering state judgment means.

This configuration prevents the output voltage from increasing during regeneration periods.

The step-up circuit control means may turn only the first switching element on and off when the steering state judgment means determines that the motor is in a power generation state, and turn the first and second switching elements on and off alternately when the steering state judgment means determines that the motor is in a regeneration state.

In this case, since the first switching element is turned on and off during power generation periods, heat generation and loss during power generation periods can be reduced as compared with heat generation and loss in a diode used in conventional apparatuses.

Alternatively, the step-up circuit control means may turn only the first switching element on and off when the steering state judgment means determines that the motor is in a power generation state, and turn only the second switching element on and off when the steering state judgment means determines that the motor is in a regeneration state.

In this case as well, heat generation and loss during power generation periods can be reduced as compared with that of a diode used in conventional apparatuses. Further, since the second switching element is turned on and off during regeneration periods, heat (loss) produced by current which flows through the second switching element in on periods can be reduced, whereby efficiency can be increased.

Alternatively, the step-up circuit control means may turn the first and second switching elements on and off alternately when the steering state judgment means determines that the motor is in a power generation state, and turn only the second switching element on and off when the steering state judgment means determines that the motor is in a regeneration state.

In this case, during power generation periods, the second switching element is turned on for step-up operation in order to reduce the quantity of heat (loss) generated by current which flows through the second switching element in on periods, as compared with that generated by current flowing through the parasitic diode of the second switching element. Thus, efficiency during step-up operation (power generation periods) can be increased. Further, since the second switching element is turned on and off during regeneration periods, heat (loss) produced by current which flows through the second switching element in on periods can be reduced, whereby efficiency can be increased.

Preferably, a bootstrap circuit including a bootstrap capacitor is connected to a line extending between the battery and the drain of the first switching element, the bootstrap circuit being connected to a gate of the second switching element as a drive power source for the second switching element in order to apply electrical potential of the bootstrap capacitor to the gate of the second switching element, and the step-up circuit control means operates as follows. When the steering state judgment means determines that the motor is in a power generation state, the step-up circuit control means turns the first and second switching elements on and off alternately. When the steering state judgment means determines that the motor is in a regeneration state, the step-up circuit control means turns the second switching element on and off and turns the first switching element on and off at a duty ratio in alternating periods of constant intervals.

In this case, the capacitor of the bootstrap circuit can be charged through the on-off operation of the first switching element during regeneration periods, whereby the second switching element can be turned on reliably during regeneration periods. Thus, it becomes possible to absorb regenerative current by the battery.

Preferably, a bootstrap circuit including a bootstrap capacitor may be connected to a line extending between the battery and the drain of the first switching element, the bootstrap circuit being connected to a gate of the second switching element as a drive power source for the second switching element in order to apply electrical potential of the bootstrap capacitor to the gate of the second switching element, and the step-up circuit control means operates as follows. When the steering state judgment means determines that the motor is in a power generation state, the step-up circuit control means turns the first and second switching elements on and off alternately. When the steering state judgment means determines that the motor is in a regeneration state, the step-up circuit control means performs PWM control in order to turn only the second switching element on and off at a duty ratio, and restricts the duty ratio so as not to exceed a predetermined duty ratio.

In this case, during regeneration periods, the second switching element can be turned off without fail, so that, during such an off period, the electromagnetic energy accumulated in the coil can be absorbed by the battery. Further, at that time, the parasitic diode of the first switching element enters an on state, and the potential at the connection point between the bootstrap capacitor and the parasitic diode assumes the ground level, so that the bootstrap capacitor can be charged, and thus the second switching element can be driven.

Preferably, the motor-driven power steering apparatus further comprises load state judgment means for determining a load status of the motor, wherein the step-up circuit control means turns at least one of the first and second switching elements on and off on the basis of the steering state as detected by the steering state judgment means and the load state of the motor as determined by the load state judgment means.

In this case, since at least one of the first and second switching elements can be turned on and off on the basis of the steering state and the load state of the motor, proper control can be performed on the basis of the steering state and the load state.

Preferably, the step-up circuit control means operates as follows. When the steering state judgment means determines that the motor is in a power generation state, the step-up circuit control means turns only the first switching element on and off and maintains the second switching element off continuously if the load state judgment means determines that the motor is in a light load state, and turns the first and second switching elements on and off alternately if the load state judgment means determines that the motor is in a heavy load state. When the steering state judgment means determines that the motor is in a regeneration state, the step-up circuit control means turns only the second switching element on and off.

Preferably, a bootstrap circuit including a bootstrap capacitor is connected to a line extending between the battery and the drain of the first switching element, the bootstrap circuit being connected a gate of the second switching element as a drive power source for the second switching element in order to apply electrical potential of the bootstrap capacitor to the gate of the second switching element, and the step-up circuit control means operates as follows. When the steering state judgment means determines that the motor is in a power generation state, the step-up circuit control means turns only the first switching element on and off and maintains the second switching element off continuously if the load state judgment means determines that the motor is in a light load state, and turns the first and second switching elements on and off alternately if the load state judgment means determines that the motor is in a heavy load state. When the steering state judgment means determines that the motor is in a regeneration state, the step-up circuit control means turns the second switching element on and off and turns the first switching element on and off at a fixed duty ratio in alternating periods of constant intervals.

Alternatively, the step-up circuit control means operates as follows. When the steering state judgment means determines that the motor is in a power generation state, the step-up circuit control means turns only the first switching element on and off and maintains the second switching element off continuously if the load state judgment means determines that the motor is in a light load state, and turns the first and second switching elements on and off alternately if the load state judgment means determines that the motor is in a heavy load state. When the steering state judgment means determines that the motor is in a regeneration state, the step-up circuit control means performs PWM control in order to turn only the second switching element on and off at a duty ratio and restricts the duty ratio so as not to exceed a predetermined duty ratio.

In these cases, when the motor is in a light load state, only the first switching element is turned on and off, and the second switching element is maintained off continuously, so that the heat generation and switching loss of the second switching element are reduced to zero, whereby efficiency can be improved.

Alternatively, a bootstrap circuit including a bootstrap capacitor is connected to the drain of the second switching element, the bootstrap circuit being connected a gate of the second switching element as a drive power source for the second switching element in order to apply electrical potential of the bootstrap capacitor to the gate of the second switching element, and the step-up circuit control means operates as follows. When the steering state judgment means determines that the motor is in a power generation state, the step-up circuit control means turns the first and second switching elements on and off alternately. When the steering state judgment means determines that the motor is in a regeneration state, the step-up circuit control means turns only the second switching element on and off.

In this case, during regenerative periods, the drain potential of the second switching element increases due to regenerative power even in a state in which the second switching element is maintained off continuously, so that the gate potential of the second switching element can be made higher than the source potential thereof. Therefore, the second switching element can be turned on in order to allow the battery to absorb regenerative current.

Preferably, the step-up circuit control means includes target output voltage setting means for setting a target output voltage of the step-up circuit; control computation means for performing at least computation for proportional control on the basis of the difference between the target output voltage and the detected output voltage and for outputting a computed value; and PWM computation means for performing PWM computation on the basis of the computed value so as to determine a duty ratio, wherein the first and second switching elements are turned on and off in accordance with the determined duty ratio; and the target output voltage setting means changes the target output voltage in accordance with an operation state parameter indicative of an operation state of the vehicle or the motor.

In this case, since the target output voltage setting means changes the target output voltage in accordance with the operation state parameter indicative of an operation state of the vehicle or the motor, the first and second switching elements can be turned on and off in accordance with the operation state.

Preferably, the step-up circuit control means includes target output voltage setting means for setting a target output voltage of the step-up circuit; control computation means for performing at least computation for proportional control on the basis of the difference between the target output voltage and the detected output voltage and for outputting a computed value; and PWM computation means for performing PWM computation on the basis of the computed value so as to determine a duty ratio, wherein the first and second switching elements are turned on and off in accordance with the determined duty ratio; and the step-up circuit control means restricts the duty ratio so as not to exceed a predetermined duty ratio.

In this case, since duty ratio restriction is provided, breakage of the step-up circuit can be prevented in both power generation and regeneration periods.

Preferably, the motor-driven power steering apparatus further comprises status parameter detection means for detecting a parameter indicative of states of the step-up circuit; and judgment means for comparing the parameter detected by the status parameter detection means with a judgment value and judging whether or not the step-up circuit is normal, wherein the step-up circuit control means stops step-up control for the step-up circuit when the judgment means judges that the step-up circuit is not normal.

In this case, when the step-up circuit suffers a failure, the step-up control for the step-up circuit can be stopped, whereby breakage of the step-up circuit in an anomalous state can be prevented.

Preferably, the motor-driven power steering apparatus further comprises first open-close means connected to a battery-voltage supply section of the step-up circuit and turned on and off by the step-up circuit control means; and second open-close means for controlling supply of electrical power to the motor, wherein when the judgment means judges that the step-up circuit suffers a failure, the step-up circuit control means turns the first and second open-close means off.

In this case, when the step-up circuit suffers a failure, the motor-driven power steering apparatus can be switched to a manual steering mode. In addition, since no regenerative current flows into the step-up circuit even when the motor enters a regeneration state, breakage of circuit elements of the step-up circuit can be prevented.

Preferably, when the judgment means judges that the step-up circuit suffers a failure, the step-up circuit control means maintains the first switching element off continuously and maintains the second switching element on continuously.

In this case, when the step-up circuit suffers a failure, assist control at the battery voltage can be continued. In addition, during regeneration periods, regenerative current can be absorbed by the battery.

Preferably, the motor-driven power steering apparatus further comprises first open-close means connected to a battery-voltage supply section of the step-up circuit and turned on and off by the step-up circuit control means; and a circuit which includes a first resistor connected to a connection point between the drain of the first switching element and the battery-voltage supply section and which receives an ignition voltage when an ignition switch is turned on. The step-up circuit control means includes first element control means, operated when the ignition switch is turned on, for turning at least the first switching element on or off before the first open-close means is turned on; drain voltage detection means for detecting drain voltage of the first or second switching element; and first failure judgment means for comparing the drain voltage with a first failure judgment value and determining whether the step-up circuit suffers a failure.

In this case, the judgment as to whether the step-up circuit suffers a failure can be performed in an initial check stage after the ignition switch is turned on.

Preferably, the motor-driven power steering apparatus further comprises second open-close means for controlling supply of electrical power to the motor, wherein when the first failure judgment means judges that the step-up circuit suffers a failure, the step-up circuit control means turns the first and second open-close means off.

In this case, when the step-up circuit is judged to suffer a failure in an initial check stage after the ignition switch is turned on, the failsafe mechanism operates.

Preferably, the motor-driven power steering apparatus further comprises second open-close means for controlling supply of electrical power to the motor, wherein when the first failure judgment means judges that the step-up circuit suffers a failure, the step-up circuit control means turns the first and second open-close means on, maintains the first switching element off continuously, and maintains the second switching element on continuously.

In this case, even when the step-up circuit is judged to suffer a failure in an initial check stage after the ignition switch is turned on, assist control at the battery voltage can be performed, although assist control at boosted voltage produced by means of the step-up circuit cannot be performed. In addition, regenerative current can be absorbed by the battery during regeneration periods.

Preferably, the motor-driven power steering apparatus further comprises first open-close means connected to a battery-voltage supply section of the step-up circuit and turned on and off by the step-up circuit control means; and a circuit which includes a second resistor connected to the drain of the second switching element and which receives an ignition voltage when an ignition switch is turned on. The step-up circuit control means includes second element control means, operated when the ignition switch is turned on, for turning the first and second switching elements on simultaneously, turning the first and second switching elements off simultaneously, or turning the first switching element off and the second switching element on, before the first open-close means is turned on; drain voltage detection means for detecting drain voltage of at least the first switching element; and second failure judgment means for comparing the drain voltage with a second failure judgment value and determining whether the step-up circuit suffers a failure.

In this case, the judgment as to whether the step-up circuit suffers a failure can be performed in an initial check stage after the ignition switch is turned on.

Preferably, the motor-driven power steering apparatus further comprises second open-close means for controlling supply of electrical power to the motor, wherein when the second failure judgment means judges that the step-up circuit suffers a failure, the step-up circuit control means turns the first and second open-close means off.

In this case, when the step-up circuit is judged to suffer a failure in an initial check stage after the ignition switch is turned on, the failsafe mechanism operates.

Preferably, the motor-driven power steering apparatus further comprises second open-close means for controlling supply of electrical power to the motor, wherein when the second failure judgment means judges that the step-up circuit suffers a failure, the step-up circuit control means turns the first and second open-close means on, maintains the first switching element off continuously, and maintains the second switching element on continuously.

In this case, even when the step-up circuit is judged to suffer a failure in an initial check stage after the ignition switch is turned on, assist control at the battery voltage can be performed, although assist control at boosted voltage produced by means of the step-up circuit cannot be performed. In addition, regenerative current can be absorbed by the battery during regeneration periods.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 16 is a diagram showing an equivalent circuit of the step-up circuit in mode I with the second transistor being on;

DESCRIPTION OF THE PREFERRED EMBODIMENTS

1. First Embodiment

<Structure>

A motor-driven power steering apparatus according to a first embodiment of the present invention will now be described with reference to FIGS. 1 to 6.

Figure 1:
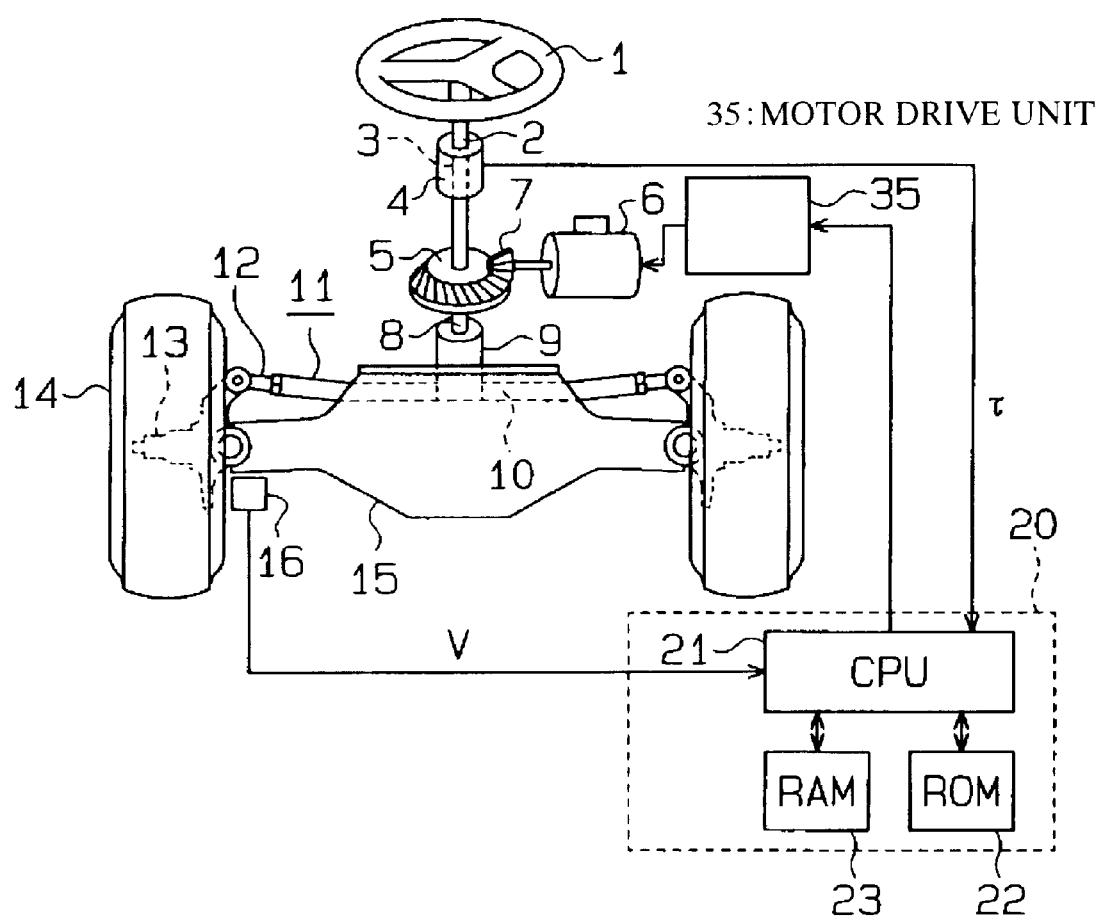
FIG. 1 is a schematic diagram of a motor-driven power steering apparatus according to a first embodiment of the present invention.

FIG. 1 schematically shows a controller of the motor-driven power steering apparatus.

A torsion bar 3 is provided in a steering shaft 2, to which a steering wheel 1 is connected. A torque sensor 4 is attached to the torsion bar 3. When a force is applied to the torsion bar 3 upon rotation of the steering shaft 2, the torsion bar 3 twists according to the applied force. The torque sensor 4 detects the amount of twist; i.e., steering torque τ applied to the steering wheel 1.

The torque sensor 4 constitutes steering torque detection means.

Further, a speed reducer 5 is fixed to the steering shaft 2. A gear 7 attached to an output shaft of an electric motor (hereinafter referred to as a "motor") 6 is in meshing engagement with the speed reducer 5. The motor 6 is a three-phase synchronous permanent magnet motor of brushless type.

Figure 2:
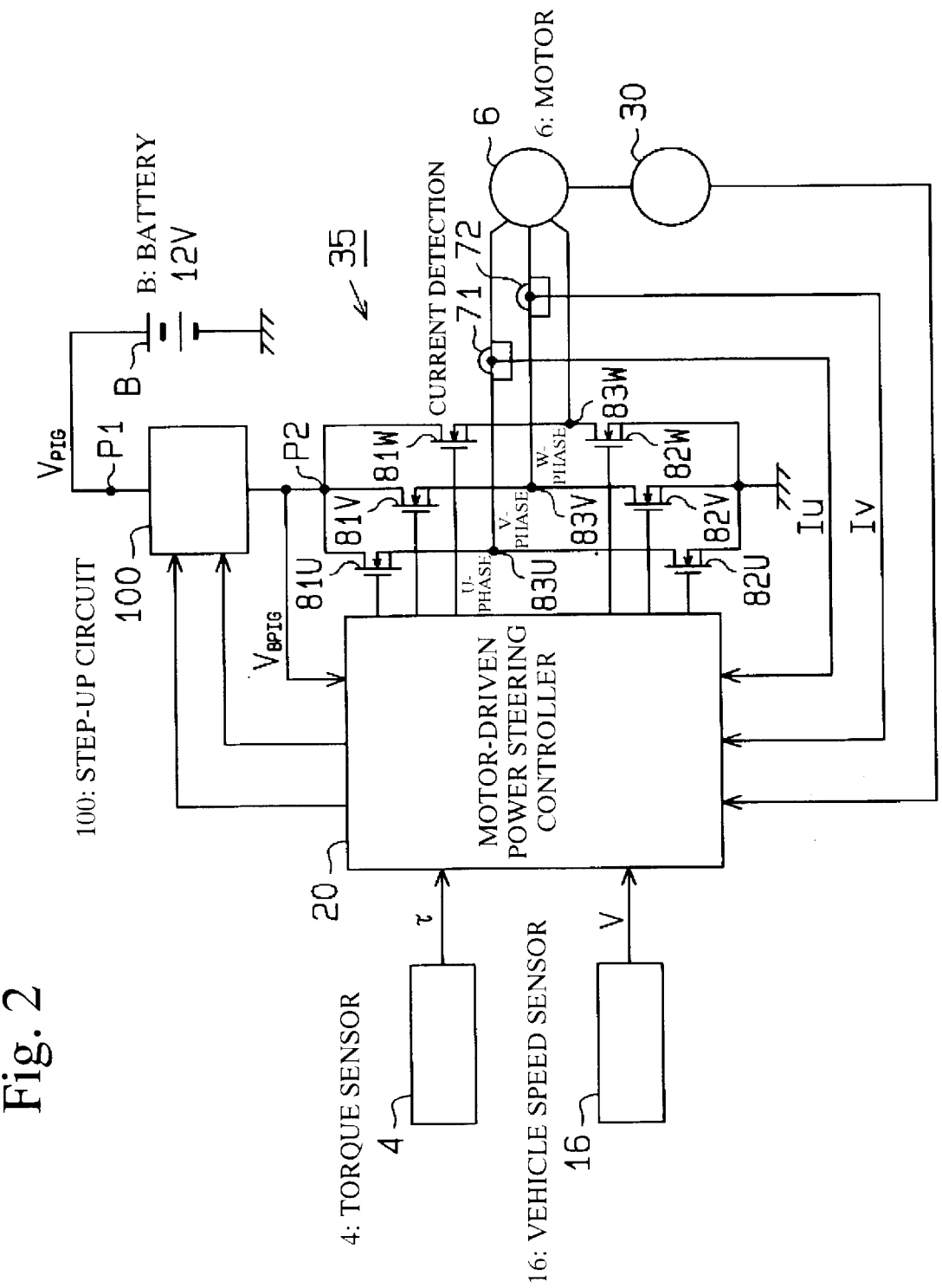
FIG. 2 is a control block diagram of the motor-driven power steering apparatus of FIG. 1.

A rotational angle sensor 30 constituted by an encoder is built in the motor 6 in order to detect the rotational angle of the output shaft of the motor 6 (see FIG. 2). In accordance with rotation of the rotor of the motor 6, the rotational angle sensor 30 outputs two-phase pulse train signals which has a phase difference of $\pi/2$ therebetween, as well as a zero-phase pulse train signal that represents a reference rotational position.

A pinion shaft 8 is fixed to the speed reducer 5. A pinion 9 is fixed to a lower end of the pinion shaft 8 and is in meshing engagement with a rack 10. The pinion 9 and the rack 10 constitute a rack-and-pinion mechanism 11. Tie rods 12 are fixed to the opposite ends of the rack 10; and knuckle arms 13 are pivotably connected to the tip end portions of the tie rods 12. Front wheels (tires) 14 are rotatably attached to the knuckle arms 13. The knuckle arms 13 are pivotably connected to a cross member 15 as well.

Accordingly, when the output shaft of the motor 6 rotates, its rotation is transmitted to the pinion shaft 8 via the speed reducer 5. The rotation transmitted to the pinion shaft 8 is further transmitted to the rack 10 via the pinion 9. The rack 10 changes, via the tie rods 12, the direction of the front wheels 14 attached to the knuckle arms 13, to thereby change the traveling direction of the vehicle.

A vehicle speed sensor 16 is provided and is mechanically coupled to one of the front wheels 14.

Next, an electrical configuration of the motor-driven power steering apparatus will be described.

The torque sensor 4 outputs voltage corresponding to the steering torque $\tau$ applied to the steering wheel 1. The vehicle speed sensor 16 outputs a pulse signal representing present vehicle speed; i.e., pulses whose period changes in accordance with the rotational speed of the front wheels 14.

A motor-driven power steering controller (hereinafter referred to as a "controller") 20 includes a central processing unit (CPU) 21, read-only memory (ROM) 22, and random access memory (RAM) 23 for temporary storage of data. The ROM 22 stores a control program which causes the CPU 21 to perform computation processing. The RAM 23 temporarily stores various data, such as results of computation processing performed by the CPU 21.

The ROM 22 stores an unillustrated basic assist map. The basic assist map is used to obtain basic assist current corresponding to steering torque $\tau$ (rotational torque) and vehicle speed. The basic assist map includes values of basic assist current corresponding to different values of steering torque $\tau$.

Since the function of the controller 20 for driving and controlling the three-phase synchronous permanent magnet motor is well known, the function will be described only briefly.

Note that the controller 20 serves as control signal generation means.

Figure 3:
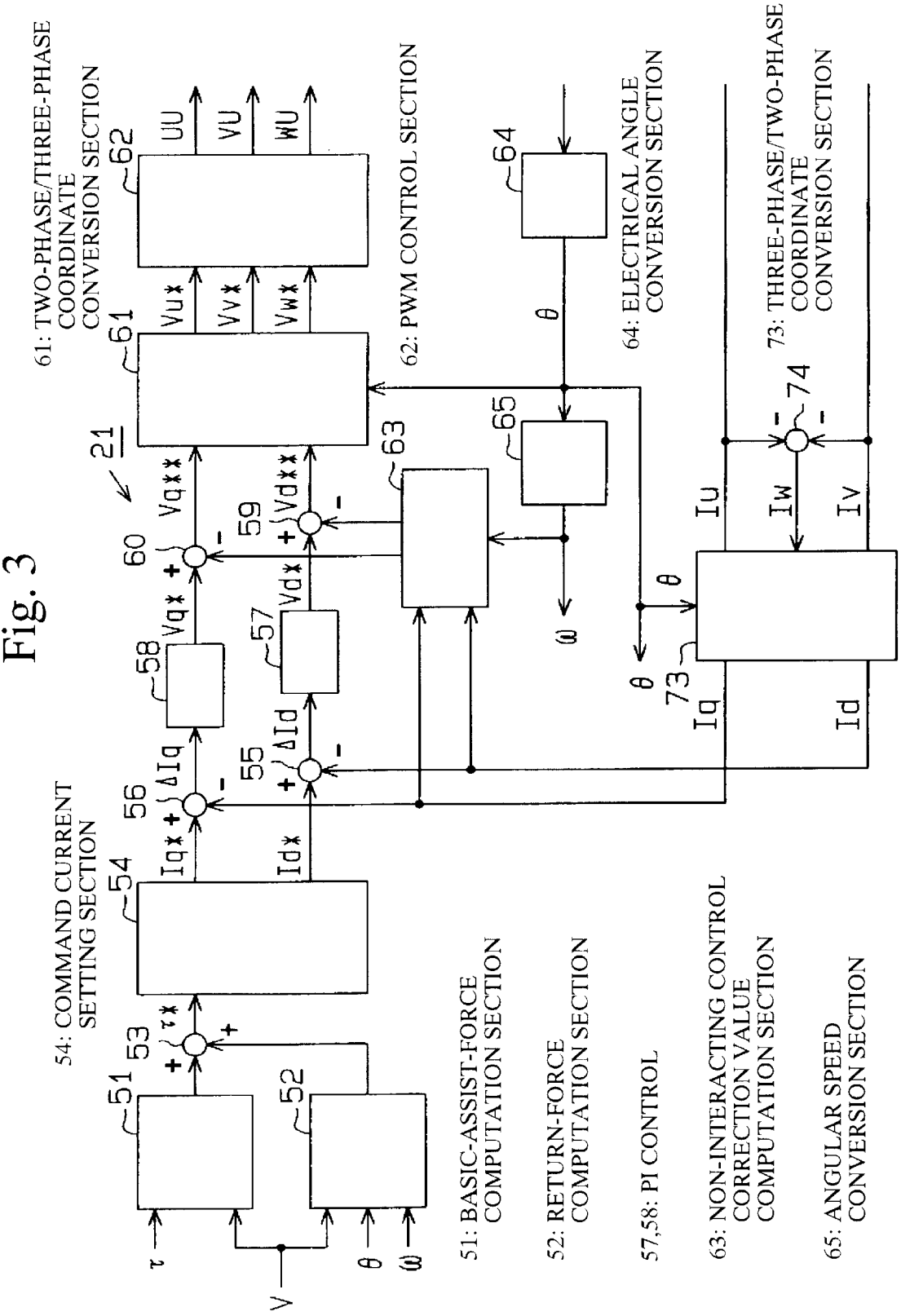
FIG. 3 is a control block diagram of the CPU shown in FIG. 1.
Figure 4:
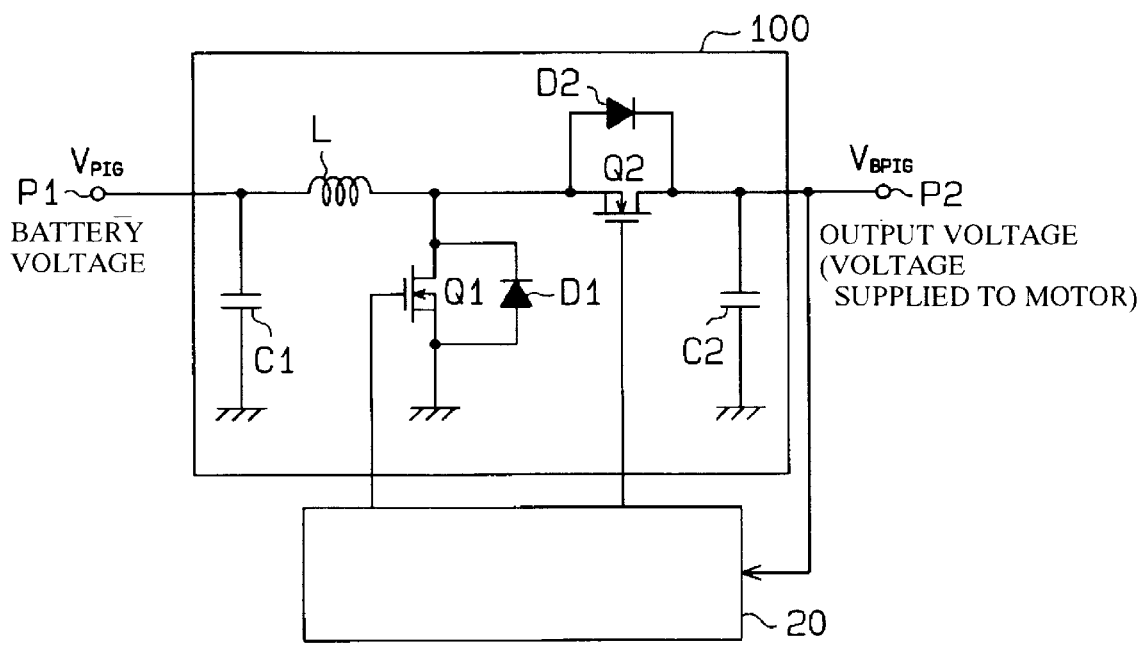
FIG. 4 is a circuit diagram of the step-up circuit shown in FIG. 2.

FIG. 3 is a block diagram showing functions realized through execution of a program in the CPU 21. The respective blocks shown in FIG. 3 do not represent independent hardware units but represent functions realized by means of the CPU 21.

The controller 20 includes a basic-assist-force computation section 51 for calculating command torque $\tau^*$, a return-force computation section 52, and an adding section 53. The basic-assist-force computation section 51 receives the steering torque $\tau$ detected by the torque sensor 4 and the vehicle speed V detected by the vehicle speed sensor 16, and calculates assist torque, which increases as the steering toque $\tau$ increases and decreases as the vehicle speed V increases.

The return-force computation section 52 receives electrical angle $\theta$ (corresponding to rotational angle) and angular velocity $\omega$ of the rotor of the motor 6, as well as the vehicle speed V, and, on the basis of these input values, calculates return torque which corresponds to force for resisting rotation of the steering shaft 2 and force for returning the steering shaft 2 to a home position. The adding section 53 adds the assist torque and the return torque together to thereby obtain command torque $\tau^*$ and outputs the same to a command current setting section 54.

On the basis of the command torque $\tau^*$, the command current setting section 54 calculates two-phase command currents Id* and Iq*. These command currents Id* and Iq* correspond to d and q axes, respectively, of a rotating coordinate system which is synchronous with rotating magnetic flux produced by means of permanent magnets on the rotor of the motor 6. In the rotating coordinate system, the d axis corresponds to the position of the permanent magnets, and the q axis perpendicularly intersects the d axis. The command currents Id* and Iq* are called d-axis command current and q-axis command current, respectively.

The d-axis command current Id* and the q-axis command current Iq* are supplied to subtractors 55 and 56, respectively. The subtractor 55 calculates difference ΔId between the d-axis command current Id* and d-axis detected current Id. Similarly, the subtractor 56 calculates difference ΔIq between the q-axis command current Iq* and q-axis detected current Iq. The subtractors 55 and 56 supply the differences ΔId and ΔIq to PI control sections (proportional-plus-integral control sections) 57 and 58, respectively. The q-axis command current Iq* corresponds to a motor control signal.

On the basis of the differences ΔId and ΔIq, the PI control sections 57 and 58 calculate d-axis command voltage Vd* and q-axis command voltage Vq*, respectively, in such a manner that the d-axis and q-axis detected currents Id and Iq follow the d-axis and q-axis command currents Id* and Iq*, respectively.

The d-axis and q-axis command voltages Vd* and Vq* are subjected to correction performed by means of a non-interacting control correction value computation section 63 and subtractors 59 and 60, whereby d-axis and q-axis corrected command voltages Vd and Vq are supplied to a two-phase/three-phase coordinate conversion section 61.

On the basis of the d-axis and q-axis detected currents Id and Iq and the angular velocity $\omega$ of the rotor of the motor 6, the non-interacting control correction value computation section 63 calculates non-interacting control correction values $\omega \cdot La \cdot Iq$ and $-\omega \cdot (\phi a + La \cdot Id)$ for the d-axis and q-axis command voltages Vd* and Vq*, respectively. Note that La (inductance) and $\phi a$ (magnetic flux) are predetermined constants.

The subtractors 59 and 60 subtract the corresponding non-interacting control correction values from the d-axis and q-axis command voltages Vd* and Vq* to thereby obtain the d-axis and q-axis corrected command voltages Vd and Vq, and outputs them to the two-phase/three-phase coordinate conversion section 61. The two-phase/three-phase coordinate conversion section 61 converts the d-axis and q-axis corrected command voltages Vd and Vq to three-phase command voltages Vu*, Vv*, and Vw* and outputs them to a PWM control section 62.

The PWM control section 62 converts the three-phase command voltages Vu*, Vv*, and Vw* to PWM control signals UU, VU, and WU (each including a PWM wave signal and a signal representing the direction of rotation of the motor 6), which correspond to the three-phase command voltages Vu*, Vv*, and Vw*, respectively, and outputs them to a motor drive unit (inverter circuit) 35.

As shown in FIG. 2, the motor drive unit 35 is constituted by parallel connection of a series circuit containing FETs 81U and 82U, a series circuit containing FETS 81V and 82V, and a series circuit containing FETs 81W and 82W. Step-up voltage which is higher than voltage of a battery mounted on the vehicle is applied to each series circuit. A connection point 83U between the FETS 81U and 82U is connected to the U-phase winding of the motor 6; a connection point 83V between the FETs 81V and 82V is connected to the V-phase winding of the motor 6; and a connection point 83W between the FETs 81w and 82W is connected to the W-phase winding of the motor 6.

PWM control signals UU, VU, and WU (each including a PWM wave signal and a signal representing the direction of rotation of the motor 6) are fed from the PWM control section 62 to the FETs 81U and 82U, the FETs 81V and 82V, and the FETs 81W and 82W, respectively.

The motor drive circuit 35 generates three-phase excitation currents corresponding to the PWM control signals UU, VU, and WU, and supplies them to the motor 6 via respective three-phase excitation current paths. The motor drive circuit 35 serves as motor drive means.

Currents sensors 71 and 72 are provided in two of the three-phase excitation current paths. The currents sensors 71 and 72 detects two excitation currents Iu and Iv, among three-phase excitation currents Iu, Iv, and Iw supplied to the motor 6, and output to a three-phase/two-phase coordinate conversion section 73 shown in FIG. 3 detection signals which represent the detected excitation currents Iu and Iv.

A computation unit 74 calculates excitation current Iw on the basis of the detected excitation currents Iu and Iv and outputs a signal representing the calculated excitation current Iw to the three-phase/two-phase coordinate conversion section 73. The three-phase/two-phase coordinate conversion section 73 converts the three-phase detected excitation currents Iu, Iv, and Iw to two-phase (d-axis and q-axis) detected currents Id and Iq and outputs them to the subtractors 55 and 56 and the non-interacting control correction value computation section 63.

The two-phase pulse train signals and zero-phase pulse train signal output from the rotational angle sensor 30 are continuously supplied to an electrical angle conversion section 64 at predetermined sampling intervals. On the basis of these pulse train signals, the electrical angle conversion section 64 calculates electrical angle θ of the rotor of the motor 6 with respect to the stator thereof and outputs the calculated electrical angle θ to an angular speed conversion section 65. The angular speed conversion section 65 differentiates the calculated electrical angle θ to thereby obtain angular velocity ω of the rotor with respect to the stator. When the angular velocity ω is positive, the rotor rotates in the forward direction or positive direction. When the angular velocity ω is negative, the rotor rotates in a backward direction or negative direction.

Next, a step-up circuit 100 for boosting battery voltage and a step-up circuit controller for controlling the step-up circuit 100 will be described. In the present embodiment, the above-described controller 20 acts as the step-up circuit controller as well.

The step-up circuit 100 is provided in a current supply circuit between a vehicle-mounted battery (hereinafter referred to as a "battery") B and the motor drive unit 35.

In the step-up circuit 100 according to the present embodiment, a step-up coil (hereinafter simply referred to as a "coil") L and a transistor Q2 are connected between an application point P1 and a voltage application point P2, which serves as an output terminal of the step-up circuit 100. The source of the transistor Q2 is connected to the coil L, and the drain of the transistor Q2 is connected to the voltage application point P2. The gate of the transistor Q2 is connected to the CPU 21 of the controller 20. D2 represents a parasitic diode of the transistor Q2.

The application point P1 is grounded via a rectification capacitor C1. The voltage application point P2 is grounded via a step-up capacitor C2.

The capacitor C2 serves as a capacitor for smoothing step-up voltage produced by means of the step-up coil.

The drain of a transistor Q1 is connected to a connection point between the coil L and the transistor Q2. The source of the transistor Q1 is grounded. The gate of the transistor Q1 is connected to the CPU 21 of the controller 20. D1 represents a parasitic diode of the transistor Q1. In order to detect voltage at the voltage application point P2 (output voltage $V_{BPIG}$), the voltage application point P2 is connected to an unillustrated voltage input port of the CPU 21 of the controller 20.

Each of the transistors Q1 and Q2 is a MOSFET. The transistor Q1 serves as a first switching element; and the transistor Q2 serves as a second switching element.

Next, the controller 20 for controlling the transistors Q1 and Q2 will be described.

Figure 5:
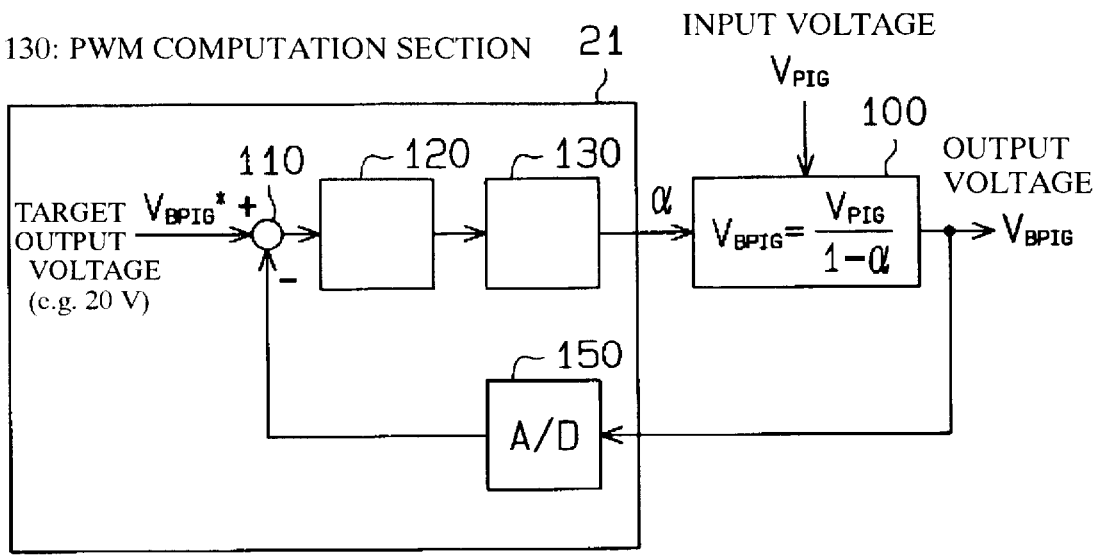
FIG. 5 is a control block diagram of the controller shown in FIG. 2 during step-up operation.

FIG. 5 shows a functional block diagram of the controller 20. That is, FIG. 5 shows a control block diagram showing functions realized through execution of a program in the CPU 21.

The respective blocks shown in the control block diagram do not represent independent hardware units but represent functions realized by means of the CPU 21. The controller 20 serves as step-up circuit control means.

The CPU 21 includes a computing unit 110, a PID control section 120, a PWM computation section 130, and an A/D conversion section 150.

The computing unit 110 calculates deviation of the output voltage $V_{BPIG}$ input via the A/D conversion section 150 from a target output voltage $V_{BPIG}{}^*$ (in the present embodiment, 20 V) stored in the ROM 22 in advance and outputs the deviation to the PID control section 120.

The PID control section 120 performs proportional (P) processing, integration (I) processing, and differential (D) processing in order to compute a controlled variable of the transistors Q1 and Q2, whose value reduces the deviation. The controlled variable computed by means of the PID control section 120 is fed to the PWM computation section 130. The PWM computation section 130 computes a duty ratio α corresponding to the controlled variable and converts it to duty-ratio drive signals to be applied to the transistors Q1 and Q2 of the step-up circuit 100. Note that, in the present embodiment, the duty-ratio drive signals turn the transistors Q1 and Q2 alternately on and off (see FIG. 6). The application of duty-ratio drive signals is performed in the same manner in both power generation and regeneration states of the motor 6.

Figure 6:
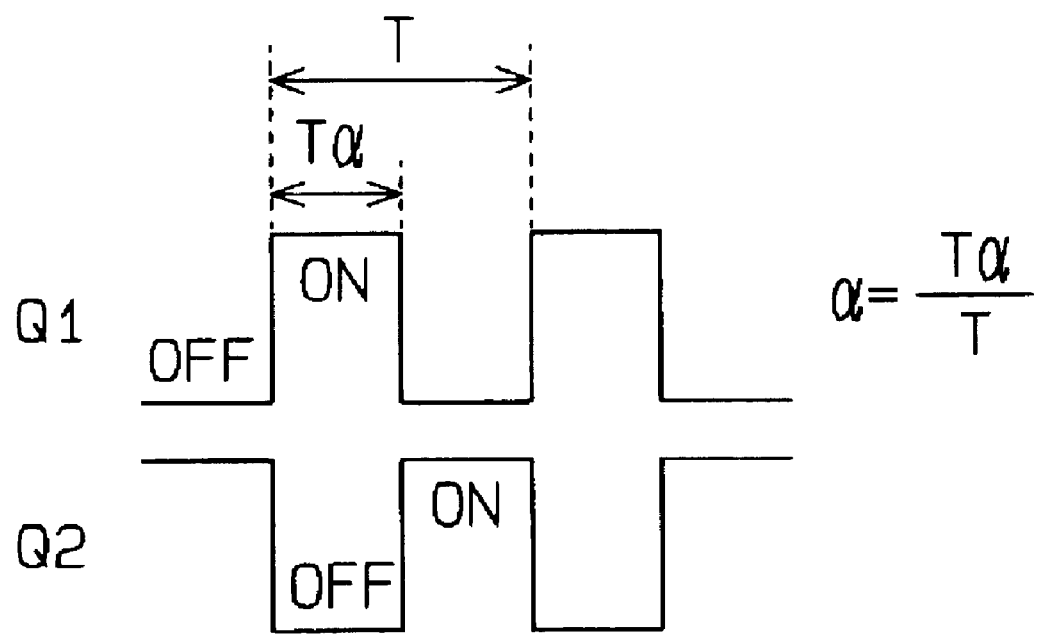
FIG. 6 is a diagram showing waveforms of duty ratio drive signals applied to the first and second transistors shown in FIG. 4.

FIG. 6 shows a first pulse signal (duty-ratio drive signal) applied to the transistor Q1. In FIG. 6, Tα represents an ON period; T represents a pulse cycle; and α represents a duty ratio (on duty) of the transistor Q1. Note that the duty ratio of the transistor Q2 is (1−|α|).

When the duty ratio α is "+," the motor 6 is in a power generation state; and when the duty ratio α is "−," the motor 6 is in a regeneration state In the first embodiment, the duty ratio α in a power generation state is controlled to satisfy the inequality 0≦α≦α0<1, where α0 represents a limit value. When the duty ratio α computed by means of the PWM computation section 130 is greater than α0, the duty ratio α is set to α0.

The duty ratio α in a regeneration state is controlled to satisfy the inequality 0≦|α|≦1.

In the first embodiment and other embodiments, when the transistors Q1 and Q2 are alternately turned on and off, the duty ratio of the transistor Q2 becomes (1−|α|). Therefore, description regarding the duty ratio of the transistor Q2 is omitted.

Further, a second pulse signal (duty-ratio drive signal) is applied to the transistor Q2 in such a manner that the transistor Q2 is off when the transistor Q1 is on and is on when the transistor Q1 is off. The duty-ratio drive signals applied to the transistors Q1 and Q2 each have a frequency outside the audible frequency range.

<Operation of First Embodiment>

In the present embodiment, in both power generation and regeneration periods, the transistors Q1 and Q2 are alternately turned on and off by the corresponding duty-ratio drive signals having respective drive patterns as shown in FIG. 6.

Specifically, in power generation periods, in the step-up circuit 100, the transistor Q1 performs switching operation in accordance with the corresponding duty-ratio drive signal. As a result, accumulation of energy in the coil L and discharge of energy from the coil L are repeated, and high voltage generated due to discharge appears on the drain side of the transistor Q2. That is, when the transistor Q1 is turned on and the transistor Q2 is turned off, current flows to the ground via the transistor Q1. When the transistor Q1 is then turned off, the current flowing through the coil L is cut off. Wen the current flowing through the coil L is cut off, high voltage is generated on the drain side of the transistor Q2 in an on state so as to prevent magnetic flux from changing in response to cut off of the current. Through iteration of this operation, high voltage is generated repeatedly on the drain side of the transistor Q2. The high voltage is smoothed by means of the capacitor C2 and is fed to the point P2 as output voltage $V_{BPIG}$.

The voltage obtained through step-up effected by the step-up circuit 100 relates to the duty ratio α of the duty-ratio drive signals output from the controller 20. When the duty ratio α increases, the output voltage $V_{BPIG}$ increases; and when the duty ratio α decreases, the output voltage $V_{BPIG}$ decreases.

When the motor 6 enters a regeneration state, the output voltage $V_{BPIG}$ increases. Since the transistor Q2 is turned on by means of duty control even in regeneration periods, current flows to the battery B via the transistor Q2 and is absorbed thereby.

The first embodiment has the following features.

(1) The present embodiment includes the command current setting section 54 (control signal generation means), which determines the d-axis command current Id* and the q-axis command current Iq* (motor control signal) on the basis of the vehicle speed V and the steering torque τ applied to the steering wheel 1 and outputs the same, and the motor drive unit 35 (motor drive means), which drives the motor 6 on the basis of the d-axis command current Id* and the q-axis command current Iq* (motor control signal). Further, the step-up circuit 100 is provided in the current supply circuit between the battery B and the motor drive unit 35 (motor drive means). The step-up circuit 100 includes the coil L (step-up coil) whose one end is connected to the battery B and to which battery voltage is applied, the transistor Q1 (first switching element) for grounding and opening the other end of the coil L, the transistor Q2 (second switching element) which is connected to the other end of the coil L and is turned on and off, and the capacitor C2 which is connected to the output side of the transistor Q2 and smoothes output voltage (step-up voltage) generated by means of the coil L.

Moreover, the present embodiment includes the controller 20 (step-up circuit control means) which turns the transistors Q1 and Q2 on and off alternately on the basis of the difference between the target output voltage $V_{BPIG}{*}$ and the detected output voltage $V_{BPIG}$ during power generation periods, to thereby increase the voltage supplied to the motor 6. During regeneration periods as well, the controller 20 turns the transistors Q1 and Q2 on and off alternately.

As a result, even when the motor 6 enters a regeneration state, the step-up circuit 100 is not broken.

(2) In the first embodiment, the step-up circuit 100 is provided in the current supply circuit between the battery B and the motor drive unit 35 (motor drive means). The step-up circuit 100 includes the coil L (step-up coil) which is connected to the battery B, the transistor Q1 (first switching element) for grounding and opening the coil L, the transistor Q2 (second switching element) connected to the coil L, and the capacitor C2 for smoothing output voltage.

Moreover, there is provided the controller 20 (step-up circuit control means) which, during both power generation and regeneration periods, turns the transistors Q1 and Q2 on and off alternately on the basis of the difference between the target output voltage $V_{BPIG}{*}$ and the detected output voltage $V_{BPIG}$, to thereby increase the voltage supplied to the motor 6 or collect regenerative power produced by the motor 6.

In the conventional apparatus, since the diode D is used, when the transistor Q1 is turned off during a power generation period, a large quantity of heat is generated by the current flowing through the diode D. By contrast, in the present embodiment, a reduced quantity of heat (loss) is generated by the current flowing through the transistor Q2, and therefore, efficiency can be improved.

(3) In the conventional apparatus, when the motor 6 enters a regeneration state, the output voltage $V_{BPIG}$ increases due to presence of the diode D. Since means for preventing voltage increase is not provided, the output voltage $V_{BPIG}$ increases excessively, and the circuit may be broken.

By contrast, in the present embodiment, when the output voltage $V_{BPIG}$ increases during a regeneration period, current flows to the battery B during periods in which the transistor Q2 is turned on, so that an increase in the output voltage $V_{BPIG}$ can be avoided.

(4) In the present embodiment, the duty-ratio drive signals to be applied to the transistors Q1 and Q2 each have a frequency outside the audible frequency range. As a result, no noise is generated by the duty-ratio drive signals during step-up control for the step-up circuit 100, whereby an unpleasant feeling imparted to a driver can be suppressed.

2. Second Embodiment

Next, a second embodiment will be described with reference to FIG. 7.

In the present embodiment and the remaining embodiments described below, structural elements identical to or corresponding to those described in preceding embodiment(s) (the first embodiment in the case of the second embodiment) are denoted by the same reference numerals. Repeated descriptions regarding such elements are omitted, and features different from those of preceding embodiment(s) are mainly described.

The second embodiment has the same configuration as that of the first embodiment except that in the second embodiment the controller 20 of the first embodiment serves as steering state judgment means as well.

In the first embodiment, the PID control section 120 computes a controlled variable of the transistors Q1 and Q2; and the PWM computation section 130 converts the computed controlled variable to corresponding duty-ratio drive signals. When the duty ratio α is "−," the motor 6 is in a regeneration state; and when the duty ratio α is "+," the motor 6 is in a power generation state. Therefore, the PWM computation section 130 serves as steering state judgment means. The PWM computation section 130 supplies to the transistors Q1 and Q2 duty-ratio drive signals which change according to whether the duty ratio is "+" (power generation state) or "−" (regeneration state).

In the second embodiment, as in the first embodiment, the duty ratio α in a power generation state is controlled to satisfy the inequality $0 \leq \alpha \leq \alpha 0 < 1$, and when the duty ratio α computed by means of the PWM computation section 130 is greater than α0, the duty ratio α is set to α0.

The duty ratio α in a regeneration state is controlled to satisfy the inequality $0 \leq |\alpha| \leq 1$, as in the first embodiment.

Figure 7:
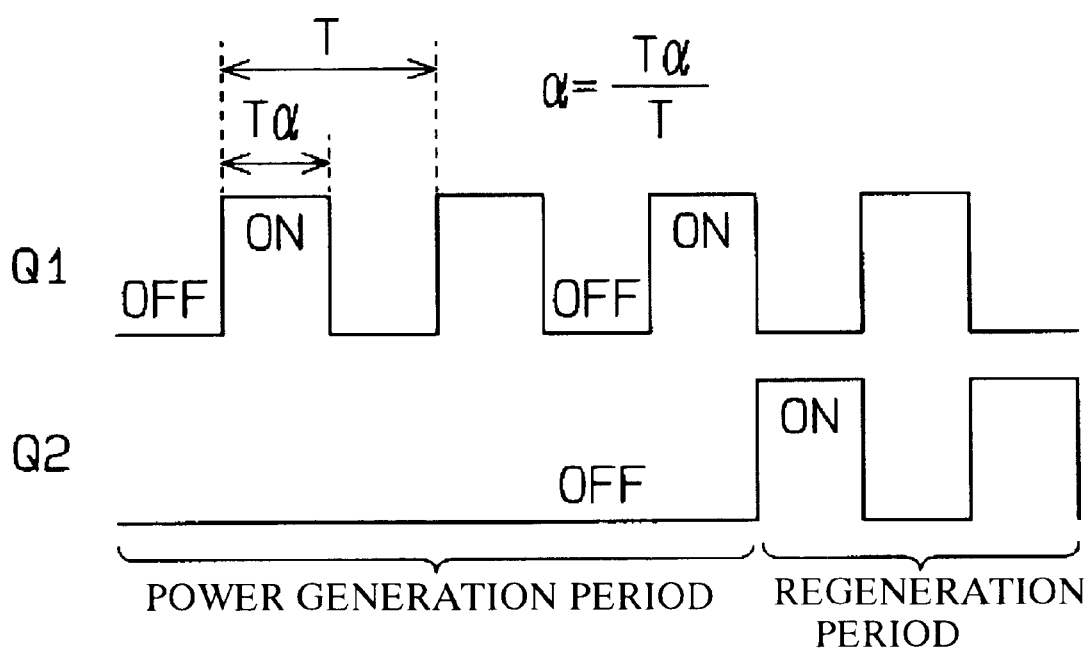
FIG. 7 is a diagram showing waveforms of duty ratio drive signals applied to the first and second transistors in a second embodiment.

In the second embodiment, as shown in FIG. 7, the duty-ratio drive signals output from the PWM computation section 130 drive the transistors Q1 and Q2 in different patterns depending on whether the motor 6 is in a power generation state or in a regeneration state.

In power generation periods, the duty-ratio drive signals are applied to the transistors Q1 and Q2 in such a manner that the transistor Q1 is turned on and off, and the transistor Q2 is maintained off.

In regeneration periods, the duty-ratio drive signals are applied to the transistors Q1 and Q2 in such a manner that the transistors Q1 and Q2 are alternately turned on and off.

<Operation of Second Embodiment>

In power generation periods, since the duty ratio α is "+," the duty-ratio drive signals are applied from the PWM computation section 130 to the transistors Q1 and Q2 in such a manner that the transistor Q1 is turned on and off, and the transistor Q2 is maintained off. In the following descriptions, when the duty ratio α is "+," it is said that "the controller 20 has judged that the motor 6 is in a power generation state," and when the duty ratio α is "−," it is said that "the controller 20 has judged that the motor 6 is in a regeneration state."

In other words, when the controller 20 has judged that the motor 6 is in a power generation state, the controller 20 controls the transistor Q2 in such a manner that the transistor Q2 is maintained off continuously.

Therefore, in the step-up circuit 100, only the transistor Q1 performs switching operation. As a result, accumulation of energy in the coil L and discharge of energy from the coil L are repeated. At this time, as in the first embodiment, high voltage generated in response to discharge appears on the drain side of the transistor Q2. This is because even when the transistor Q2 is maintained off, by virtue of presence of the parasitic diode D2 of the transistor Q2, high voltage is generated on the drain side of the transistor Q2 via the parasitic diode D2.

In this manner, through repeated on-off drive of the transistor Q1 only, high voltage is generated on the drain side of the transistor Q2. Through iteration of this operation, high voltage is generated repeatedly on the drain side of the transistor Q2. The high voltage is smoothed by means of the capacitor C2 and is fed to the point P2 as output voltage $V_{BPIG}$.

In a regenerating period, the duty ratio α becomes "−," and the duty-ratio drive signals are applied from the PWM computation section 130 to the transistors Q1 and Q2 in such a manner that the transistors Q1 and Q2 are alternately turned on and off. In other words, when the controller 20 has judged that the motor 6 is in a regeneration state, the controller 20 controls the transistor Q2 in such a manner that the transistors Q1 and Q2 are alternately turned on and off. Therefore, in regenerating periods, the step-up circuit 100 operates in the same manner as in the first embodiment.

When the regeneration state continues, the duty ratio α decreases. As a result, there is established a state such that the transistor Q1 is maintained off continuously and only the transistor Q2 is turned on. Thus, regenerative current flows to the battery B and is absorbed thereby.

The second embodiment has the following features.

(1) The second embodiment includes the controller 20 (steering state judgment means) which judges the state of the motor 6 (power generation state or regeneration state) on the basis of the difference between the target output voltage $V_{BPIG}*$ and the detected output voltage $V_{BPIG}$. Further, when the controller 20 judges that the motor 6 is in a power generation state, the controller 20 turns only the transistor Q1 (first switching element) on and off.

As a result, in power generation periods, the quantity of generated heat and loss can be reduced as compared with the case of the diode D used in conventional apparatuses, as in the first embodiment.

(2) Further, when the controller 20 judges that the motor 6 is in a regeneration state, the controller 20 turns the transistors Q1 and Q2 on and off alternately.

As a result, even in regeneration periods, an increase in the output voltage $V_{BPIG}$ can be avoided as in the first embodiment.

3. Third Embodiment

Figure 8:
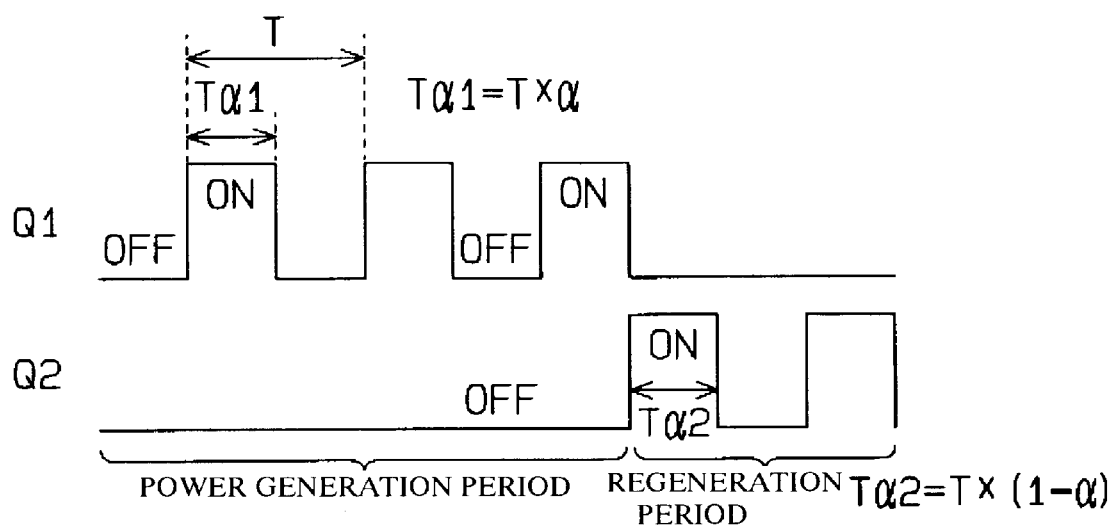
FIG. 8 is a diagram showing waveforms of duty ratio drive signals applied to the first and second transistors in a third embodiment.

Next, a third embodiment will be described with reference to FIG. 8.

In the third embodiment to tenth embodiment, as in the second embodiment, the controller 20 (the PWM computation section 130) serves as steering state judgment means.

Although the third embodiment has the same structure as that of the second embodiment, the third embodiment differs from the second embodiment in terms of control. That is, in power generation periods, duty-ratio drive signals are applied to the transistors Q1 and Q2 in the same manner as in the second embodiment. However, in regeneration periods, the duty-ratio drive signals are applied to the transistors Q1 and Q2 in a manner different from that in the second embodiment.

That is, in regeneration periods, the PWM computation section 130 applies to the transistor Q1 a duty-ratio drive signal which maintains the transistor Q1 off continuously and applies to the transistor Q2 a duty-ratio drive signal which achieves a predetermined duty ratio. In FIG. 8, the ON period Tα1 (=T×α) of the duty-ratio drive signal applied to the transistor Q1 has the same length as the ON period Tα in the second embodiment. Meanwhile, the ON period Tα2 of the duty-ratio drive signal applied to the transistor Q2 has a length represented by Tα2=T×(1−|α|).

As in the second embodiment, the duty ratio α of the transistor Q1 in a power generation state is controlled to satisfy the inequality $0 \leq \alpha \leq \alpha 0 < 1$, and when the duty ratio α computed by means of the PWM computation section 130 is greater than α0, the duty ratio α is set to α0. The duty ratio (1−|α|) of the transistor Q2 in a regeneration state is controlled to satisfy the inequality $0 \leq |\alpha| \leq 1$.

The third embodiment has the following features.

(1) The third embodiment includes the controller 20 (steering state judgment means) which judges the state of the motor 6 (power generation state or regeneration state) on the basis of the difference between the target output voltage $V_{BPIG}{}^*$ and the detected output voltage $V_{BPIG}$. Further, when the controller 20 judges that the motor 6 is in a power generation state, the controller 20 turns only the transistor Q1 (first switching element) on and off; and when the controller 20 judges that the motor 6 is in a regeneration state, the controller 20 turns only the transistor Q2 (second switching element) on and off.

As a result, in power generation periods (power generation state), the same effect as that attained in power generation periods (power generation state) in the second embodiment can be attained.

Further, in power generation periods (power generation state), only the transistor Q2 is turned on and off. Therefore, in the present embodiment, as in regeneration periods (regeneration state) in the first embodiment, a reduced quantity of heat (loss) is generated by current which flows when the transistor Q2 is turned on, and thus, efficiency can be improved.

4. Fourth Embodiment

Next, a fourth embodiment will be described with reference to FIGS. 9 and 10. Although the fourth embodiment has the same structure as that of the second embodiment, the fourth embodiment differs from the second embodiment in terms of control.

Figure 9:
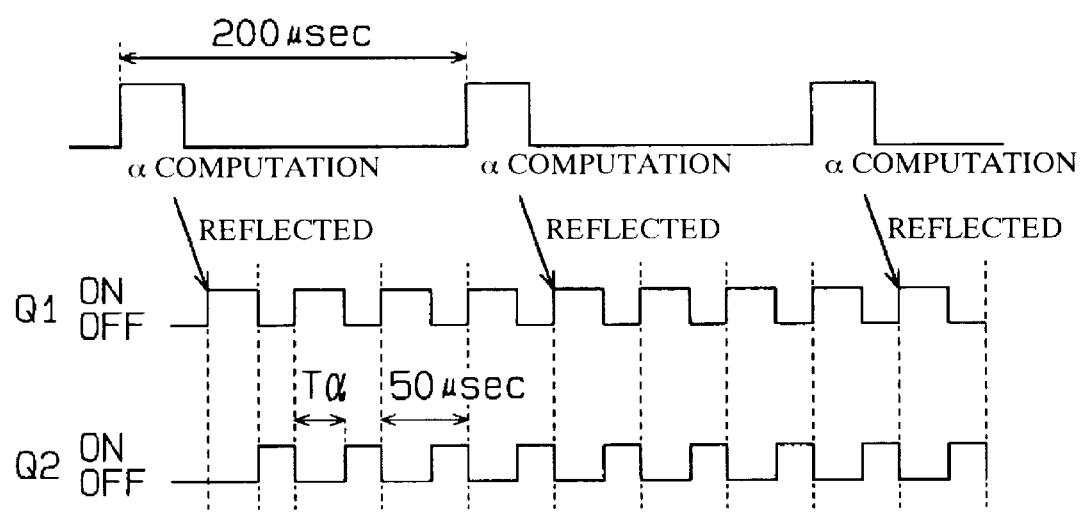
FIG. 9 is a diagram showing waveforms of duty ratio drive signals applied to the first and second transistors in a power generation state in a fourth embodiment.

That is, in the fourth embodiment, in power generation periods, the transistors Q1 and Q2 are turned on and off alternately by means of the duty-ratio drive signals from the PWM computation section 130, as shown in FIG. 9. In other words, when the controller 20 judges that the motor 6 is in a power generation state, the controller 20 controls the transistors Q1 and Q2 through on-off drive. In the present embodiment, as shown in FIG. 9, processing for computing the duty ratio α is performed at computation intervals of 200 μsec; and results of the computation are reflected in the on-off drive of the transistor Q1 immediately after completion of the computation. Note that the pulse cycle (period) T is set to 50 μsec.

Figure 10:
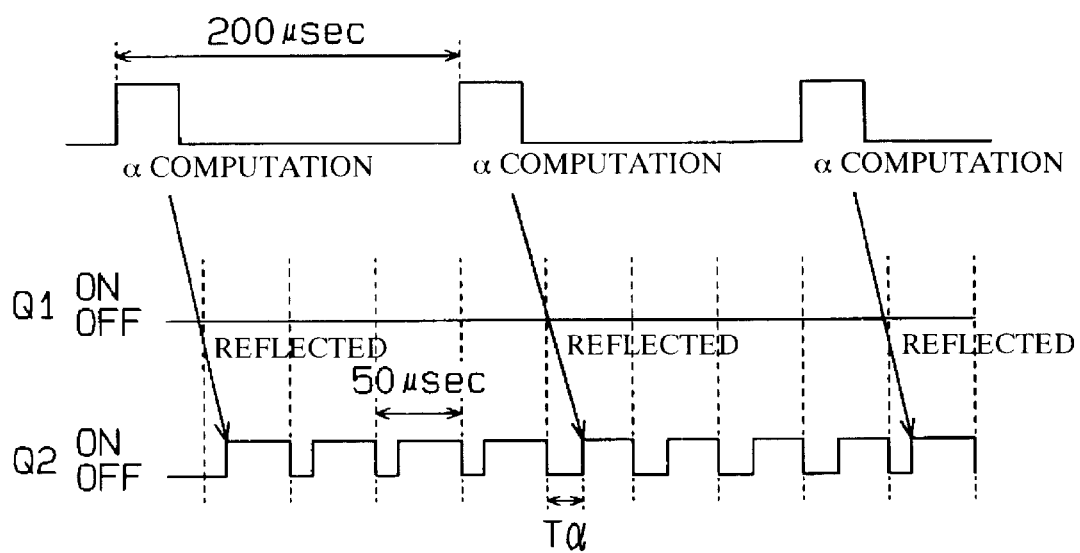
FIG. 10 is a diagram showing waveforms of duty ratio drive signals applied to the first and second transistors in a regeneration state in the fourth embodiment.

In regeneration periods, as shown in FIG. 10, the PWM computation section 130 applies to the transistor Q1 a duty-ratio drive signal which maintains the transistor Q1 off continuously, and applies to the transistor Q2 a duty-ratio drive signal which achieves a predetermined duty ratio, as in the third embodiment. In other words, when the controller 20 judges that the motor 6 is in a regeneration state, the controller 20 maintains the transistor Q1 off continuously, and controls the transistor Q2 through on-off drive.

In the fourth embodiment, the duty ratio α in a power generation state is the same as that employed in the first embodiment.

In the fourth embodiment, the duty ratio (1−|α|) of the transistor Q2 in a regeneration state is controlled to satisfy the inequality $0 \leq |\alpha| \leq 1$.

Accordingly, the fourth embodiment has the following features.

(1) The fourth embodiment includes the controller 20 (steering state judgment means) which judges the state of the motor 6 (power generation state or regeneration state) on the basis of the difference between the target output voltage $V_{BPIG}{}^*$ and the detected output voltage $V_{BPIG}$. Further, when the controller 20 judges that the motor 6 is in a power generation state, the controller 20 turns the transistors Q1 and Q2 on and off alternately; and when the controller 20 judges that the motor 6 is in a regeneration state, the controller 20 turns only the transistor Q2 on and off.

Even in this case, in power generation periods (power generation state), the same effect as that attained in power generation periods (power generation state) in the first embodiment can be attained. In the second and third embodiments, in power generation periods (power generation state), the transistor Q2 is maintained off continuously, and the capacitor C2 is charged via the parasitic diode D2, whereby step-up voltage is generated. Therefore, in power generation periods (power generation state), the parasitic diode D2 generates heat. By contrast, in the present embodiment, in power generation periods (power generation state), the transistor Q2 is turned on for step-up operation in order to reduce the quantity of heat (loss) generated by current which flows when the transistor Q2 is turned on, as compared with the case of the parasitic diode D2. Thus, efficiency during step-up operation (power generation periods) can be increased.

Further, in a regeneration period (regeneration state), the same effect as that attained in the regeneration period (regeneration state) in the third embodiment can be attained.

5. Fifth Embodiment

Figure 11:
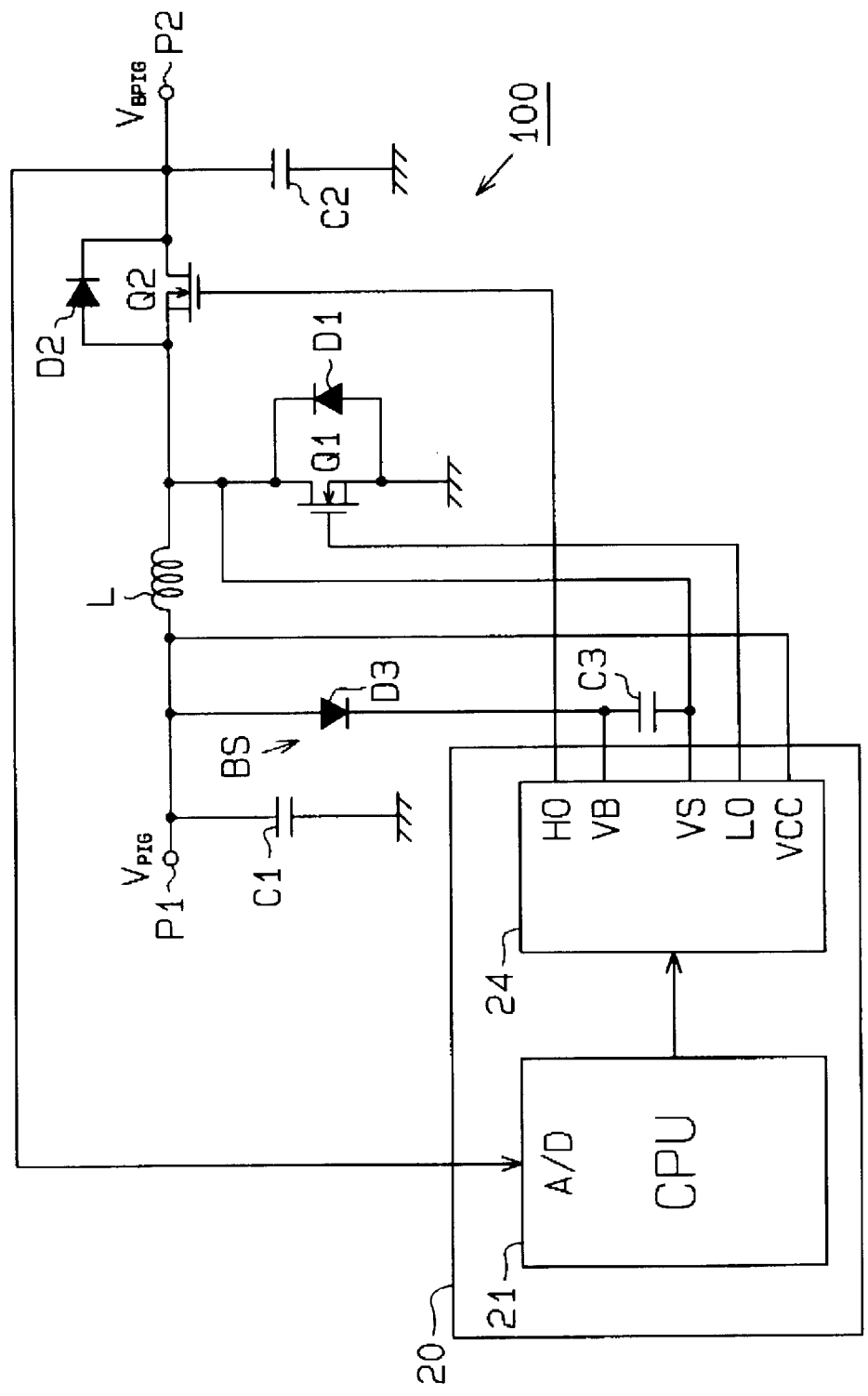
FIG. 11 is a circuit diagram of a step-up circuit according to a fifth embodiment.

Next, a fifth embodiment will be described with reference to FIGS. 11 to 13.

The present embodiment has the same configuration as that of the first embodiment, except that a bootstrap circuit BS is inserted between the application point P1 and the drain of the transistor Q1. The bootstrap circuit BS consists of a diode D3 and a bootstrap capacitor (hereinafter simply referred to as a "capacitor") C3. The anode of the diode D3 is connected to the application point P1; and the cathode of the diode D3 is connected to the capacitor C3.

Although not described, in the first through fourth embodiments, an unillustrated charge pump provided in the controller 20 is connected to the gate of the transistor Q2, unlike the fifth embodiment, and gate potential or voltage can be applied to the gate when necessary. Therefore, as having been described in relation to operation in, for example, the third and fourth embodiments, even when the transistor Q1 is maintained off continuously during regeneration periods, voltage is applied to the transistor Q2 from the drive power source (charge pump) in order to turn the transistor Q2 on and off.

In the fifth embodiment, the controller 20 further includes a pre-driver 24, which is in the form of an IC and is connected to the CPU 21. The pre-driver 24 serves as pre-driver means.

The cathode of the diode D3 is connected to the VB terminal of the pre-driver 24. Further, the VS terminal of the pre-driver 24 is connected to the drain of the transistor Q1. In accordance with the duty-ratio drive signal for the transistor Q2 output from the CPU 21, the pre-driver 24 applies voltage charged in the capacitor C3 to the gate of the transistor Q2 via the HO terminal.

The application point P1 is connected to the VCC terminal of the pre-driver 24. In accordance with the duty-ratio drive signal for the transistor Q1 output from the CPU 21, the pre-driver 24 applies voltage (DC 12 V in the present embodiment) at the application point P1 to the gate of the transistor Q1 via the LO terminal.

<Operation>

Next, operation of the fifth embodiment will be described.

Figure 12:
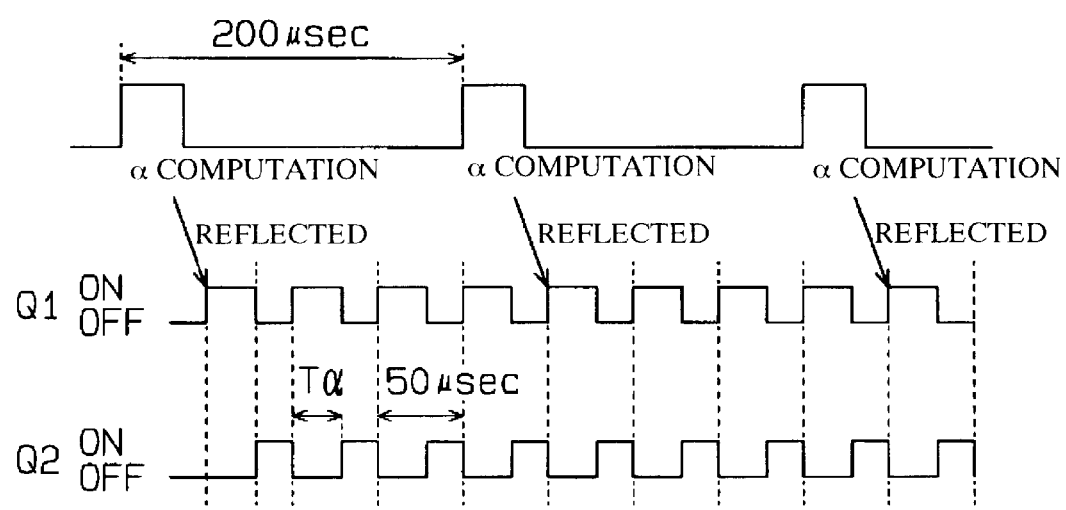
FIG. 12 is a diagram showing waveforms of duty ratio drive signals applied to the first and second transistors in a power generation state in the fifth embodiment.

As in the fourth embodiment, when the controller 20 judges that the motor 6 is in a power generation state, the controller 20 turns the transistors Q1 and Q2 on and off alternately (see FIG. 12). When the transistor Q1 is turned on, the drain of the transistor Q1 assumes the ground potential. As a result, the capacitor C3 is charged to the potential (DC 12 V) at the application point P1. When the transistor Q1 is turned off, the drain potential of the transistor Q1 increases to 12 V, so that the potential at the connection point between the diode D3 and the capacitor C3 becomes 24 V.

In this manner, when the transistor Q1 is turned off, the potential at the connection point between the diode D3 and the capacitor C3 becomes higher than the source potential of the transistor Q2.

Accordingly, when the voltage of the capacitor C3 is applied to the gate of the transistor Q2 in accordance with the duty-ratio drive signal (on level) for the transistor Q2, the transistor Q2 is turned on, because the gate potential Vg of the transistor Q2 becomes higher than the source potential Vs.

In the present embodiment, computation of the duty ratio α is performed at the same intervals as in the fourth embodiment irrespective of whether the motor 6 is in a power generation state or a regeneration state.

Figure 13:
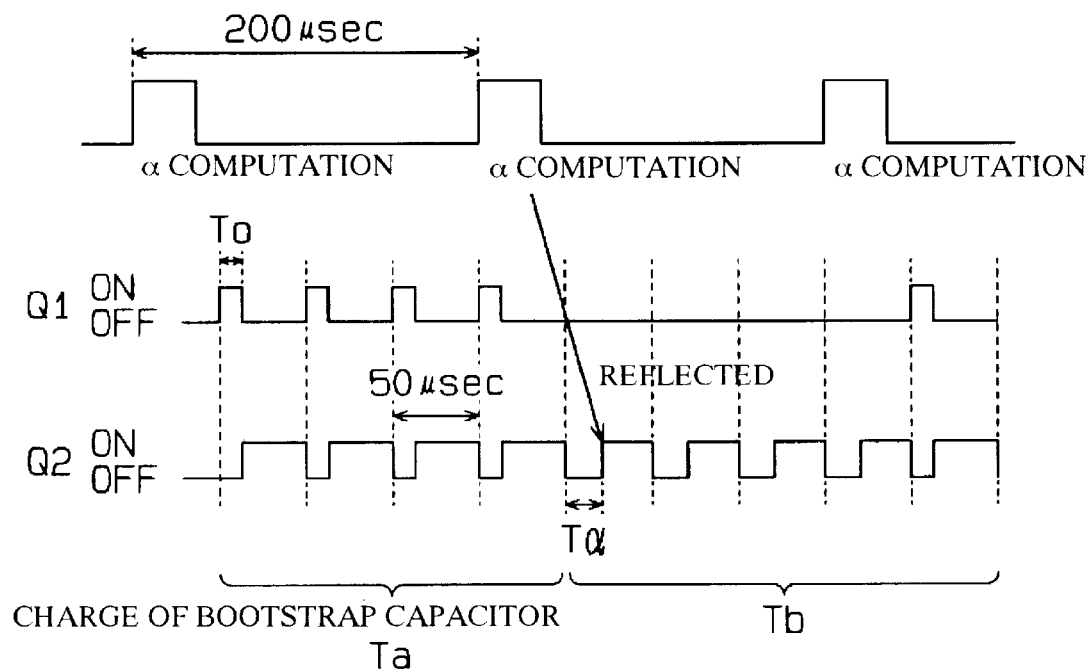
FIG. 13 is a diagram showing waveforms of duty ratio drive signals applied to the first and second transistors in a regeneration state in the fifth embodiment.

Further, when the controller 20 judges that the motor 6 is in a regeneration state, the controller 20 controls the transistors Q1 and Q2, as shown in FIG. 13.

Specifically, the controller 20 controls the transistors Q1 and Q2 in such a manner that a first period Ta in which the transistors Q1 and Q2 are turned on and off alternately and a second period Tb in which the transistor Q1 is maintained off and only the transistor Q2 is turned on and off are repeated.

In the fifth embodiment, the first period Ta serves as a charge period and corresponds to an un-reflected period in which the result of the α computation is not reflected. The second period Tb serves as a discharge period and corresponds to a reflected period in which the result of the α computation is reflected.

That is, in each of periods of a constant length (in the present embodiment, 200 µsec corresponding to the computation intervals), the controller 20 turns the transistor Q1 on and off at a fixed duty ratio α1 and turns the transistor Q2 on and off at a fixed duty ratio (1−|α1|).

Accordingly, the on-duty time To (To=pulse cycle×α1) during the first period Ta is a fixed value. During the first period Ta, the transistor Q1 is turned on and off at a fixed duty ratio α1 in order to charge the capacitor C3. Note that data of the fixed duty ratio α1 are stored in the ROM 22 in advance, and when the controller 20 judges that the motor 6 is in a regeneration state, the controller 20 performs PWM control on the basis of the stored data during the first period Ta. In the present embodiment, the pulse cycle is 50 µsec.

The on-duty time To is set to a value such that even when the transistor Q1 is maintained off in the second period Tb, the gate potential Vg of the transistor Q2 is maintained higher than the source potential Vs thereof. In other words, this setting is performed in consideration of the fact that the transistor Q2 can be turned on if the gate potential Vg of the transistor Q2 is maintained higher than the source potential Vs.

Note that the duty ratios α and (1−|α1|) used in a power generation state in the fifth embodiment are the same as those used in the first embodiment. Further, in control in a regeneration state, the duty ratio (1−|α1|) of the transistor Q2 includes a duty ratio of 100% at which the transistor Q2 is maintained on continuously. In other words, the duty ratio of the transistor Q2 is determined under the condition that $0 \leq \alpha \leq 1$.

Accordingly, the fifth embodiment achieves the following effects.

(1) The fifth embodiment includes the controller 20 (steering state judgment means) which judges the state of the motor 6 (power generation state or regeneration state) on the basis of the difference between the target output voltage $V_{BPIG}^*$ and the detected output voltage $V_{BPIG}$. Further, the first and second switching elements are constituted by the transistors Q1 and Q2, each of which is an n-channel MOSFET. Further, the bootstrap circuit BS is connected to a line extending between the battery B and the drain of the transistor Q1 in order to generate voltage to be applied to the gate of the transistor Q2. The bootstrap circuit BS includes the capacitor C3 (bootstrap capacitor) and applies the potential of the capacitor C3 to the gate of the transistor Q2.

When the controller 20 judges that the motor 6 is in a power generation state, the controller 20 turns the transistors Q1 and Q2 on and off alternately. When the controller 20 judges that the motor 6 is in a regeneration state, the controller 20 turns the transistor Q2 on and off, and controls the transistor Q1 in such a manner that the transistor Q1 is turned on and off in the first period Ta (200 µsec) and is maintained off in the second period Tb (200 µsec).

As described above, the fifth embodiment differs from the first embodiment, etc., in which a charge pump is used as a power source for the transistor Q2. That is, the bootstrap circuit BS is used as a power source for the gate of the transistor Q2 in power generation and regeneration states.

In the case in which a charge pump is used as a power source for the transistor Q2 as in the first embodiment, the transistor Q2 can be maintained on continuously even in a regeneration state.

However, when the bootstrap circuit BS is provided as in the fifth embodiment, the capacitor C3 is not charged in a regeneration period unless the transistor Q1 is turned on. Therefore, due to discharge of the capacitor C3, the gate potential Vg becomes lower than the source potential Vs, so that the transistor Q2 becomes impossible to turn on and becomes unable to absorb regenerative current.

However, in the fifth embodiment, each regeneration period includes the first period Ta in which PWM control is performed for the transistor Q1 at the fixed duty ratio α1. Therefore, even when the capacitor C3 is discharged in the second period Tb, the transistor Q2 can be turned on and off properly.

As a result, in regeneration periods, regenerative current can be absorbed by the battery.

In the fifth embodiment, even in regeneration periods, the transistor Q1, serving as a first switching element, are turned on and off at the fixed duty ratio and at constant intervals. However, the present embodiment may be modified in such a manner that the transistor Q1 is turned on and off at a fixed duty ratio in the first period Ta and is turned on and off at a variable fixed duty ratio in the second period Tb.

6. Sixth Embodiment

Next, a sixth embodiment will be described with reference to FIGS. 14 to 17. The sixth embodiment has the same circuit configuration as that of the fifth embodiment and is a modification of the fifth embodiment in which modified control is performed during regeneration periods. Therefore, structural elements identical to those described in the fifth embodiment are denoted by the same reference numerals, and repeated descriptions regarding such elements are omitted.

Figure 16:
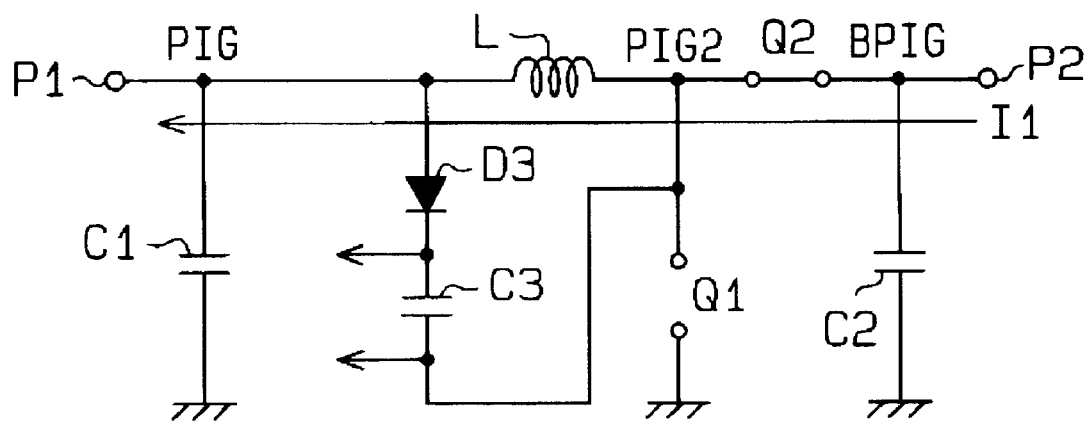
Figure 17:
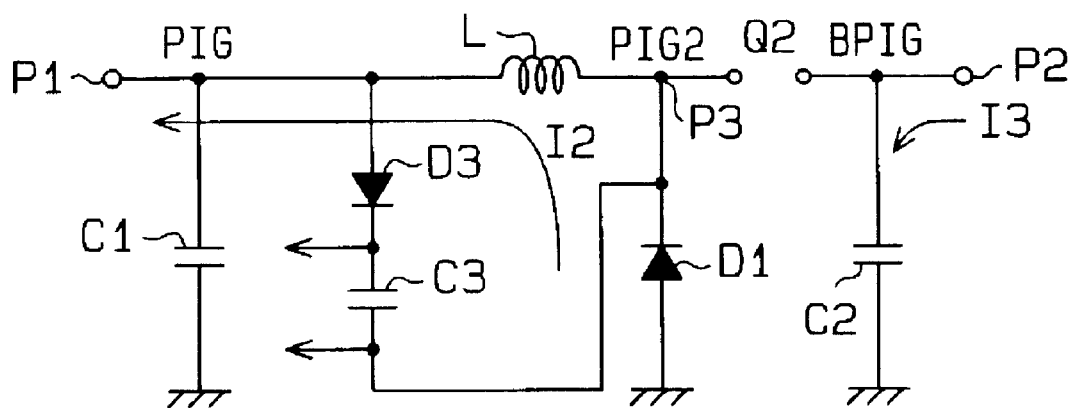
FIG. 17 is a diagram showing an equivalent circuit of the step-up circuit in mode I with the second transistor being off.

FIGS. 16 and 17 show operation of the step-up circuit 100. In order to facilitate the description, the bootstrap circuit BS and other circuits are omitted from these drawings. These drawings show, in the form of equivalent circuits, basic operations of the step-up circuit 100 of the present embodiment.

Figure 14:
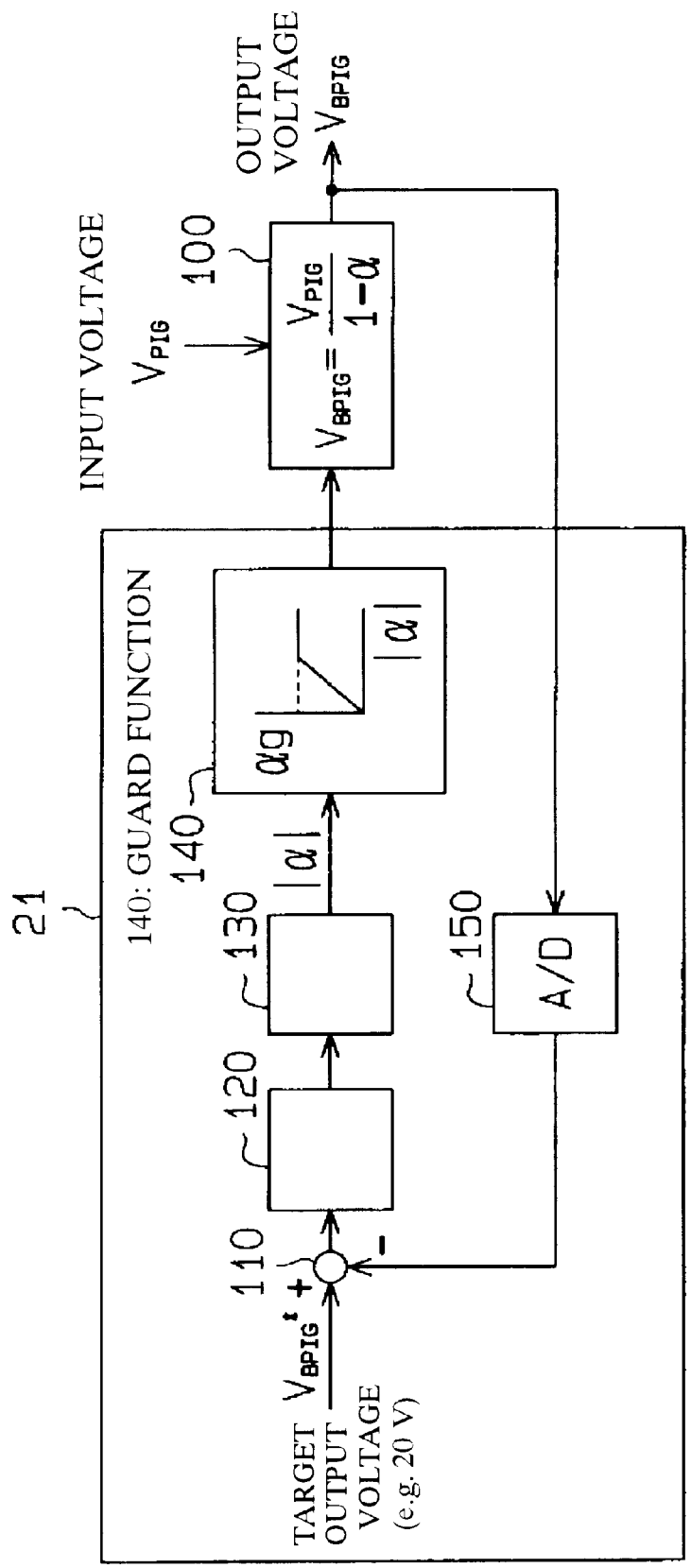
FIG. 14 is a control block diagram showing functions which are realized by a control program for regeneration performed by the CPU in a sixth embodiment.

FIG. 14 is a control block diagram showing functions which are realized by a control program for regeneration performed by the CPU 21 of the controller 20.

In the sixth embodiment, when control for regeneration periods is performed, as shown in FIG. 14, a guard function section 140 is inserted between the PWM computation section 130 and the step-up circuit 100.

In the present embodiment, control for power generation periods is performed in the same manner as in the fifth embodiment.

Control for regeneration periods is performed in a manner different from that in the fifth embodiment; i.e., the transistor Q1 is maintained off continuously, and PWM control is performed for the transistor Q2 in order to turn the transistor Q2 on and off. The duty ratio $(1-|\alpha|)$ of the transistor Q2 is guarded (restricted) such that the transistor Q2 is not maintained on continuously; i.e., the transistor Q2 is turned off without fail.

Specifically, when the duty ratio $|\alpha|$ computed by the PWM computation section 130 is greater than a guard value (limit value) $\alpha g$ $(0 \leq |\alpha| < \alpha g < 1)$, the guard value $\alpha g$ is selected. In other words, the transistor Q2 is turned on at a duty ratio $(1-\alpha g)$.

When the duty ratio is set to the guard value $\alpha g$ or less, due to charge of the capacitor C3 during a period in which the transistor Q2 is off (mode II period), the gate potential Vg of the transistor Q2 is maintained higher than the source voltage Vs. In other words, the duty ratio is set such that the transistor Q2 is turned off without fail in the mode II period.

Figure 15:
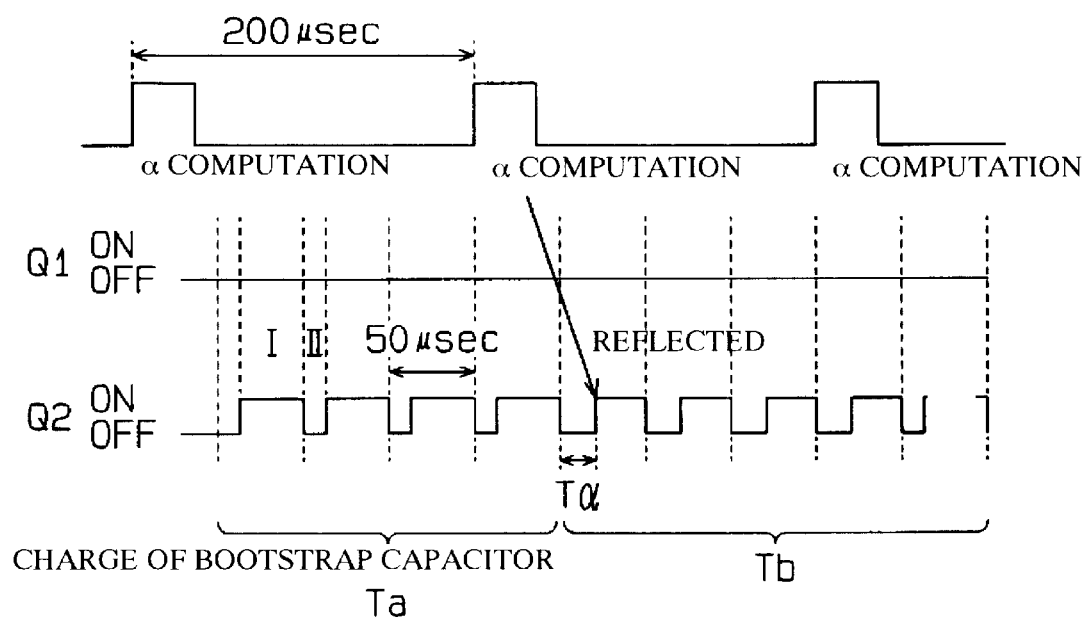
FIG. 15 is an explanatory view showing a pattern of driving the first and second transistors in a regeneration state in the sixth embodiment.

FIG. 15 shows a drive pattern of the transistors Q1 and Q2 in a regeneration period. As shown in FIG. 15, in the present embodiment as well, the transistors Q1 and Q2 are driven in such a manner that the above-described first and second periods Ta and Tb are repeated alternately. As in the fifth embodiment, the first period Ta serves as a charge period and corresponds to a un-reflected period in which the result of the $\alpha$ computation is not reflected. The second period Tb serves as a discharge period and corresponds to a reflected period in which the result of the $\alpha$ computation is reflected.

In the sixth embodiment, modes I and II are repeated alternately in the first period Ta.

In each mode I period in the first period Ta shown in FIG. 15 (the transistor Q2 is on, and the transistor Q1 is off), as shown in FIG. 16, regenerative current I1 flows from the motor 6 to the battery B via the transistor Q2 and the coil L, whereby regenerative power produced at the motor 6 is absorbed by the battery B.

In each mode II period in the first period Ta shown in FIG. 15 (the transistor Q2 is off, and the transistor Q1 is off), the step-up circuit 100 operates as follows. When the operation has changed from mode I to mode II, as shown in FIG. 17, the transistor Q2 is turned off. However, current flowing through the coil L and current flowing through the windings (not shown) of the motor 6 do not become zero immediately. On the side where the coil L is present, the parasitic diode D1 of the transistor Q1 enters an on state, and current I2 flows from the ground to the battery B via the transistor Q1 and the coil L, whereby the electromagnetic energy accumulated in the coil L is absorbed by the battery B.

At this time, since the parasitic diode D1 enters an on state, the potential at the connection point P3 between the coil L and the cathode of the parasitic diode D1 attains the ground level, so that the capacitance C3 can be charged.

Meanwhile, on the side where the unillustrated windings of the motor 6 is present, the transistor Q2 is turned off, and a route along which regenerative current I3 flows is cut off, so that the capacitor C2 is charged by the regenerative current I3.

As described above, in mode II, the transistor Q2 is turned off without fail, and the capacitor C3 of the bootstrap circuit BS is charged. As a result, the gate potential Vg of the transistor Q2 can be maintained higher than the source voltage Vs thereof, thereby enabling subsequent turning on of the transistor Q2. In other words, in the sixth embodiment, although the transistor Q1 is maintained off continuously in a regeneration state, as described above, the transistor Q2 is turned off without fail in each mode II period, whereby the capacitor C3 is charged. Therefore, turning on of the transistor Q2 is possible.

In the second period Tb, as in the fifth embodiment, the result of the $\alpha$ computation is reflected, and the transistor Q2 is turned on and off by means of PWM control.

The sixth embodiment achieves the following effects.

(1) The sixth embodiment includes the controller 20 (steering state judgment means) which judges the state of the motor 6 (power generation state or regeneration state) on the basis of the difference between the target output voltage $V_{BPIG}^*$ and the detected output voltage $V_{BPIG}$.

The first and second switching elements are constituted by the transistors Q1 and Q2, each of which is an n-channel MOSFET. Further, the bootstrap circuit BS is connected to a line extending between the battery B and the drain of the transistor Q1 in order to generate voltage to be applied to the gate of the transistor Q2.

When the controller 20 judges that the motor 6 is in a power generation state, the controller 20 turns the transistors Q1 and Q2 on and off alternately.

When the controller 20 judges that the motor 6 is in a regeneration state, the controller 20 maintains the transistor Q1 off continuously and performs PWM control for the transistor Q2 (second switching element) in order to turn the same on and off. In the PWM control, the duty ratio is restricted so as not to exceed the predetermined duty ratio $(1-\alpha g)$. In other words, the PWM control for the transistor Q2 is performed to produce a period in which the transistor Q2 is turned off without fail.

As a result, in regeneration periods, the transistor Q2 is turned off without fail. Therefore, during a period in which the transistor Q2 is off (mode II period), current I2 flows from the ground to the battery B via the transistor Q1 (parasitic diode D1) and the coil L, whereby the electromagnetic energy accumulated in the coil L can be absorbed by the battery B.

Further, when the parasitic diode D1 enters an on state, the potential at the connection point between the capacitor C3 and the parasitic diode D1 attains the ground level, so that the capacitance C3 can be charged, and thus the transistor Q2 can be driven.

(2) In the sixth embodiment as well, since the transistor Q2 is turned on in regeneration periods, a reduced quantity of heat (loss) is generated by the current flowing through the transistor Q2, and therefore, efficiency can be improved.

7. Seventh Embodiment

Next, a seventh embodiment will be described with reference to FIGS. 2, 18, and 19.

The seventh embodiment is the same as the fourth embodiment in terms of configuration and control of the transistors Q1 and Q2 in regeneration periods, but differs from the fourth embodiment in terms of control of the transistors Q1 and Q2 in power generation periods.

Note that in the present embodiment the controller 20 serves as steering state judgment means and load state judgment means for judging the load state of the motor 6.

As shown in FIG. 2, the CPU 21 of the controller 20, serving as load state judgment means, judges whether heavy load or light load is imposed on the motor 6, on the basis of the detected steering torque τ (steering torque signal). In the present embodiment, zero is employed as a judgment reference value. When the steering torque τ is zero, the load imposed on the motor 6 is judged to be light. When the steering torque τ is higher than zero, the load imposed on the motor 6 is judged to be heavy.

The judgment reference value may be a value other than 0. Specifically, the judgment reference value may be determined so as to correspond to the highest load value that does not require step-up by means of the step-up circuit 100. In this case, when the detected steering torque τ is less than the judgment reference value, the load imposed on the motor 6 is judged to be light. When the detected steering torque τ is equal to or higher than the judgment reference value, the load imposed on the motor 6 is judged to be heavy.

Figure 18:
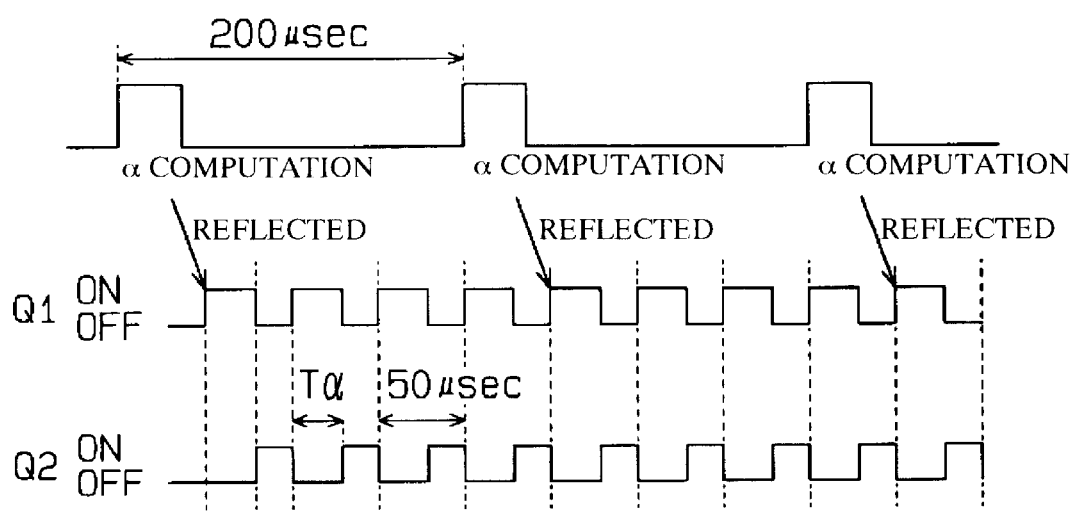
FIG. 18 is an explanatory view showing a pattern of driving the first and second transistors in a seventh embodiment for the case in which the motor is in a power generation state and in a heavy load state.

When the controller 20 judges that the motor 6 is in a power generation state and in a heavy load state, as shown in FIG. 18, the controller 20 turns the transistors Q1 and Q2 on and off alternately as in a power generation state in the fourth embodiment. Note that when the controller 20 judges that the motor 6 is in a power generation state and in a heavy load state, the controller 20 may turn the transistor Q1 on and off, while maintaining the transistor Q2 off continuously, as in a power generation state in the second embodiment (FIG. 7).

Figure 19:
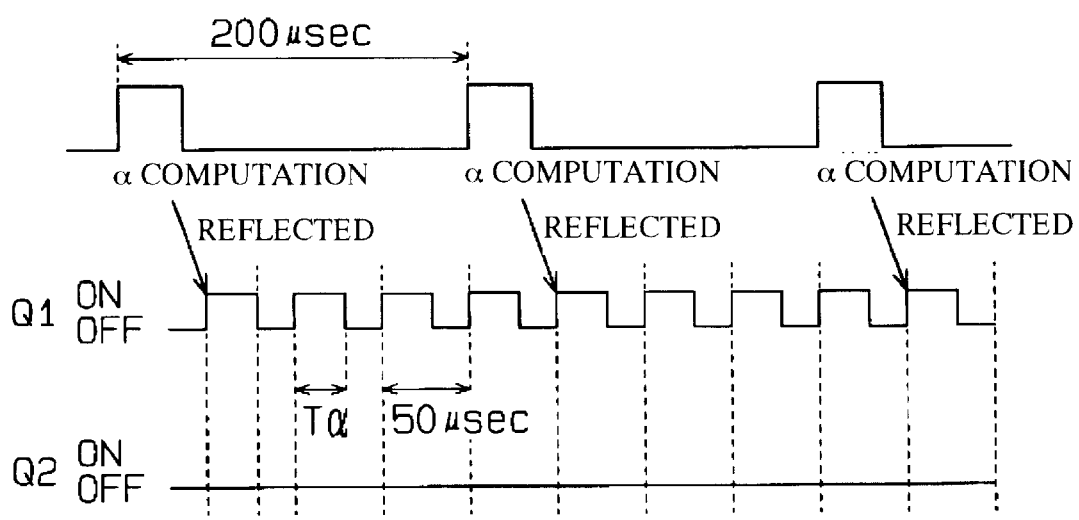
FIG. 19 is an explanatory view showing a pattern of driving the first and second transistors in the seventh embodiment in which the motor is in a power generation state and in a light load state.

When the controller 20 judges that the motor 6 is in a power generation state and in a light load state, as shown in FIG. 19, the controller 20 applies respective duty-ratio drive signals to the transistors Q1 and Q2 in such a manner that the transistor Q1 is turned on and off through PWM control, and the transistor Q2 is maintained off continuously.

As a result, when the motor 6 is in a light load state, the transistor Q2 is maintained off continuously, and is not turned on.

The seventh embodiment achieves the following effects.

(1) The seventh embodiment includes the controller 20 (steering state judgment means) which judges the state of the motor 6 (power generation state or regeneration state) on the basis of the difference between the target output voltage $V_{BPIG}^*$ and the detected output voltage $V_{BPIG}$. Further, the controller 20 is configured to judge whether the motor 6 is in a light load state or a heavy load state on the basis of steering torque τ (steering torque signal) (load state judgment means).

When the controller 20 judges that the motor 6 is in a power generation state and in a light load state, the controller 20 controls the transistors Q1 and Q2 in such a manner that only the transistor Q1 (first switching element) is turned on and off (PWM control), and the transistor Q2 is maintained off continuously. When the controller 20 judges that the motor 6 is in a power generation state and in a heavy load state, the controller 20 turns the transistors Q1 and Q2 on and off alternately (PWM control).

Meanwhile, when the controller 20 judges that the motor 6 is in a regeneration state, the controller 20 turns only the transistor Q2 (second switching element) on and off (PWM control).

As result, when the motor 6 is in a power generation state and in a light load state (in the present embodiment, in a no load state), the transistor Q2 is maintained off continuously. Therefore, no heat is generation by the transistor Q2, and no switching loss is produced, whereby efficiency can be improved.

Further, when the steering torque τ becomes zero, the duty ratio α of the transistor Q1 becomes 0% (on-duty time Tα=0), so that the transistor Q1 is maintained off continuously, and switching loss of the transistor Q1 becomes zero.

(2) In regeneration periods, the same effect as in regeneration periods in the fourth embodiment can be attained.

8. Eighth Embodiment

Next, an eighth embodiment will be described.

In the seventh embodiment, a charge pump is used as a power source for the transistor Q2. The eighth embodiment differs from the seventh embodiment in that in place of the charge pump, a bootstrap circuit BS is provided as a power source for the transistor Q2. In other words, the present embodiment has the same configuration as that of the fifth embodiment.

In the eighth embodiment, when the controller 20, serving as steering state judgment means, judges that the motor 6 is in a power generation state, as in the seventh embodiment, the controller 20, serving as load state judgment means, judges whether the motor 6 is in a light load state or a heavy load state. When the controller 20 judges that the motor 6 is in a heavy load state, the controller 20 supplies duty-ratio drive signals shown in FIG. 18 to the transistors Q1 and Q2 as in the seventh embodiment. When the controller 20 judges that the motor 6 is in a light load state, the controller 20 supplies duty-ratio drive signals shown in FIG. 19 to the transistors Q1 and Q2 as in the seventh embodiment.

Moreover, when the controller 20 judges that the motor 6 is in a regeneration state, the controller 20 supplies duty-ratio drive signals shown in FIG. 13 to the transistors Q1 and Q2 as in the fifth embodiment.

The eighth embodiment has the following features.

(1) The eighth embodiment includes the controller 20 (steering state judgment means) which judges the state of the motor 6 (power generation state or regeneration state) on the basis of the difference between the target output voltage $V_{BPIG}^*$ and the detected output voltage $V_{BPIG}$. Further, the first and second switching elements are constituted by the transistors Q1 and Q2, each of which is an n-channel MOSFET. Moreover, the bootstrap circuit BS is connected to a line extending between the battery B and the drain of the transistor Q1 in order to generate voltage to be applied to the gate of the transistor Q2. The bootstrap circuit BS includes the capacitor C3 (bootstrap capacitor) and applies the potential of the capacitor C3 to the gate of the transistor Q2 (second switching element).

When the controller 20 judges that the motor 6 is in a power generation state and in a light load state, the controller 20 controls the transistors Q1 and Q2 in such a manner that only the transistor Q1 (first switching element) is turned on and off (PWM control), and the transistor Q2 is maintained off continuously. When the controller 20 judges that the motor 6 is in a power generation state and in a heavy load state, the controller 20 turns the transistors Q1 and Q2 on and off alternately (PWM control).

As a result, the same effect as that of the seventh embodiment mentioned in section (1) of the description for the seventh embodiment is achieved.

(2) Further, when the controller 20 judges that the motor 6 is in a regeneration state, the controller 20 controls the transistors Q1 and Q2 in such a manner that a first period Ta in which the transistors Q1 and Q2 are turned on and off at a fixed duty ratio α1 and a second period Tb in which the transistor Q1 is maintained off and only the transistor Q2 is turned on and off are repeated.

As a result, the same effect as that of the fifth embodiment mentioned in section (1) of the description for the fifth embodiment is achieved.

9. Ninth Embodiment

Next, a ninth embodiment will be described.

The ninth embodiment is the same as the eighth embodiment in terms of hardware configuration and control in power generation periods. However, the ninth embodiment differs from the eighth embodiment in terms of control in regeneration periods.

In the present embodiment as well, the controller 20 serves as steering state judgment means and load state judgment means.

When the controller 20 judges that the motor 6 is in a regeneration state, the controller 20 supplies duty-ratio drive signals shown in FIG. 15 to the transistors Q1 and Q2 as in the sixth embodiment.

The ninth embodiment has the following features.

(1) The ninth embodiment includes the controller 20 (steering state judgment means) which judges the state of the motor 6 (power generation state or regeneration state) on the basis of the difference between the target output voltage $V_{BPIG}^*$ and the detected output voltage $V_{BPIG}$. Further, the first and second switching elements are constituted by the transistors Q1 and Q2, each of which is an n-channel MOSFET. Moreover, the bootstrap circuit BS is connected to a line extending between the battery B and the drain of the transistor Q1 in order to generate voltage to be applied to the gate of the transistor Q2. The bootstrap circuit BS includes the capacitor C3 (bootstrap capacitor) and applies the potential of the capacitor C3 to the gate of the transistor Q2 (second switching element).

When the controller 20 judges that the motor 6 is in a power generation state and in a light load state, the controller 20 controls the transistors Q1 and Q2 in such a manner that only the transistor Q1 (first switching element) is turned on and off (PWM control), and the transistor Q2 is maintained off continuously. When the controller 20 judges that the motor 6 is in a power generation state and in a heavy load state, the controller 20 turns the transistors Q1 and Q2 on and off alternately (PWM control).

As a result, the same effect as that of the seventh embodiment mentioned in section (1) of the description for the seventh embodiment is achieved.

(2) Further, when the controller 20 judges that the motor 6 is in a regeneration state, the controller 20 maintains the transistor Q1 off continuously and performs PWM control for the transistor Q2 (second switching element) in order to turn the same on and off. In the PWM control, the duty ratio is restricted so as not to exceed the predetermined duty ratio (1−αg). In other words, the PWM control for the transistor Q2 is performed so as to produce a period in which the transistor Q2 is turned off without fail.

As a result, in a regeneration period, the transistor Q2 is turned off without fail. Therefore, during a period in which the transistor Q2 is off (mode II period), current I2 flows from the ground to the battery B via the transistor Q1 (parasitic diode D1) and the coil L, whereby the electromagnetic energy accumulated in the coil L can be absorbed by the battery B.

Further, when the parasitic diode D1 enters an on state, the potential at the connection point between the capacitor C3 and the parasitic diode D1 attains the ground level, so that the capacitor C3 can be charged, and thus the transistor Q2 can be driven.

10. Tenth Embodiment

Figure 20:
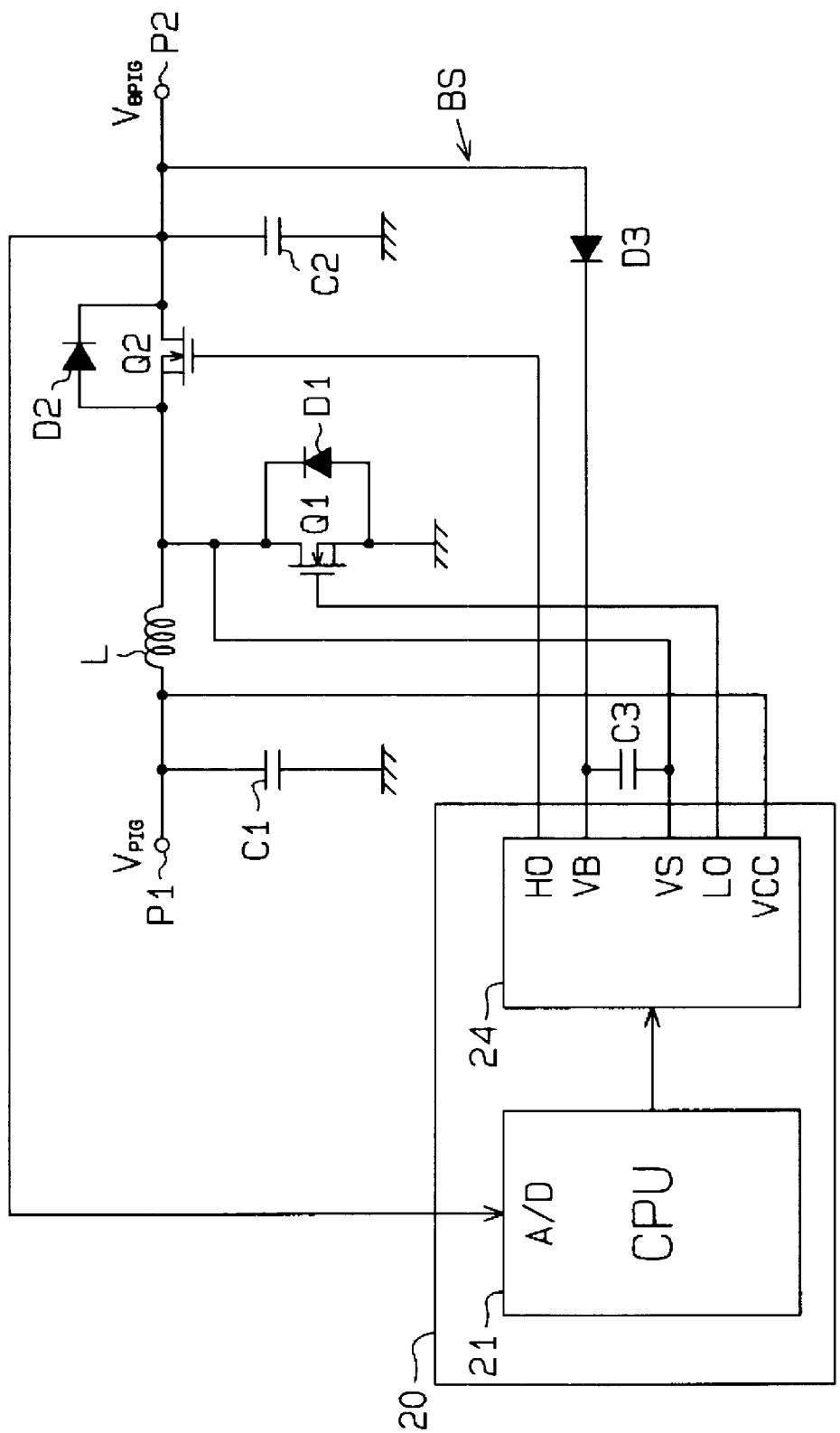
FIG. 20 is a circuit diagram of a step-up circuit according to a tenth embodiment.

Next, a tenth embodiment will be described with reference to FIGS. 12 and 20.

In the tenth present embodiment, structural elements identical with those described in the fifth embodiment are denoted by the same reference numerals. Repeated descriptions regarding such elements are omitted, and features different from those of the fifth embodiment are mainly described.

In the fifth embodiment, the anode of the diode D3 is connected to the application point P1. By contrast, in the present embodiment, the anode of the diode D3, which constitutes a bootstrap circuit BS, is connected to the voltage application point P2; i.e., the drain of the transistor Q2.

Except for the above, the present embodiment has the same configuration as that of the fifth embodiment.

For example, in accordance with the duty-ratio drive signal for the transistor Q2 output from the CPU 21, the pre-driver 24 applies voltage charged in the capacitor C3 to the gate of the transistor Q2 via the HO terminal. Further, in accordance with the duty-ratio drive signal for the transistor Q1 output from the CPU 21, the pre-driver 24 applies voltage (DC 12 V in the present embodiment) at the application point P1 to the gate of the transistor Q1 via the LO terminal.

In the present embodiment, the controller 20 serves as steering state judgment means.

<Operation>

Next, operation of the tenth embodiment having the above-described configuration will be described.

When the controller 20 judges that the motor 6 is in a power generation state, the controller 20 turns the transistors Q1 and Q2 on and off alternately, as in the fifth embodiment (see FIG. 12). As a result, accumulation of energy in the coil L and discharge of energy from the coil L are repeated, and high voltage generated by discharge appears on the drain side of the transistor Q2.

That is, when the transistor Q1 is turned on and the transistor Q2 is turned off, current flows to the ground via the transistor Q1. When the transistor Q1 is then turned off, the current flowing through the coil L is cut off. When the current flowing through the coil L is cut off, high voltage is generated on the drain side of the transistor Q2 in an on state so as to prevent magnetic flux from changing in response to cut off of the current. Through iteration of this operation, high voltage is generated repeatedly on the drain side of the transistor Q2. The high voltage is smoothed by means of the capacitor C2 and is fed to the point P2 as output voltage $V_{BPIG}$.

Since the drain potential of the transistor Q2 increases in the above-described manner, the potential of the capacitor C3 of the bootstrap circuit BS also increases by the action of the bootstrap. Specifically, when the transistor Q1 is turned on, the drain of the transistor Q1 assumes the ground potential. As a result, the capacitor C3 is charged to the potential at the voltage application point P2 (drain potential of the transistor Q2). When the transistor Q1 is turned off, the drain potential of the transistor Q1 increases to 12 V, so that the potential at the connection point between the diode D3 and the capacitor C3 increases to "12 V+the drain potential of the transistor Q2."

In this manner, when the transistor Q1 is turned off, the potential at the connection point between the diode D3 and the capacitor C3 becomes higher than the source potential of the transistor Q2.

Accordingly, when the voltage of the capacitor C3 is applied to the gate of the transistor Q2 in accordance with the duty-ratio drive signal (on level) for the transistor Q2, the transistor Q2 is turned on, because the gate potential Vg of the transistor Q2 becomes higher than the source potential Vs.

Further, when the controller 20 determines that the motor 6 is in a regeneration state, the controller 20 maintains the transistor Q1 off continuously, and turns the transistor Q2 on and off (PWM control).

In this case, even when the transistor Q1 is maintained off continuously, the drain potential of the transistor Q2 increases due to regenerative power generated at the motor 6. Therefore, when the transistor Q1 is turned off, the drain potential of the transistor Q1 increases to 12 V, so that the potential at the connection point between the diode D3 and the capacitor C3 increases to "12 V+the drain potential of the transistor Q2."

As a result, when the transistor Q1 is turned off, the potential at the connection point between the diode D3 and the capacitor C3 becomes higher than the source potential of the transistor Q2.

Accordingly, when the voltage of the capacitor C3 is applied to the gate of the transistor Q2 in accordance with the duty-ratio drive signal (on level) for the transistor Q2, the transistor Q2 is turned on, because the gate potential Vg of the transistor Q2 becomes higher than the source potential Vs.

Accordingly, the tenth embodiment has the following features.

(1) The tenth embodiment includes the controller 20 (steering state judgment means) which judges the state of the motor 6 (power generation state or regeneration state) on the basis of the difference between the target output voltage $V_{BPIG}^*$ and the detected output voltage $V_{BPIG}$.

The first and second switching elements are constituted by the transistors Q1 and Q2, each of which is an n-channel MOSFET. Further, the bootstrap circuit BS including the capacitor C3 (bootstrap capacitor) is connected to the drain of the transistor Q2. In order to use the bootstrap circuit BS as a drive source for the transistor Q2 (second switching element), the capacitor C3 is connected to the gate of the transistor Q2 such that the potential of the capacitor C3 is applied to the gate of the transistor Q2.

Meanwhile, when the controller 20 judges that the motor 6 is in a power generation state, the controller 20 turns the transistors Q1 and Q2 on and off alternately. When the controller 20 judges that the motor 6 is in a regeneration state, the controller 20 turns only the transistor Q2 on and off.

As a result, in the tenth embodiment as well, even when the transistor Q1 is maintained off continuously in a regeneration period, the drain potential of the transistor Q2 increases due to regenerative power, so that the gate potential Vg of the transistor Q2 becomes higher than the source potential Vs. Therefore, the transistor Q2 can be turned on and off, whereby regenerative current can be absorbed by the battery.

(2) The tenth embodiment has the following advantage as compared with the case in which the bootstrap circuit BS is connected as in the fifth embodiment.

In the fifth embodiment, in regeneration periods, a first period Ta in which the transistor Q1 is subjected to PWM control of the fixed duty ratio α1 is provided in order to enable on-off drive of the transistor Q2 even when the capacitor C3 is discharged in a second period Tb. By contrast, in the tenth embodiment, since the transistor Q1 can be maintained off continuously, no heat is generated by the transistor Q1, whereby efficiency can be improved.

(3) When a charge pump scheme is employed, cost of the circuit increases. In the tenth embodiment, a charge pump scheme is not employed, and a simple circuit consisting of a diode and a capacitor is used. Therefore, the step-up circuit 100 can be fabricated inexpensively as compared with the case in which a charge pump scheme is employed. Further, in regeneration periods, performance comparable to that of the charge pump scheme can be obtained.

11. Eleventh Embodiment

Next, an eleventh embodiment will be described with reference to FIGS. 21 and 22.

The eleventh embodiment has the same configuration as those of the first and second embodiments but differs from these embodiments in that the target output voltage $V_{BPIG}^*$ is variable. Mainly this difference will be described.

The controller 20 according to the present embodiment will be described.

Figure 21:
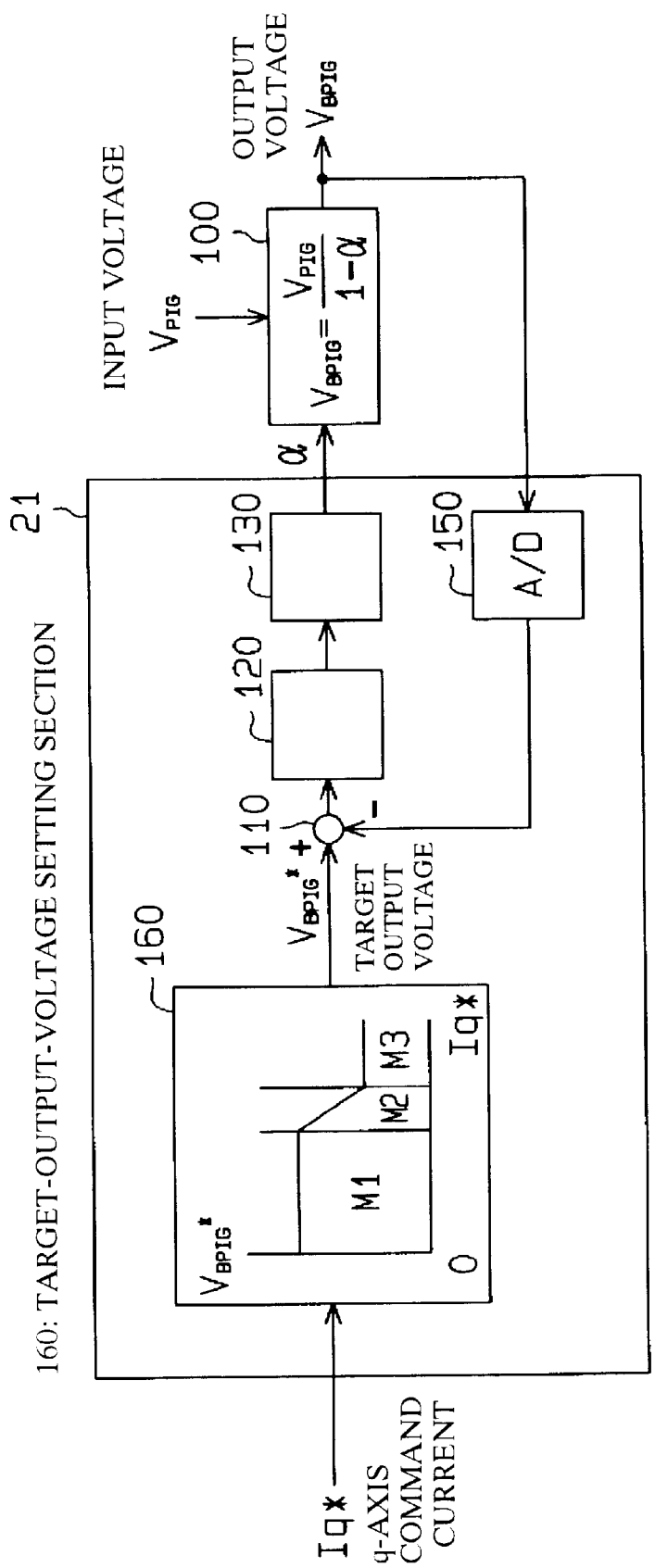
FIG. 21 is a control block diagram of the controller during step-up operation in an eleventh embodiment.

FIG. 21 shows a functional block diagram of the controller 20. That is, FIG. 21 shows a control block diagram showing functions realized through execution of a program in the CPU 21.

The respective blocks shown the control block diagram do not represent independent hardware units but represent functions realized by means of the CPU 21. The controller 20 serves as step-up circuit control means.

The CPU 21 includes a target-output-voltage setting section 160, a computing unit 110, a PID control section 120, a PWM computation section 130, and an A/D conversion section 150.

The computing unit 110, the PID control section 120, the PWM computation section 130, and the A/D conversion section 150 have been described in the first embodiment; for details, please refer to that description.

In the first and second embodiments, the target output voltage $V_{BPIG}^*$ is maintained at a constant voltage; e.g., 20 V. By contrast, in the present embodiment, the target-output-voltage setting section 160 changes the target output voltage $V_{BPIG}^*$ in accordance with the q-axis command current Iq*. Specifically, as shown in FIG. 21, when the q-axis command current Iq* falls in a high current region M3, the target-output-voltage setting section 160 decreases the target output voltage $V_{BPIG}^*$ as compared with the case in which the q-axis command current Iq* falls in a low current region M1 or in an intermediate current region M2. The target-output-voltage setting section 160 is formed by a two-dimensional map which defines the relation between the q-axis command current Iq* and the target output voltage $V_{BPIG}^*$. The map is stored in the ROM 22. When the q-axis command current Iq* is input to the CPU 21, the CPU 21 calculates the target output voltage $V_{BPIG}^*$ with reference to the two-dimensional map.

When a large power is output for steering while the vehicle remains stationary or during low speed travel, motor-speed following capability (ability of the motor for following instructed speed) is not required, so that step-up operation is not required. In this case, the transistors Q1 and Q2 for step-up operation may be stopped completely. During low speed travel (including the case in which vehicle speed is zero), the q-axis command current Iq* enters the high current region M3. Therefore, in the high current region M3 where the q-axis command current Iq* is high, the target output voltage $V_{BPIG}^*$ is decreased. As a result, the step-up circuit 100 stops step-up operation or decreases the degree of step-up as compared with the case in which the q-axis command current Iq* falls in the region M1 or M2.

During intermediate speed travel, although the q-axis command current Iq* is not required to increase very much, the motor speed must be increased. The intermediate current region M2 is provided for such a case. In the region M2, the step-up circuit 100 increases the degree of step-up as compared with the case in which the q-axis command current Iq* falls in the region M3.

During high speed travel, motor-speed following capability is needed, and the step-up operation is required. The low current region M1 is provided for such a case. In the region M1, the step-up circuit 100 increases the degree of step-up as compared with the case in which the q-axis command current Iq* falls in the region M2.

Figure 22:
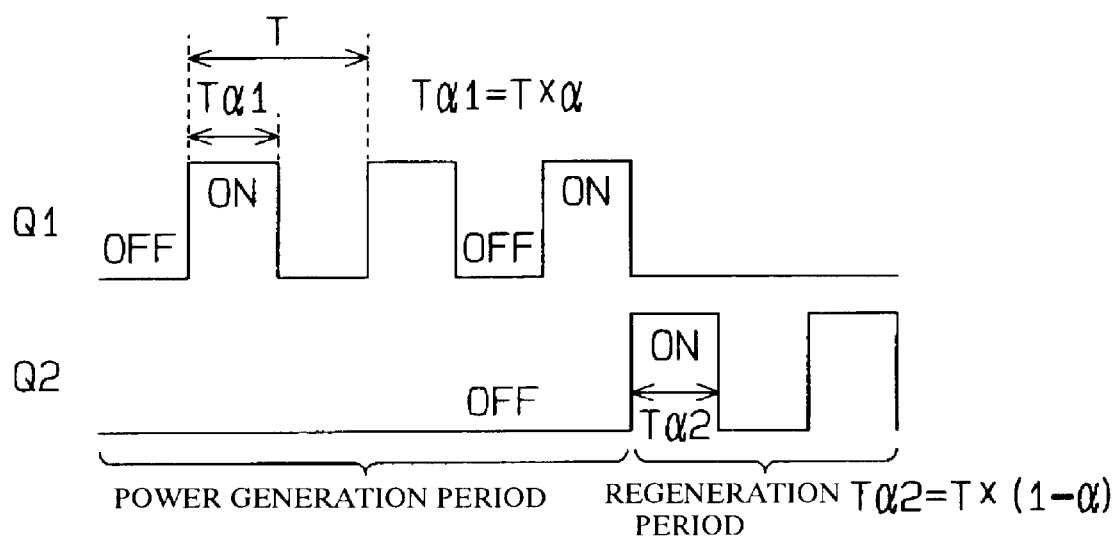
FIG. 22 is a diagram showing waveforms of duty ratio drive signals applied to the first and second transistors in the eleventh embodiment.

As shown in FIG. 22, the same controls as those in the second embodiment are performed in power generation and regeneration periods.

The eleventh embodiment has the following effects.

(1) In the eleventh embodiment as well, the same controls as those in the second embodiment are performed in power generation and regeneration periods. Therefore, the same effects as those achieved by the second embodiment can be achieved.

(2) In the eleventh embodiment, the controller 20 (step-up circuit control means) includes the target-output-voltage setting section 160 (target-output-voltage setting means) for setting the target output voltage $V_{BPIG}*$ of the step-up circuit 100; the PID control section 120 (control computation means for performing at least P control) for performing PID control computation on the basis of the difference between the target output voltage $V_{BPIG}*$ and the detected output voltage $V_{BPIG}$; and the PWM computation section 130 (PWM computation means) for performing PWM computation on the basis of the value calculated by means of the PID control section 120 and computing a duty ratio. The first and second switching elements Q1 and Q2 are turned on and off on the basis of the duty ratio α computed by means of the PWM computation section 130.

Moreover, when the q-axis command current Iq* (motor control signal), which is a parameter indicating the operation state of the motor 6, is input to the target-output-voltage setting section 160, the target-output-voltage setting section 160 changes the target output voltage $V_{BPIG}*$ in accordance with the input value.

When a large power is output for steering while the vehicle remains stationary or during low speed travel, motor-speed following capability is not required, so that step-up operation is not required. Therefore, in the high current region M3 where the q-axis command current Iq* is high, the target output voltage $V_{BPIG}*$ is decreased. Therefore, heat generation at the coil L and the transistors Q1 and Q2 can be suppressed, and loss decreases, whereby efficiency can be increased.

12. Twelfth Embodiment

Figure 23:
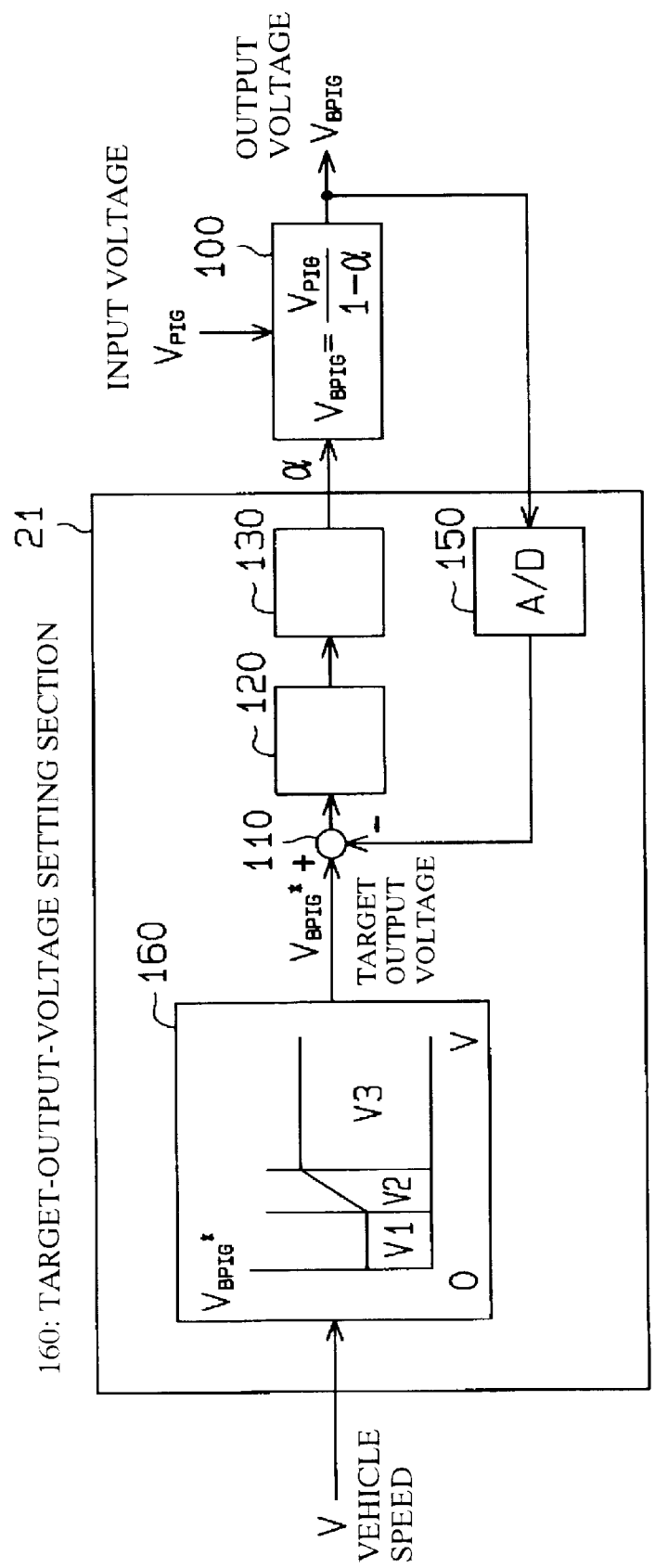
FIG. 23 is a control block diagram of the controller during step-up operation in a twelfth embodiment.

Next, a twelfth embodiment will be described with reference to FIG. 23.

The twelfth embodiment is a modification of the eleventh embodiment.

The target-output-voltage setting section 160 of the eleventh embodiment is formed by a two-dimensional map which defines the relation between q-axis command current Iq* and target output voltage $V_{BPIG}*$. By contrast, the target-output-voltage setting section 160 of the present embodiment is formed by a two-dimensional map which defines the relation between vehicle speed V and target output voltage $V_{BPIG}*$.

That is, in the present embodiment, the target-output-voltage setting section 160 changes the target output voltage $V_{BPIG}*$ in accordance with the vehicle speed V. Specifically, as shown in FIG. 23, when the vehicle speed V falls in a low speed region V1, the target-output-voltage setting section 160 decreases the target output voltage $V_{BPIG}*$ as compared with the case in which the vehicle speed V falls in an intermediate speed region V2 or in a high speed region V3. The map is stored in the ROM 22. When the vehicle speed V is input to the CPU 21, the CPU 21 calculates the target output voltage $V_{BPIG}*$ with reference to the two-dimensional map.

Accordingly, the apparatus of the twelfth embodiment operates as follows.

When a large power is output for steering while the vehicle remains stationary or during low speed travel, the motor 6 is not required to have rotational-speed following capability, so that step-up operation is not required. Therefore, during low speed travel (including the case in which vehicle speed is zero), the transistors Q1 and Q2 for step-up operation may be stopped completely. The low speed region V1 is provided for such low speed traveling. In the low speed region V1, the target output voltage $V_{BPIG}*$ is decreased, so that the step-up circuit 100 stops step-up operation or decreases the degree of step-up as compared with the case in which the vehicle speed V falls in the region V2 or V3.

During intermediate speed traveling, only the motor speed must be increased. The intermediate speed region V2 is provided for such a case. In the intermediate speed region V2, the step-up circuit 100 increases the degree of step-up as compared with the case in which the vehicle speed V falls in the region V1.

During high speed travel, motor-speed following capability is needed. The high speed region V3 is provided for such a case. In the high speed region V3, the step-up circuit 100 increases the degree of step-up as compared with the case in which the vehicle speed V falls in the region V2.

The same controls as those in the eleventh embodiment shown in FIG. 22 are performed in power generation and regeneration periods.

Therefore, the twelfth embodiment has the following effects.

(1) The same effects as those of the eleventh embodiment mentioned in section (1) of the description for the eleventh embodiment.

(2) In the twelfth embodiment, the controller 20 (step-up circuit control means) includes the target-output-voltage setting section 160 (target-output-voltage setting means) for setting the target output voltage $V_{BPIG}*$ of the step-up circuit 100; the PID control section 120 (control computation means for performing at least P control) for performing PID control computation on the basis of the difference between the target output voltage $V_{BPIG}*$ and the detected output voltage $V_{BPIG}$; and the PWM computation section 130 (PWM computation means) for performing PWM computation on the basis of the value calculated by means of the PID control section 120 and computing a duty ratio. The first and second switching elements Q1 and Q2 are turned on and off on the basis of the duty ratio α computed by means of the PWM computation section 130.

Moreover, when the vehicle speed V, which is a parameter indicating the operation state of the motor 6, is input to the target-output-voltage setting section 160, the target-output-voltage setting section 160 changes the target output voltage $V_{BPIG}*$ in accordance with the input value.

As a result, in the twelfth embodiment, when a large power is output for steering while the vehicle remains stationary or during low speed travel, the target output voltage $V_{BPIG}*$ is decreased. Therefore, heat generation at the coil L and the transistors Q1 and Q2 can be suppressed, and loss decreases, whereby efficiency can be increased.

13. Thirteenth Embodiment

Figure 24:
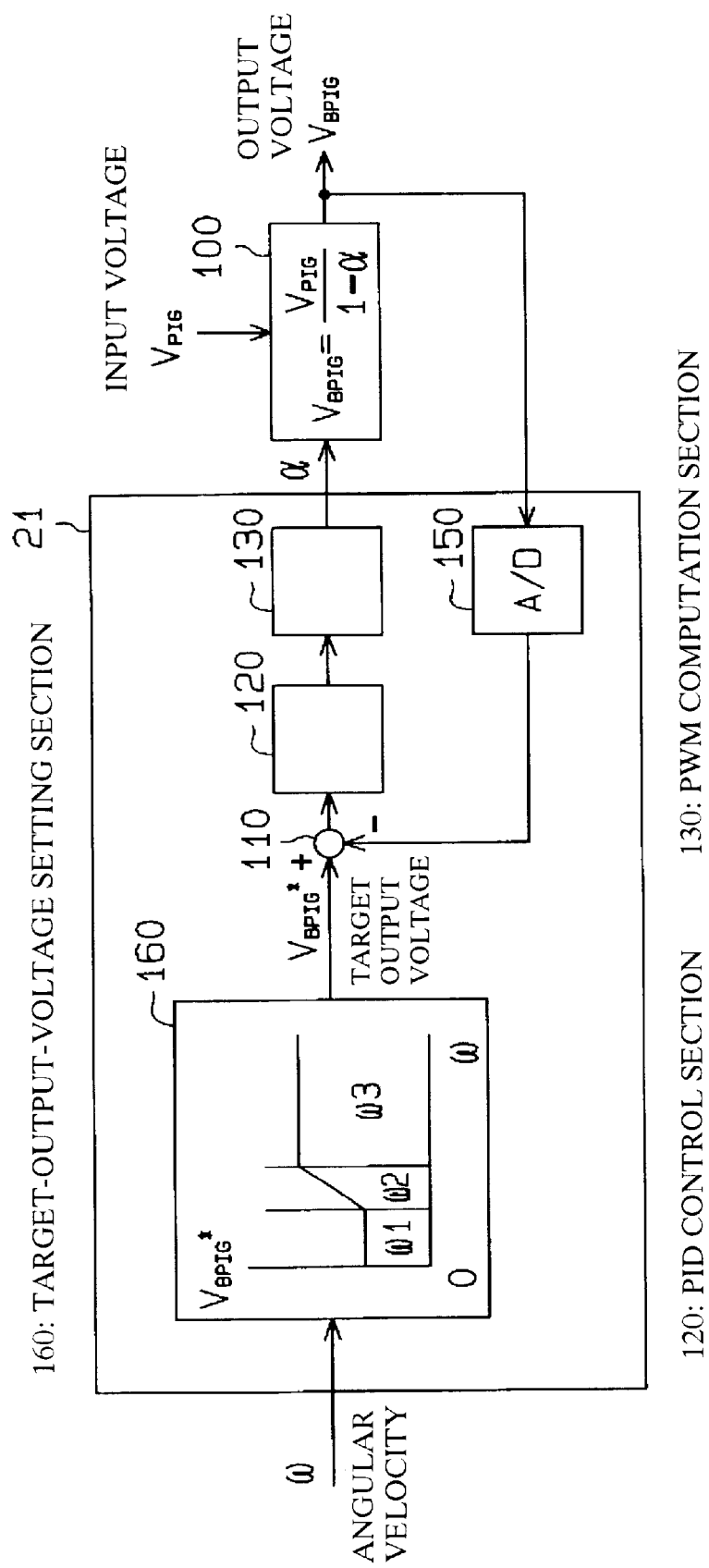
FIG. 24 is a control block diagram showing functions which are realized by the CPU in a thirteenth embodiment.

Next, a thirteenth embodiment will be described with reference to FIG. 24.

The thirteenth embodiment is a modification of the eleventh embodiment.

The target-output-voltage setting section 160 of the eleventh embodiment is formed by a two-dimensional map which defines the relation between q-axis command current Iq* and target output voltage $V_{BPIG}*$. By contrast, the target-output-voltage setting section 160 of the present embodiment is formed by a two-dimensional map which defines the relation between angular velocity ω (motor angular velocity) and target output voltage $V_{BPIG}*$.

That is, in the present embodiment, the target-output-voltage setting section 160 changes the target output voltage $V_{BPIG}*$ in accordance with the angular velocity ω. Specifically, as shown in FIG. 24, when the angular velocity ω falls in a low velocity region ω1, the target-output-voltage setting section 160 decreases the target output voltage $V_{BPIG}*$ as compared with the case in which the angular velocity ω falls in an intermediate velocity region ω2 or in a high velocity region ω3. The map is stored in the ROM 22. When the angular velocity ω is input to the CPU 21, the CPU 21 calculates the target output voltage $V_{BPIG}*$ with reference to the two-dimensional map.

Accordingly, the apparatus of the thirteenth embodiment operates as follows.

The problem of low motor-speed following capability may occur when the motor 6 rotates at high speed, depending on whether or not current can flow into the unillustrated winding of the motor 6. Therefore, the rotational-speed following capability of the motor 6 is improved by increasing the output voltage in accordance with the motor angular velocity ω.

When the motor angular velocity ω falls within the low velocity region ω1, step-up operation is not required. Therefore, in such a case, the transistors Q1 and Q2 for step-up operation may be stopped completely. In the low velocity region ω1, the target output voltage $V_{BPIG}*$ is decreased, so that the step-up circuit 100 stops step-up operation or decreases the degree of step-up as compared with the case in which the angular velocity ω falls in the region ω2 or ω3.

When the motor angular velocity ω falls within the high velocity region ω3, step-up operation is required. Therefore, in the high velocity region ω3, an increased target output voltage $V_{BPIG}*$ is applied to the step-up circuit 100, so that the step-up circuit 100 performs step-up operation at a step-up ratio greater than that in the region ω1. In the intermediate velocity region ω2, the target output voltage $V_{BPIG}*$ is adjusted in such a manner that the step-up circuit 100 performs step-up operation at a step-up ratio greater than that in the region ω1 and less than that in the region ω3.

The same controls as those in the eleventh embodiment shown in FIG. 22 are performed in power generation and regeneration periods.

Therefore, the thirteenth embodiment has the following effects.

(1) The same effects as those of the eleventh embodiment mentioned in section (1) of the description for the eleventh embodiment.

(2) In the thirteenth embodiment, the controller 20 (step-up circuit control means) includes the target-output-voltage setting section 160 (target-output-voltage setting means) for setting the target output voltage $V_{BPIG}*$ of the step-up circuit 100; the PID control section 120 (control computation means for performing at least P control) for performing PID control computation on the basis of the difference between the target output voltage $V_{BPIG}*$ and the detected output voltage $V_{BPIG}$; and the PWM computation section 130 (PWM computation means) for performing PWM computation on the basis of the value calculated by means of the PID control section 120 and computing a duty ratio. The first and second switching elements Q1 and Q2 are turned on and off on the basis of the duty ratio α computed by means of the PWM computation section 130.

Moreover, when the motor angular velocity ω, which is a parameter indicating the operation state of the motor 6, is input to the target-output-voltage setting section 160, the target-output-voltage setting section 160 changes the target output voltage $V_{BPIG}*$ in accordance with the input value. As a result, in the thirteenth embodiment, the rotational-speed following capability of the motor 6 can be improved by increasing the output voltage in accordance with the motor angular velocity ω. Moreover, since the output voltage is increased through step-up operation only when high voltage is required, the heat generation at the coil L and the transistors Q1 and Q2 can be suppressed, as compared with the case in which step-up operation is performed at all times.

14. Fourteenth Embodiment

Figure 25:
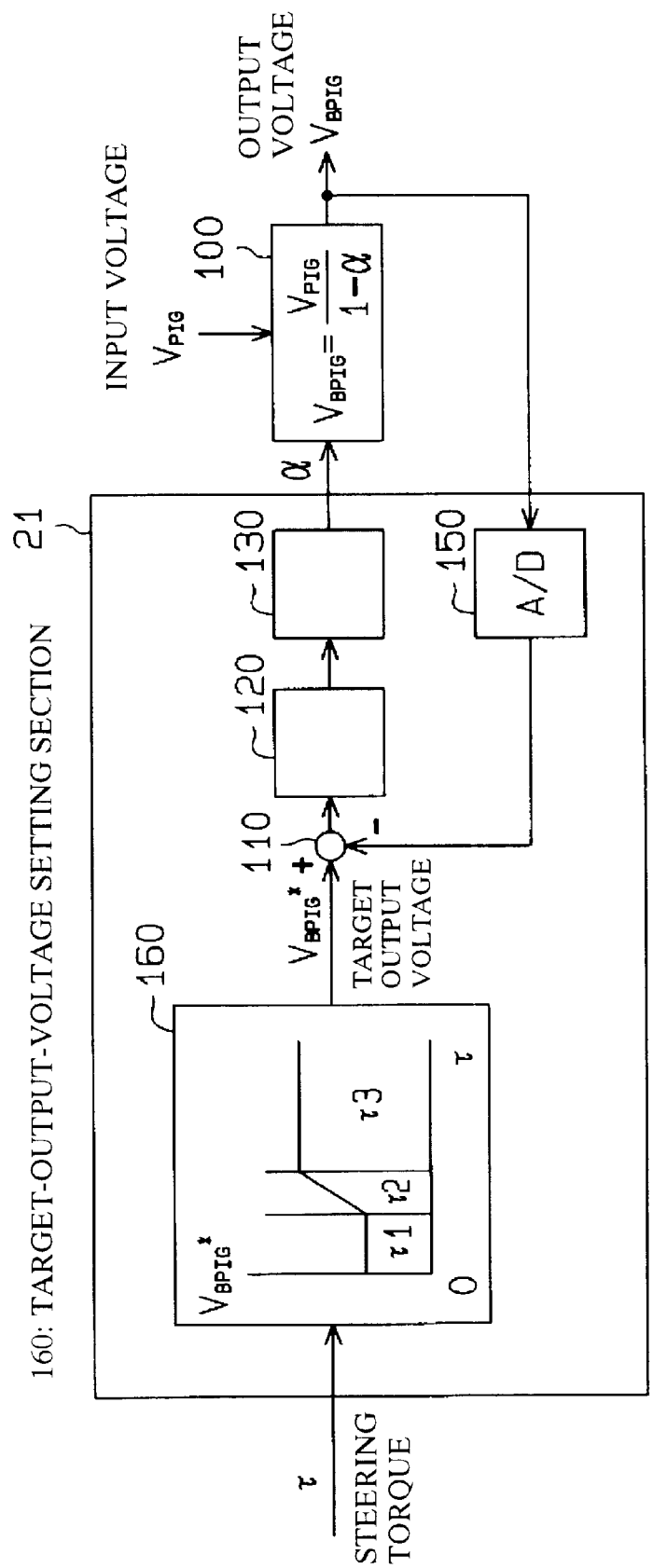
FIG. 25 is a control block diagram showing functions which are realized by the CPU in a fourteenth embodiment.

Next, a fourteenth embodiment will be described with reference to FIG. 25.

The fourteenth embodiment is a modification of the eleventh embodiment.

The target-output-voltage setting section 160 of the eleventh embodiment is formed by a two-dimensional map which defines the relation between q-axis command current Iq* and target output voltage $V_{BPIG}*$. By contrast, the target-output-voltage setting section 160 of the present embodiment is formed by a two-dimensional map which defines the relation between steering torque τ and target output voltage $V_{BPIG}*$.

That is, in the present embodiment, the target-output-voltage setting section 160 changes the target output voltage $V_{BPIG}*$ in accordance with the steering torque τ. Specifically, as shown in FIG. 25, when the steering torque τ falls in a low torque region τ1, the target-output-voltage setting section 160 decreases the target output voltage $V_{BPIG}*$ as compared with the case in which the steering torque τ falls in an intermediate torque region τ2 or in a high torque region τ3. The map is stored in the ROM 22. When the steering torque τ is input to the CPU 21, the CPU 21 calculates the target output voltage $V_{BPIG}*$ with reference to the two-dimensional map.

Accordingly, the apparatus of the fourteenth embodiment operates as follows.

The problem of low motor-speed following capability may occur when the motor 6 rotates at high speed and a large counter electromotive force is produced. In such a case, causing current to flow into the motor 6 becomes impossible, so that assist force decreases, and steering torque increases.

Therefore, the steering torque τ is monitored, and the output voltage is increased in accordance with the steering torque τ in order to enable current to flow into the motor 6, to thereby improve the following capability.

Specifically, the rotational-speed following capability of the motor 6 is improved by increasing the output voltage in accordance with the steering torque τ.

When the steering torque τ falls within the low torque region τ1, step-up operation is not required. Therefore, in such a case, the transistors Q1 and Q2 for step-up operation may be stopped completely. In the low torque region τ1, the target output voltage $V_{BPIG}*$ is decreased, so that the step-up circuit 100 stops step-up operation or decreases the degree of step-up as compared with the case in which the steering torque τ falls in the region τ2 or τ3.

When the steering torque τ falls within the high torque region τ3, step-up operation is required. Therefore, in the high torque region τ3, an increased target output voltage $V_{BPIG}*$ is applied to the step-up circuit 100, so that the step-up circuit 100 performs step-up operation at a step-up ratio greater than that in the region τ1. In the intermediate torque region τ2, the target output voltage $V_{BPIG}{}^*$ is adjusted in such a manner that the step-up circuit 100 performs step-up operation at a step-up ratio greater than that in the region τ1 and less than that in the region τ3.

The same controls as those in the eleventh embodiment shown in FIG. 22 are performed in power generation and regeneration periods.

Therefore, the fourteenth embodiment has the following effects.

(1) The same effects as those of the eleventh embodiment mentioned in section (1) of the description for the eleventh embodiment.

(2) In the fourteen embodiment, the controller 20 (step-up circuit control means) includes the target-output-voltage setting section 160 (target-output-voltage setting means) for setting the target output voltage $V_{BPIG}{}^*$ of the step-up circuit 100; the PID control section 120 (control computation means for performing at least P control) for performing PID control computation on the basis of the difference between the target output voltage $V_{BPIG}{}^*$ and the detected output voltage $V_{BPIG}$; and the PWM computation section 130 (PWM computation means) for performing PWM computation on the basis of the value calculated by means of the PID control section 120 and computing a duty ratio. The first and second switching elements Q1 and Q2 are turned on and off on the basis of the duty ratio α computed by means of the PWM computation section 130.

Moreover, when the steering torque τ, which is a parameter indicating the traveling conditions of the vehicle, is input to the target-output-voltage setting section 160, the target-output-voltage setting section 160 changes the target output voltage $V_{BPIG}{}^*$ in accordance with the input value.

As a result, in the fourteenth embodiment, the rotational-speed following capability of the motor 6 can be improved by increasing the output voltage in accordance with the steering torque τ. Moreover, since the output voltage is increased through step-up operation only when high voltage is required, the heat generation at the coil L and the transistors Q1 and Q2 can be suppressed, as compared with the case in which step-up operation is performed at all times.

15. Fifteenth Embodiment

Figure 26:
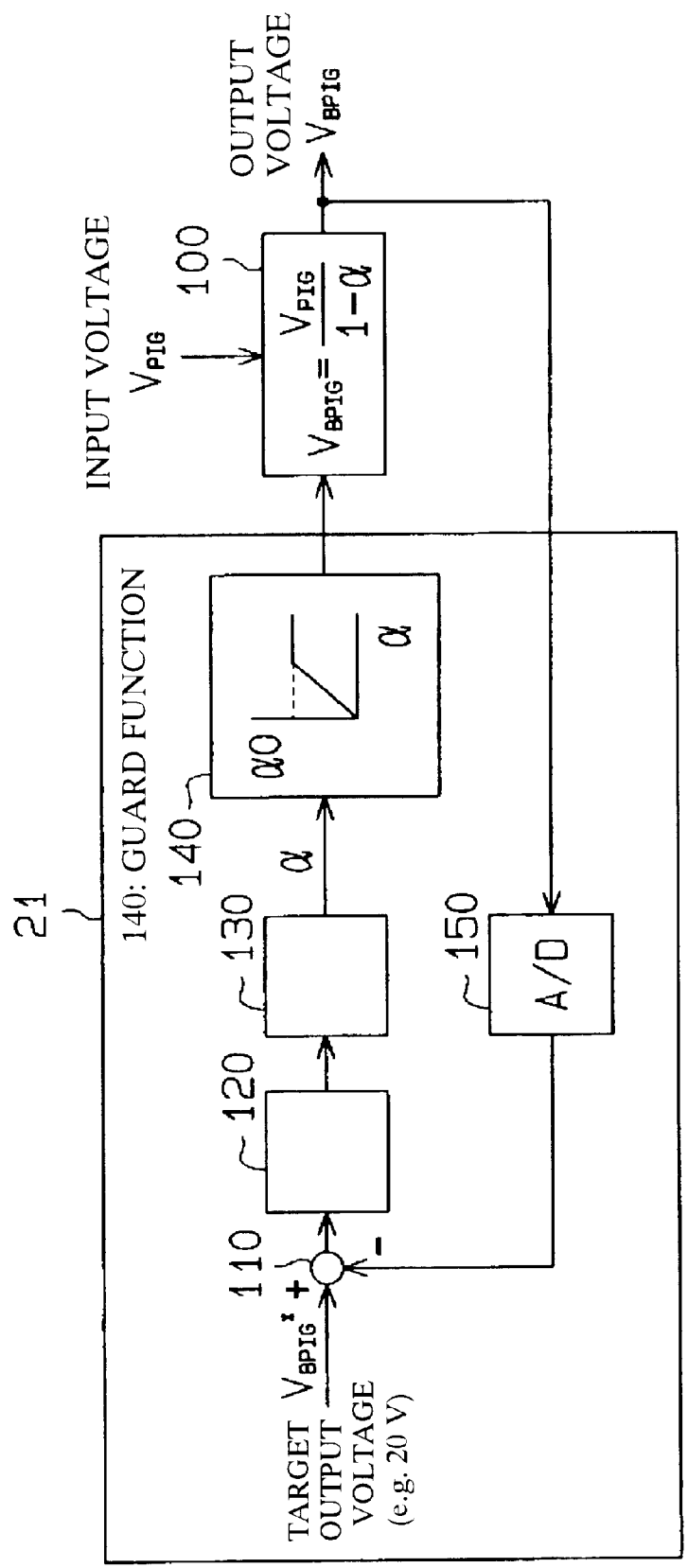
FIG. 26 is a control block diagram showing functions which are realized by the CPU in a fifteenth embodiment.

Next, a fifteenth embodiment will be described with reference to FIG. 26.

The fifteenth embodiment is a modification of the second embodiment.

In the present embodiment, the guard function section 140 described in relation to the sixth embodiment (see FIG. 14) is combined with the configuration of the second embodiment. In the sixth embodiment, the guard function section 140 provides guard operation in regeneration periods only. By contrast, in the present embodiment, in both power generation and regeneration periods, the transistors Q1 and Q2 are turned on and off as shown in FIG. 7 of the second embodiment, and the guard function section 140 is operated during the on-off control.

When the duty ratio α computed by the PWM computation section 130 exceeds the guard value α0 for a certain reason, the guard function section 140 of the present embodiment decreases the duty ratio α to the guard value α0.

Accordingly, in the fifteenth embodiment, in both power generation and regeneration periods, the duty ratio α is set to the guard value α0 by means of the guard function section 140 when the duty ratio α computed by the PWM computation section 130 exceeds the guard value α0. Therefore, the output voltage of the step-up circuit 100 does not increase excessively, so that the step-up circuit 100 does not break.

Accordingly, the fifteenth embodiment achieves the following effects in addition to the effects achieved by the second embodiment.

(1) In the fifteenth embodiment, the controller 20 (step-up circuit control means) includes the target-output-voltage setting section 160 (target-output-voltage setting means) for setting the target output voltage $V_{BPIG}{}^*$ of the step-up circuit 100; the PID control section 120 (control computation means) for performing PID control computation on the basis of the difference between the target output voltage $V_{BPIG}{}^*$ and the detected output voltage $V_{BPIG}$; and the PWM computation section 130 (PWM computation means) for performing PWM computation on the basis of the value calculated by means of the PID control section 120 and computing a duty ratio. The first and second switching elements Q1 and Q2 are turned on and off on the basis of the duty ratio α computed by means of the PWM computation section 130.

The controller 20 (step-up circuit control means) restricts the duty ratio in such a manner that PWM control is not performed at a duty ratio greater than α0 (predetermined duty ratio).

When the monitored output voltage $V_{BPIG}$ assumes an anomalous value because of a failure of the RAM 23 or for any other reason, the duty ratio α computed by means of the PWM computation section 130 may increase. In the present embodiment, in such a case, the guard function section 140 restricts the duty ratio, so that breakage of the step-up circuit 100 can be prevented in both power generation and regeneration periods.

Sixteenth to Twenty-Second Embodiments

The above-described first through fifteenth embodiments are directed to embodiments of control for the step-up circuit (hereinafter referred to as "step-up control") for power generation and regeneration to be performed while assist control is being performed. By contrast, the sixteenth to twenty-second embodiments are directed to embodiments of control to be performed when the step-up circuit 100 itself breaks while the above-described step-up control is being performed.

In order to simplify description, the sixteenth to twenty-second embodiments will be described on the assumption that "ordinary step-up control" in S30, which will be described later, is the step-up control having been described in relation to the second embodiment. However, the present invention is not limited thereto; the sixteenth to twenty-second embodiments can be realized even when any of the step-up controls of the first through fifteenth embodiments is employed.

16. Sixteenth Embodiment

Next, the sixteenth embodiment will be described with reference to FIG. 27.

Figure 27:
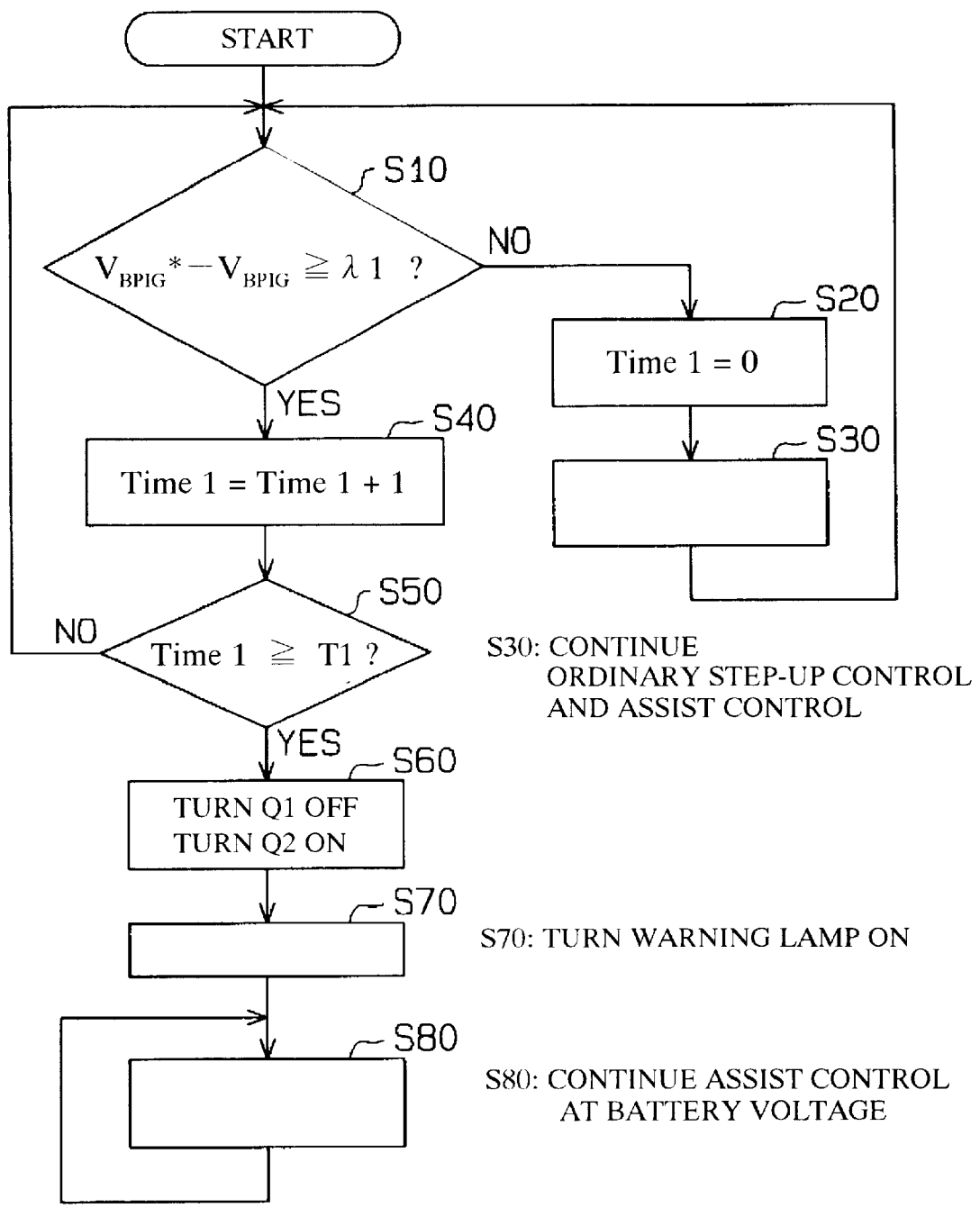
FIG. 27 is a flowchart showing control processing performed by the CPU in a sixteenth embodiment.

The sixteenth embodiment is identical with the fifteenth embodiment in terms of configuration, but differs from fifteenth embodiment in that the controller 20 performs the control shown in FIG. 27.

FIG. 27 shows a routine that the CPU 21 of the controller 20 executes in order to perform assist control and step-up control for the step-up circuit 100. This control program is stored in the ROM 22 in advance.

In step (hereinafter referred to as "S") 10, the CPU 21 judges whether the difference ($V_{BPIG}{}^*-V_{BPIG}$) between the target output voltage $V_{BPIG}{}^*$ and the detected output voltage $V_{BPIG}$ is not less than a first reference value λ1 (>0). The first reference value λ1, which is stored in the ROM 22 in advance, is a value which is previously determined through a test or any other suitable method and is used to judge whether an open failure or short failure has occurred. The term "open failure" means that a transistor is in an open state as a result of breakage. The "short failure" means that a transistor is in a shorted state as a result of breakage. In S10, the CPU 21 judges whether the transistor Q1 suffers an open failure or the transistor Q2 suffers a short failure. That is, when the transistor Q1 suffers an open failure or the transistor Q2 suffers a short failure, the output voltage $V_{BPIG}$ does not increase. Therefore, when the difference is equal to or greater than the first reference value λ1, the CPU 21 judges that the transistor Q1 suffers an open failure or the transistor Q2 suffers a short failure.

When the difference is less than the first reference value λ1, an open failure or a short failure has not occurred, and the step-up circuit 100 operates properly. In such a case, the CPU S20 resets a time-count counter Time 1 to zero in S20, performs ordinary step-up control and assist control in step S30, and then returns to S10.

In the present embodiment, a judgment value is represented by the target output voltage $V_{BPIG}^*$–the first reference value λ1, because the judgment in S10 as to whether the difference ($V_{BPIG}^* - V_{BPIG}$)≧the first reference value λ1 is equivalent to a judgment as to whether (the target output voltage $V_{BPIG}^*$–the first reference value λ1)≧the output voltage $V_{BPIG}$.

Note that the ordinary step-up control includes control in power generation periods and control in regeneration periods. Specifically, in power generation and regeneration periods, the transistors Q1 and Q2 are turned on and off in a manner as shown in FIG. 7 and described in relation to the second embodiment.

When the CPU 21 judges in S10 that the difference is not less than the first reference value λ1, the CPU 21 judges that an open failure or short failure has occurred. In such as case, the CPU 21 increments the time-count counter Time 1 in S40. In S50, the CPU 21 judges whether a predetermined time T1 has elapsed, on the basis of the time-count counter Time 1. In the case in which the open failure or short failure has not continued for the predetermined time T1, the CPU 21 judges that the step-up circuit 100 is normal, and returns to S10. The judgment in S50 as to elapsed time is performed in order to exclude the case in which an open failure or short failure having had once occurred has been resolved naturally within the predetermined time.

When the CPU 21 judges in S50 that the predetermined time T1 has elapsed, the CPU determines that the step-up circuit 100 is anomalous. In this case, in step 60, the CPU 21 stops the step-up control, maintains the transistor Q1 off continuously, and maintains the transistor Q2 on continuously. This processing turns the transistor Q1 off and turns the transistor Q2 on from the controller side, even though in actuality the transistor Q1 suffers an open failure or the transistor Q2 suffers a short failure.

Even in the case in which the transistor Q1 suffers an open failure and the transistor Q2 is normal, the transistor Q2 is turned on in order to enable regenerative current to flow to the battery B during regeneration periods.

In subsequent S70, the CPU 21 outputs a warning signal (notification signal) to an illustrated warning lamp provided on an instrument panel or the like to thereby turn on the warning lamp, and in S80, the CPU 21 executes assist control at the battery voltage (12 V).

Even when the step-up control for the step-up circuit 100 is stopped, assist control at the battery voltage is possible. Therefore, assist control at the battery voltage is performed. Therefore, during regeneration periods, regenerative current can flow to the battery B via the transistor Q2.

In the present embodiment, the controller 20 serves as the respective means described in relation to the second embodiment and further serves as status parameter detection means and judgment means.

The sixteenth embodiment achieves the following effects in addition to the effects achieved by the fifteenth embodiment.

(1) In the sixteenth embodiment, the controller 20 serves as parameter detection means for detecting the output voltage $V_{BPIG}$ (status parameter) of the step-up circuit 100 and as judgment means for comparing the output voltage $V_{BPIG}$ with the judgment value (=the target output voltage $V_{BPIG}^*$–the first reference value λ1) so as to judge whether or not the step-up circuit 100 is normal.

Further, the controller 20 serves as step-up circuit control means in order to stop the step-up control for the step-up circuit 100 on the basis of the result of the judgment (see S60).

As a result, when the step-up circuit 100 suffers a failure, the step-up control for the step-up circuit 100 can be stopped, whereby breakage of the step-up circuit 100 in an anomalous state can be prevented.

(2) In the present embodiment, when the step-up circuit 100 is not normal, this is reported by means of a warning lamp (reporting means). As a result, the failure of the step-up circuit 100 can be reported to a driver of the vehicle.

(3) In the present embodiment, when the step-up circuit 100 is not normal (in particular, when the difference between the target output voltage $V_{BPIG}^*$ and the detected output voltage $V_{BPIG}$ is not less than the first reference value λ1), the controller 20 determines that the transistor Q1 suffers an open failure or the transistor Q2 suffers a short failure.

In such a case, the controller 20 maintains the transistor Q1 (first switching element) off continuously, and maintains the transistor Q2 (second switching element) on continuously.

As a result, although assist control cannot be performed by use of boosted voltage obtained through step-up control for the step-up circuit 100, assist control can be performed continuously at the battery voltage, and during regeneration periods, regenerative current can be absorbed by the battery B.

(4) In the present embodiment, when the output voltage $V_{BPIG}$≦(the target output voltage $V_{BPIG}^*$–the first reference value λ1), a judgment can be made that the transistor Q1 suffers an open failure or the transistor Q2 suffers a short failure.

(5) In the sixteenth embodiment, the controller 20 (judgment means) judges that the step-up circuit 100 suffers a failure only when an anomalous state continues for the first predetermined time T1. Since the controller 20 does not judge that the step-up circuit 100 suffers a failure when an anomalous state does not continue for the first predetermined time T1, the case in which the anomalous state is removed within the first predetermined time T1 can be excluded.

17. Seventeenth Embodiment

Next, the seventeenth embodiment will be described with reference to FIGS. 28 and 29.

Figure 28:
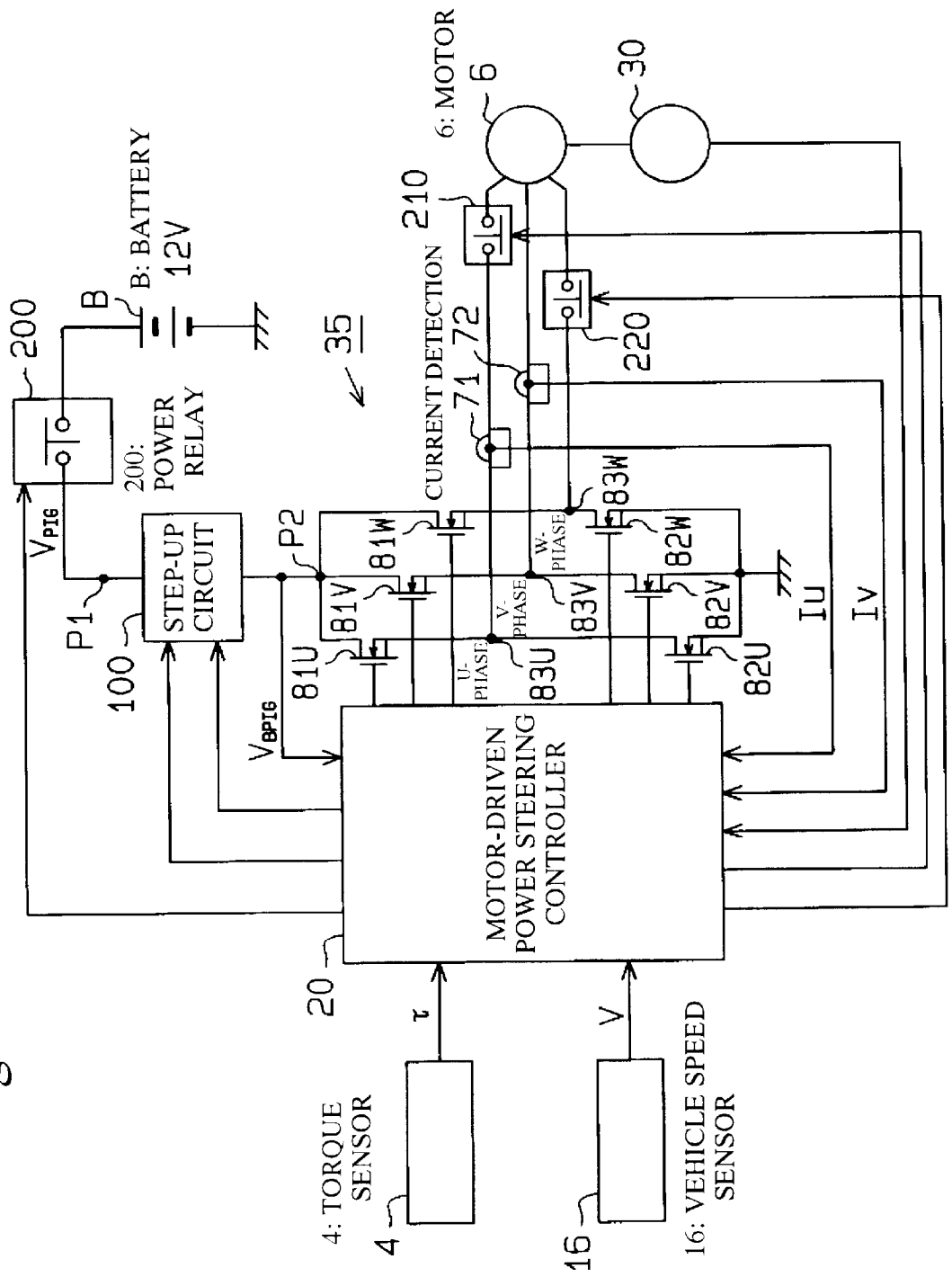
FIG. 28 is a control block diagram of a motor-driven power steering apparatus according to a seventeenth embodiment.

The seventeenth embodiment employs the hardware configuration of the sixteenth embodiment; however, as shown in FIG. 28, a power relay 200 is inserted between the battery B and the application point P1. The power relay 200 is turned on and off in accordance with a control signal from the controller 20. Note that when the controller 20 is started, the power relay 200 is turned on.

Moreover, a phase open relay 210 is inserted between the U-phase winding of the motor 6 and the connection point 83U between the FET 81U and the FET 82U of the motor drive unit 35. Similarly, a phase open relay 220 is inserted between the W-phase winding of the motor 6 and the connection point 83W between the FET 81W and the FET 82W of the motor drive unit 35. The phase open relays 210 and 220 are turned on and off in accordance with a control signal from the controller 20. Note that when the controller 20 is started, the phase open relays 210 and 220 are turned on.

The power relay 200 serves as first open-close means; and the application point P1 serves as a battery-voltage supply section. The phase open relays 210 and 220 serve as second open-close means.

Figure 29:
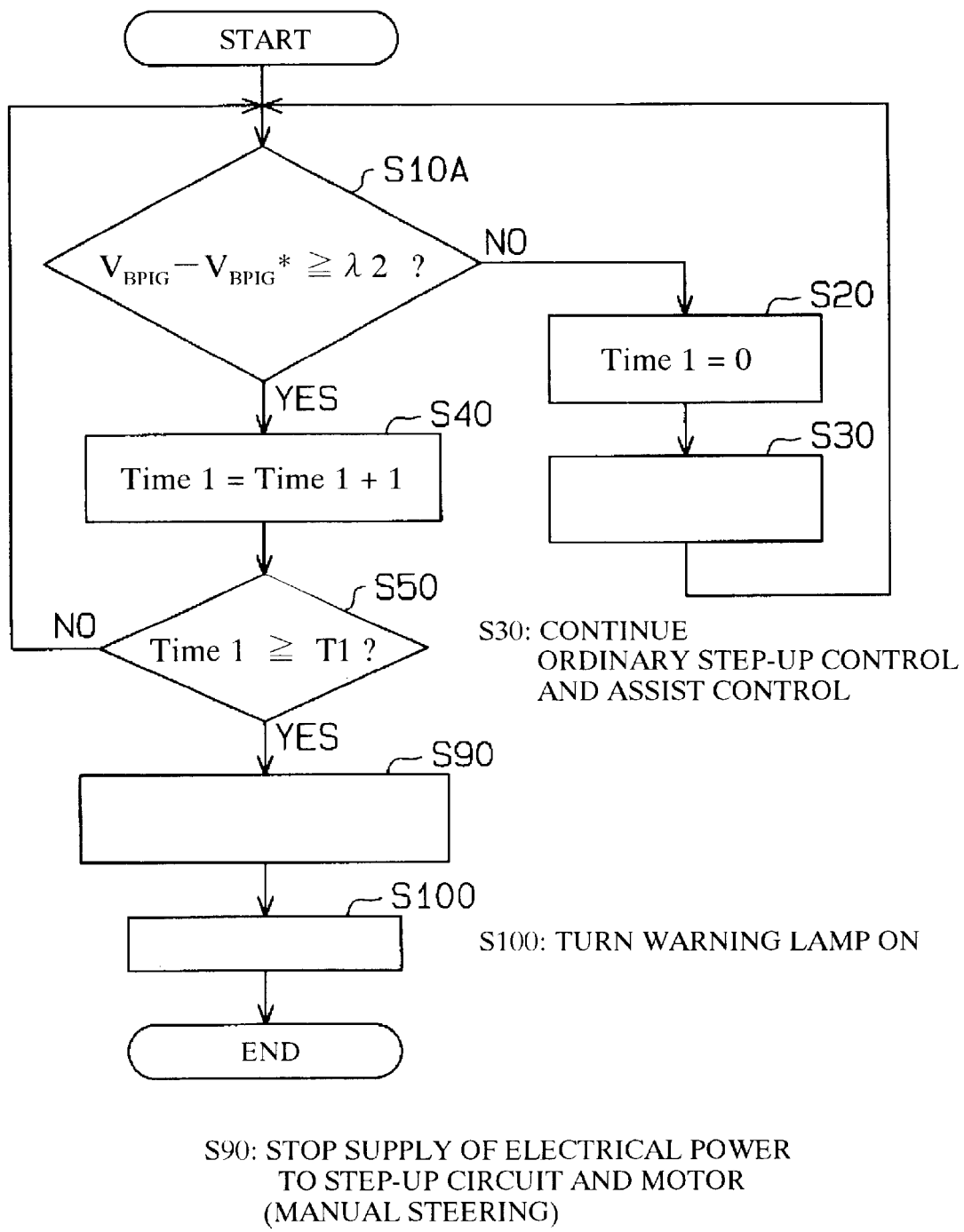
FIG. 29 is a flowchart showing control processing performed by the CPU in the seventeenth embodiment.

Moreover, as shown in FIG. 29, the control in the present embodiment differs from that in the sixteenth embodiment in that instead of the judgment in S10, a judgment in S10A is performed; and instead of the processing in S60 to S80, processing in S90 and S100 is performed, and then the control is ended. Since the remaining steps are the same, the remaining steps are denoted by the same step numbers, and their repeated descriptions are omitted (in the following embodiments as well, the same steps are denoted by the same step numbers, and their repeated descriptions are omitted).

In S10A, the CPU 21 judges whether the difference ($V_{BPIG}-V_{BPIG}^*$) between the detected output voltage $V_{BPIG}$ and he target output voltage $V_{BPIG}^*$ is not less than a second reference value $\lambda 2$ (>0). The second reference value $\lambda 2$, which is stored in the ROM 22 in advance, is a value which is previously determined through a test or any other suitable method and is used to judge whether the above-described open failure has occurred. In S10A, the CPU 21 judges whether the transistor Q2 suffers an open failure. When the transistor Q2 suffers an open failure, during regeneration periods, no regenerative current flows to the battery B, and the capacitor C2 cannot be discharged, so that the output voltage $V_{BPIG}$ increases. Therefore, when the difference is equal to or greater than the second reference value $\lambda 2$, the CPU 21 judges that the transistor Q2 suffers an open failure.

When the difference is less than the second reference value $\lambda 2$, the CPU 21 proceeds to S20. When the difference is equal to or greater than the second reference value $\lambda 2$, the CPU 21 proceeds to S50 via S40.

In the present embodiment, the judgment value is represented by the second reference value $\lambda 2$+the target output voltage $V_{BPIG}^*$, because the judgment in S10A as to whether the difference ($V_{BPIG}-V_{BPIG}^*$)≧the second reference value $\lambda 2$ is equivalent to a judgment as to whether the output voltage $V_{BPIG}$≧(the second reference value $\lambda 2$+the target output voltage $V_{BPIG}^*$).

When the CPU 21 judges in S50 that the predetermined time T1 has elapsed, the CPU 21 proceeds to S90.

In S90, the CPU 21 outputs an off control signal to the phase open relays 210 and 220 to thereby turn the phase open relays 210 and 220 off, and stops output of duty-ratio drive signals to the transistors Q1 and Q2. Simultaneously, the controller 20 turns the power relay 200 off.

As a result, the supply of electrical power to the step-up circuit 100 and the U-phase and W-phase windings of the motor 6 is stopped.

In subsequent S100, the CPU 21 outputs a warning signal (notification signal) to an illustrated warning lamp provided on an instrument panel or the like, and ends the control routine of FIG. 29.

In the present embodiment as well, the controller 20 serves as the respective means described in relation to the second embodiment and further serves as status parameter detection means and judgment means.

The seventeenth embodiment achieves the following effects in addition to the effect of the sixteenth embodiment mentioned in section (5) of the description for the sixteenth embodiment.

(1) In the sixteenth embodiment, the controller 20 serves as parameter detection means for detecting the output voltage $V_{BPIG}$ (status parameter) of the step-up circuit 100 and as judgment means for comparing the output voltage $V_{BPIG}$ with the judgment value (=the second reference value $\lambda 2$+the target output voltage $V_{BPIG}^*$) so as to judge whether or not the step-up circuit 100 is normal.

Further, the controller 20 serves as step-up circuit control means in order to stop the step-up control for the step-up circuit 100 on the basis of the result of the judgment (see S90).

As a result, when the step-up circuit 100 suffers a failure, the step-up control for the step-up circuit 100 can be stopped.

(2) As in the sixteenth embodiment, when the step-up circuit 100 is not normal, this is reported by means of a warning lamp (reporting means). As a result, the failure of the step-up circuit 100 can be reported to a driver of the vehicle.

(3) In the present embodiment, when the step-up circuit 100 is not normal (in particular, when the difference between the detected output voltage $V_{BPIG}$ and the target output voltage $V_{BPIG}^*$ is not less than the second reference value $\lambda 2$), the controller 20 determines that the transistor Q2 suffers an open failure.

In such a case, the controller 20 operates the power relay 200 (first open-close means) to thereby stop the supply of electrical power to the step-up circuit 100. Further, the controller 20 supplies an off control signal to the phase open relays 210 and 220 in order to stop the supply of electrical power to the windings of the motor 6.

As a result, when the step-up circuit 100 suffers a failure, the operation mode of the motor-driven power steering apparatus is switched to a manual steering mode, so that no regenerative current flows into the step-up circuit 100 even when the motor 6 enters a regeneration state. Therefore, breakage of circuit elements, such as the capacitor C2, of the step-up circuit 100, and breakage of circuit elements of the motor drive unit 35 can be prevented.

(4) In the present embodiment, when the output voltage $V_{BPIG}$≧(the second reference value $\lambda 2$+the target output voltage $V_{BPIG}^*$), a judgment can be made that the transistor Q2 suffers an open failure.

18. Eighteenth Embodiment

The eighteenth embodiment will be described with reference to FIG. 30.

The hardware configuration of the present embodiment is identical with that of the seventeenth embodiment.

Figure 30:
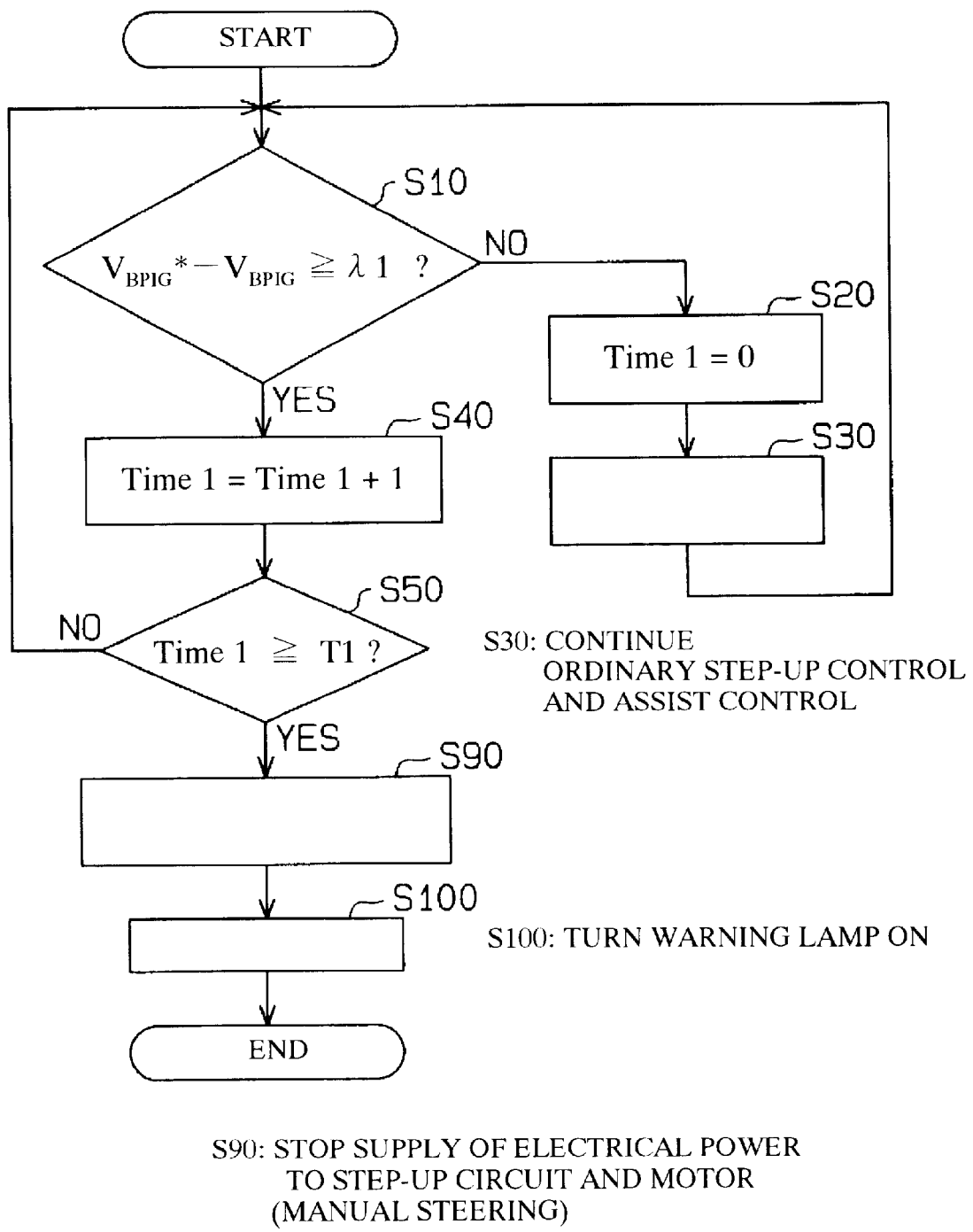
FIG. 30 is a flowchart showing control processing performed by the CPU in an eighteenth embodiment.

As shown in FIG. 30, in the present embodiment, a portion of the routine of the sixteenth embodiment (see FIG. 27) and a portion of the routine of the seventeenth embodiment (see FIG. 29) are combined.

That is, the routine of the present embodiment for step-up control for the step-up circuit 100 and assist control are constituted by S10 to S50, S90, and S100.

In the present embodiment as well, the controller 20 serves as the respective means described in relation to the second embodiment and further serves as status parameter detection means and judgment means.

Therefore, the eighteenth embodiment achieves the following effects.

(1) Since the present embodiment has the same configuration as that of the sixteenth embodiment, the same effects as those of the sixteenth embodiment mentioned in sections (1), (2), (4), and (5) of the description for the sixteenth embodiment are achieved.

(2) In the present embodiment, when the step-up circuit 100 is not normal (in particular, when the difference between the target output voltage $V_{BPIG}{}^*$ and the detected output voltage $V_{BPIG}$ is not less than the first reference value λ1), the controller 20 determines that the transistor Q1 suffers an open failure or the transistor Q2 suffers a short failure.

In such a case, the controller 20 operates in the same manner as in the case of the seventeenth embodiment in order to stop the supply of electrical power to the step-up circuit 100 and the windings of the motor 6.

As a result, when the step-up circuit 100 suffers a failure, the operation mode of the motor-driven power steering apparatus is switched to a manual steering mode, so that no regenerative current flows into the step-up circuit 100 even when the motor 6 enters a regeneration state. Therefore, breakage of circuit elements, such as the capacitor C2, of the step-up circuit 100, and breakage of circuit elements of the motor drive unit 35 can be prevented.

19. Nineteenth Embodiment

The nineteenth embodiment will be described with reference to FIGS. 31 and 32.

The present embodiment employs the same hardware configuration as that of the seventeenth embodiment; however, the drain of the transistor Q1 is connected to a voltage input port of the controller 20 in order to enable the controller 20 to detect drain voltage $V_{PIG2}$ of the transistor Q1.

Figure 32:
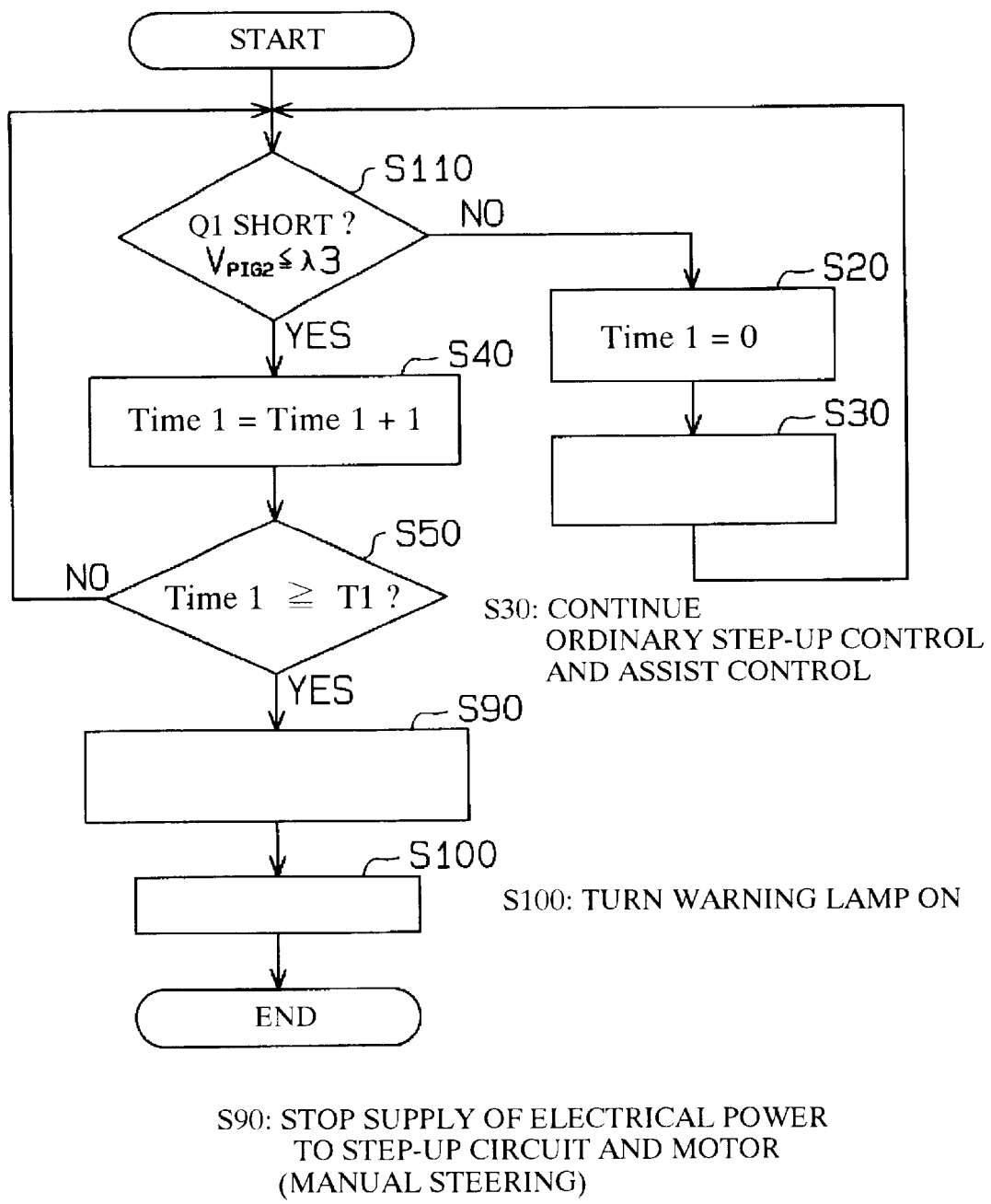
FIG. 32 is a flowchart showing control processing performed by the CPU in the nineteenth embodiment.

As shown in FIG. 32, the routine of the present embodiment for step-up control for the step-up circuit 100 and assist control differs from that of the eighteenth embodiment in that, in place of the judgment in S10 of the routine of the eighteenth embodiment, a judgment in S110 is performed. The remaining steps are the same as those of the eighteenth embodiment.

In S110, in order to judge whether the transistor Q1 suffers a short failure, the CPU 21 of the controller 20 judges whether the detected drain voltage $V_{PIG2}$ is equal to or less than a third reference value λ3 (judgment value). Note that the third reference value λ3 is stored in the ROM 22 in advance, and is a value which is close to the ground potential and is determined in advance through a test or any other suitable method in order to judge a short failure. When the CPU 21 judges in S110 that the drain voltage $V_{PIG2}$ is equal to or less than the third reference value λ3, the CPU 21 determines that the transistor Q1 suffers a short failure and proceeds to S40. When the CPU 21 judges that the drain voltage $V_{PIG2}$ is greater than the third reference value λ3, the CPU 21 determines that the transistor Q1 does not suffer a short failure and proceeds to S20.

In the present embodiment as well, the controller 20 serves as the respective means described in relation to the second embodiment and further serves as status parameter detection means and judgment means.

Accordingly, the nineteenth embodiment achieves the following effects.

(1) In the nineteenth embodiment, the controller 20 serves as status parameter detection means for detecting the drain voltage $V_{PIG2}$ of the transistor Q1, which is a status parameter of the step-up circuit 100, and as judgment means for comparing the drain voltage $V_{PIG2}$ with the third reference value λ3, serving as a judgment value, to thereby judge whether or not the step-up circuit 100 is normal.

Further, the controller 20 serves as step-up circuit control means in order to stop the step-up control for the step-up circuit 100 on the basis of the result of the judgment (see S90).

As a result, when the step-up circuit 100 suffers a failure, the step-up control for the step-up circuit 100 can be stopped.

(2) The same effects as those of the sixteenth embodiment mentioned in sections (2) and (5) of the description for the sixteenth embodiment are achieved.

(3) In the present embodiment, when the step-up circuit 100 is not normal (in particular, when the drain voltage $V_{PIG2}$ of the transistor Q1 has been judged to be equal to or less than the third reference value λ3), the controller 20 determines that the transistor Q1 suffers a short failure. In this case, the controller 20 operates in the same manner as in the case of the seventeenth embodiment in order to stop the supply of electrical power to the step-up circuit 100 and the windings of the motor 6.

When the transistor Q1 suffers a short failure, short current flows from the battery B to the ground via the coil L, so that circuit elements through which the short current flows generate excessive heat.

By contrast, in the present embodiment having the above-described configuration, excessive heat generation due to short current can be avoided.

Moreover, when the step-up circuit 100 suffers a failure, the operation mode of the motor-driven power steering apparatus is switched to a manual steering mode, so that no regenerative current flows into the step-up circuit 100 even when the motor 6 enters a regeneration state. Therefore, breakage of circuit elements, such as the capacitor C2, of the step-up circuit 100, and breakage of circuit elements of the motor drive unit 35 can be prevented.

(4) In the present embodiment, the controller 20 (status parameter detection means) detects the drain voltage $V_{PIG2}$ of the transistor Q1 (first switching element) as a status parameter; and the controller 20 (judgment means) judges that the step-up circuit 100 is in an anomalous state when the drain voltage $V_{PIG2}$ is equal to or less than the third reference value λ3.

As a result, the transistor Q1 can be judged to suffer a short failure.

20. Twentieth Embodiment

Figure 33:
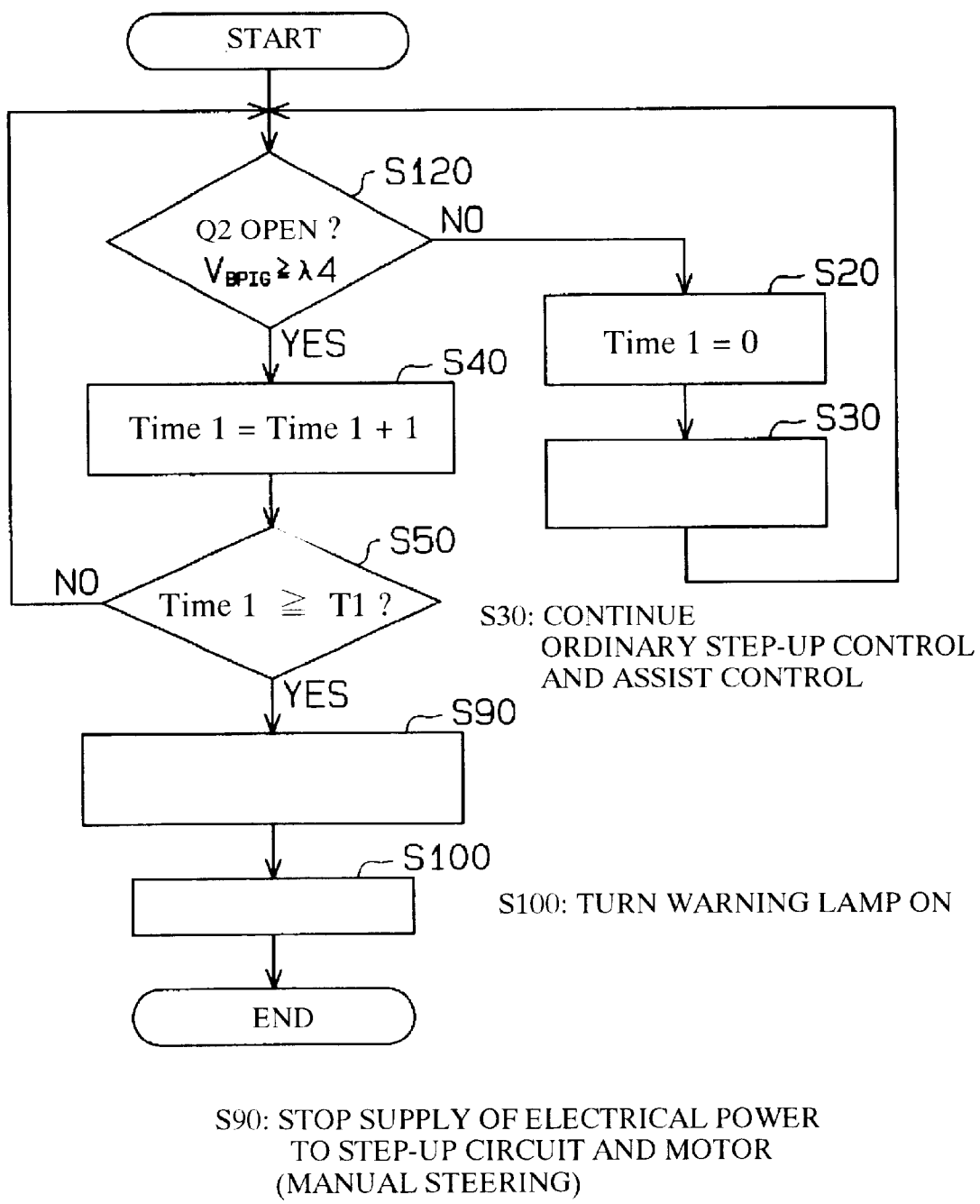
FIG. 33 is a flowchart showing control processing performed by the CPU in a twentieth embodiment.

The twentieth embodiment will be described with reference to FIG. 33.

The present embodiment employs the same hardware configuration as that of the seventeenth embodiment. However, as shown in FIG. 33, the routine of the present embodiment for step-up control for the step-up circuit 100 and assist control differs from that of the eighteenth embodiment in that, in place of the judgment in S10 of the routine of the eighteenth embodiment, a judgment in S120 is performed. The remaining steps are the same as those of the eighteenth embodiment.

In S120, in order to judge whether the transistor Q2 suffers an open failure, the CPU 21 of the controller 20 judges whether the detected output voltage $V_{BPIG}$ is equal to or greater than a fourth reference value λ4 (judgment value). Note that the fourth reference value λ4 is stored in the ROM 22 in advance, and is a value which is determined in advance through a test or any other suitable method in order to judge an open failure. When the CPU 21 judges in S120 that the output voltage $V_{BPIG}$ is equal to or greater than the fourth reference value λ4, the CPU 21 determines that the transistor Q2 suffers an open failure and proceeds to S40. When the CPU 21 judges that the output voltage $V_{BPIG}$ is less than the fourth reference value λ4, the CPU 21 determines that the transistor Q2 does not suffer an open failure and proceeds to S20.

In the present embodiment as well, the controller 20 serves as the respective means described in relation to the second embodiment and further serves as status parameter detection means and judgment means.

Accordingly, the twentieth embodiment achieves the following effects.

(1) In the present embodiment, the controller 20 serves as status parameter detection means for detecting the output voltage $V_{BPIG}$ of the step-up circuit 100 (status parameter), and as judgment means for comparing the output voltage $V_{BPIG}$ with the fourth reference value $\lambda 4$, serving as a judgment value, to thereby judge whether or not the step-up circuit 100 is normal.

Further, the controller 20 serves as step-up circuit control means in order to stop the step-up control for the step-up circuit 100 on the basis of the result of the judgment.

As a result, when the step-up circuit 100 suffers a failure, the step-up control for the step-up circuit 100 can be stopped.

(2) The same effects as those of the sixteenth embodiment mentioned in sections (2) and (5) of the description for the sixteenth embodiment are achieved.

(3) In the present embodiment, when the step-up circuit 100 is not normal (in particular, when the drain voltage of the transistor Q2 (output voltage $V_{BPIG}$) has been judged to be equal to or greater than the fourth reference value $\lambda 4$), the controller 20 determines that the transistor Q2 suffers an open failure.

In this case, the controller 20 operates in the same manner as in the case of the seventeenth embodiment in order to stop the supply of electrical power to the step-up circuit 100 and the windings of the motor 6.

As a result, when the step-up circuit 100 suffers a failure, the operation mode of the motor-driven power steering apparatus is switched to a manual steering mode, so that no regenerative current flows into the step-up circuit 100 even when the motor 6 enters a regeneration state. Therefore, breakage of circuit elements, such as the capacitor C2, of the step-up circuit 100, and breakage of circuit elements of the motor drive unit 35 can be prevented.

(4) In the present embodiment, the controller 20 (status parameter detection means) detects the drain voltage of the transistor Q2 (second switching element) (output voltage $V_{BPIG}$) as a status parameter; and the controller 20 (judgment means) judges that the step-up circuit 100 is in an anomalous state when the drain voltage (output voltage) $V_{BPIG}$ is equal to or greater than the fourth reference value $\lambda 4$ (judgment value).

As a result, the transistor Q2 can be judged to suffer an open failure.

21. Twenty-First Embodiment

Figure 34:
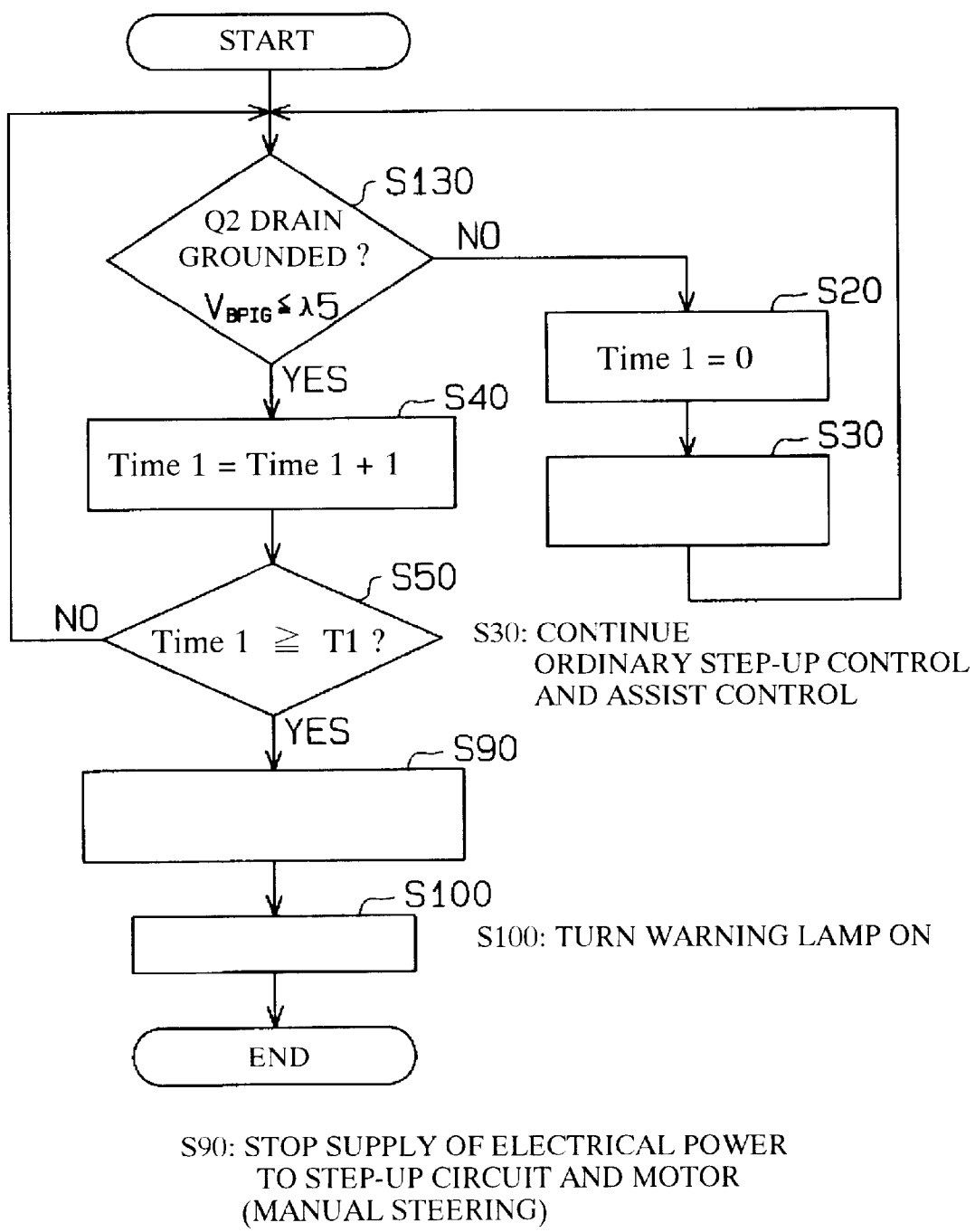
FIG. 34 is a flowchart showing control processing performed by the CPU in a twenty-first embodiment.

The twenty-first embodiment will be described with reference to FIG. 34.

The present embodiment employs the same hardware configuration as that of the seventeenth embodiment. However, as shown in FIG. 34, the routine of the present embodiment for step-up control for the step-up circuit 100 and assist control differs from that of the eighteenth embodiment in that, in place of the judgment in S10 of the routine of the eighteenth embodiment, a judgment in S130 is performed. The remaining steps are the same as those of the eighteenth embodiment.

In S130, in order to judge whether the transistor Q2 suffers a ground fault in which the drain of the transistor Q2 (i.e., the output terminal) is faultily grounded by means of a circuit that constitutes the motor drive unit 35, the CPU 21 of the controller 20 judges whether the detected output voltage $V_{BPIG}$ is equal to or less than a fifth reference value $\lambda 5$ (judgment value). Note that the fifth reference value $\lambda 5$ is stored in the ROM 22 in advance, and is a value which is close to the ground potential and is determined in advance through a test or any other suitable method in order to judge a ground fault.

When the CPU 21 judges in S130 that the output voltage $V_{BPIG}$ is equal to or less than the fifth reference value $\lambda 5$, the CPU 21 determines that the transistor Q2 suffers a ground fault and proceeds to S40. When the CPU 21 judges that the output voltage $V_{BPIG}$ is greater than the fifth reference value $\lambda 5$, the CPU 21 determines that the transistor Q2 does not suffer a ground fault and proceeds to S20.

In the present embodiment as well, the controller 20 serves as the respective means described in relation to the second embodiment and further serves as status parameter detection means and judgment means.

Accordingly, the twenty-first embodiment achieves the following effects.

(1) In the present embodiment, the controller 20 serves as status parameter detection means for detecting the output voltage $V_{BPIG}$ of the step-up circuit 100 (status parameter), and as judgment means for comparing the output voltage $V_{BPIG}$ with the fifth reference value $\lambda 5$, serving as a judgment value, to thereby judge whether or not the step-up circuit 100 is normal.

Further, the controller 20 serves as step-up circuit control means in order to stop the step-up control for the step-up circuit 100 on the basis of the result of the judgment.

As a result, when the step-up circuit 100 suffers a failure, the step-up control for the step-up circuit 100 can be stopped.

(2) The same effects as those of the sixteenth embodiment mentioned in sections (2) and (5) of the description for the sixteenth embodiment are achieved.

(3) In the present embodiment, when the step-up circuit 100 is not normal (in particular, when the drain voltage of the transistor Q2 (output voltage $V_{BPIG}$) has been judged to be equal to or less than the fifth reference value $\lambda 5$), the controller 20 determines that the transistor Q2 suffers a ground fault.

In this case, the controller 20 operates in the same manner as in the case of the seventeenth embodiment in order to stop the supply of electrical power to the step-up circuit 100 and the windings of the motor 6.

As a result, when the step-up circuit 100 suffers a failure, the operation mode of the motor-driven power steering apparatus is switched to a manual steering mode, so that no regenerative current flows into the step-up circuit 100 even when the motor 6 enters a regeneration state. Therefore, breakage of circuit elements, such as the capacitor C2, of the step-up circuit 100, and breakage of circuit elements of the motor drive unit 35 can be prevented.

(4) In the present embodiment, the controller 20 (status parameter detection means) detects the drain voltage of the transistor Q2 (second switching element) (output voltage $V_{BPIG}$) as a status parameter; and the controller 20 (judgment means) judges that the step-up circuit 100 is in an anomalous state when the drain voltage (output voltage) $V_{BPIG}$ is equal to or less than the fifth reference value $\lambda 5$ (judgment value).

As a result, the transistor Q2 can be judged to suffer a ground fault.

22-1. Twenty-Second Embodiment

The twenty-second embodiment will be described with reference to FIGS. 35 and 36.

Figure 35:
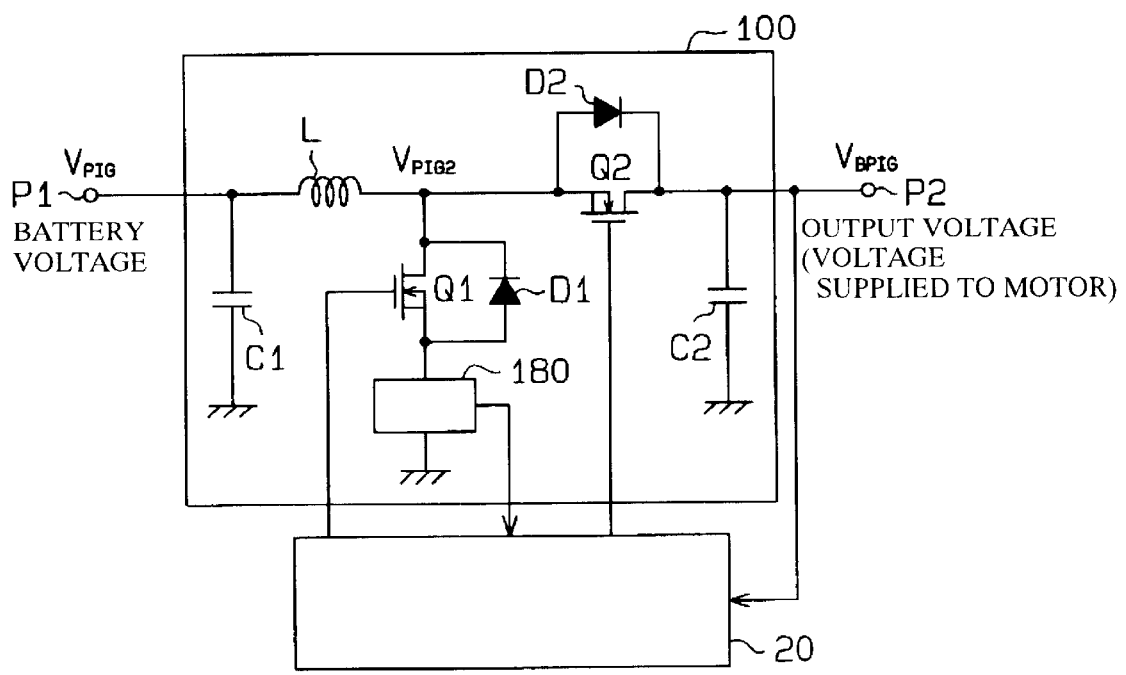
FIG. 35 is a circuit diagram of a step-up circuit according to a twenty-second embodiment.

The present embodiment employs the hardware configuration of the seventeenth embodiment; however, as shown in FIG. 35, a current detector 180 is provided between the source of the transistor Q1 and the ground. The current detector 180 detects current I flowing through the transistor Q1 and supplies a detection signal indicative of the detected current to a current input port of the controller 20. Note that although in the figure the current detector 180 is provided on the source side of the transistor Q1, it may be provided on the drain side of the transistor Q1.

Figure 36:
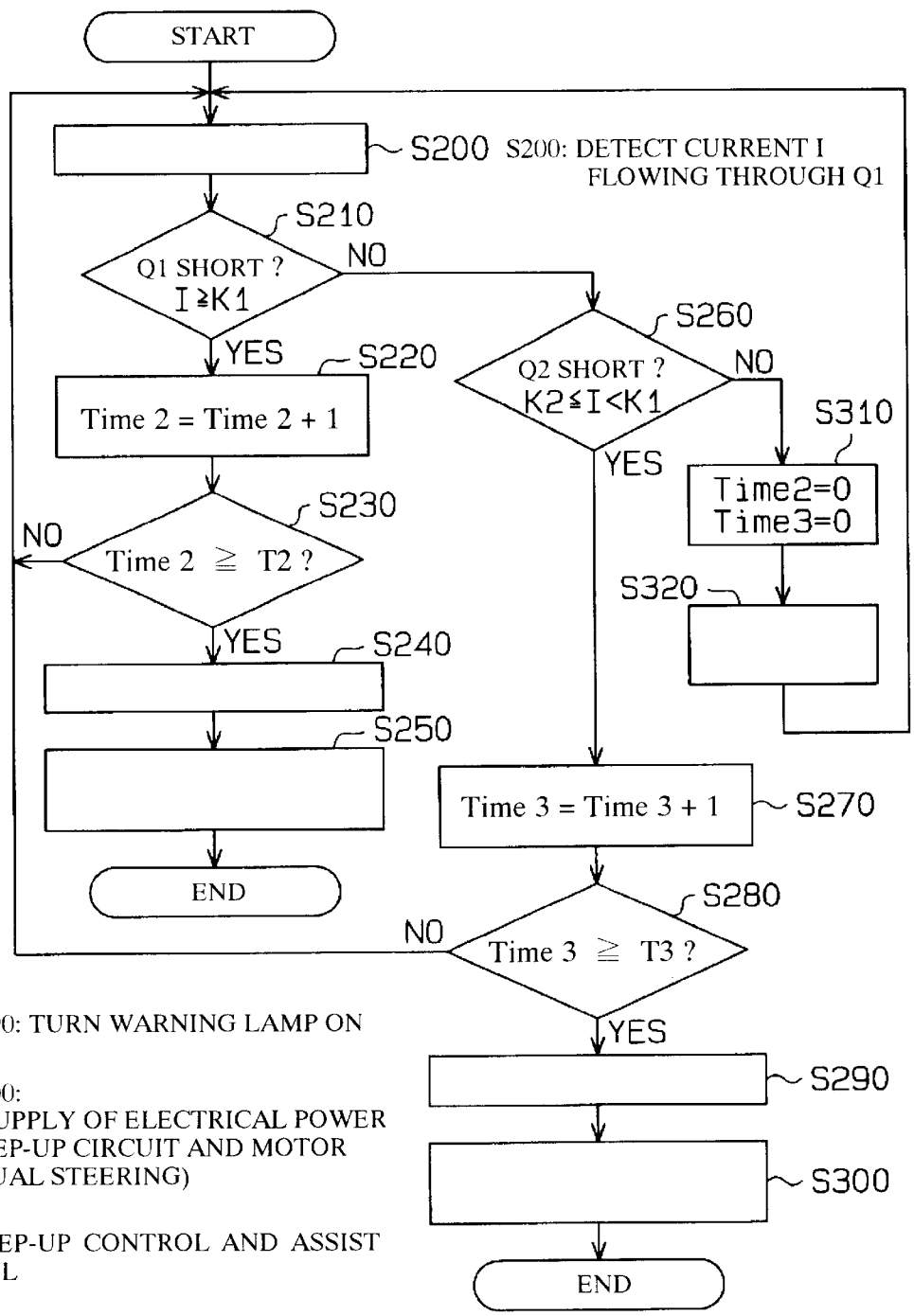
FIG. 36 is a flowchart showing control processing performed by the CPU in the twenty-second embodiment.

FIG. 36 shows a routine that the CPU 21 of the controller 20 executes in order to perform assist control and step-up control for the step-up circuit 100.

After initiation of this control routine, in S200, the CPU 21 detects the current I flowing through the transistor Q1 during a power generation period, on the basis of the detection signal output from the current detector 180. In S210, the CPU 21 compares the current I with a first current reference value K1, which serves as a judgment value. The first current reference value K1, which is stored in the ROM 22 in advance, is a value which is previously determined through a test or any other suitable method and is used to judge whether the transistor Q1 suffers a short failure. When the transistor Q1 has suffered a short failure, a larger current flows therethrough as compared with the case in which the transistor Q1 has not suffered a short failure. Therefore, a judgment as to whether such a larger current has flowed is made on the basis of the first current reference value K1.

When the CPU 21 judges that the current I is equal to or greater than the first current reference value K1, the CPU 21 determines that the transistor Q1 has suffered a short failure. In such as case, the CPU 21 increments a time-count counter Time 2 in S220. In S230, the CPU 21 judges whether a second predetermined time T2 has elapsed, on the basis of the time-count counter Time 2.

When the short failure has not continued for the second predetermined time T2, the CPU 21 judges that the step-up circuit 100 is normal, and returns to S200. The judgment in S230 as to elapsed time is performed in order to exclude the case in which a short failure having once occurred has been resolved naturally within the predetermined time.

When the CPU 21 judges that the second predetermined time T2 has elapsed, the CPU determines that the step-up circuit 100 is anomalous. In this case, in step 240, the CPU 21 outputs a warning signal (notification signal) to an illustrated warning lamp provided on an instrument panel or the like. In subsequent step S250, the CPU 21 outputs an off control signal to the phase open relays 210 and 220 to thereby open the relays 210 and 220, and stops output of the duty-ratio drive signals to the transistors Q1 and Q2. At the same time, the controller 20 turns the power relay 200 off. As a result, the supply of electrical power to the step-up circuit 100 and the motor 6 is stopped, whereby the motor-driven power steering apparatus is switched to a manual steering mode. After the above-described processing, the present control routine is ended.

When it is judged in S210 that the current I is less than the first current reference value K1, the CPU 21 determines that the transistor Q1 has not suffered a short failure and proceeds to S260. In S260, the CPU 21 judges whether the current I is equal to or greater than a second current reference value K2, which is smaller than the first current reference value K1. The second current reference value K2, which is also stored in the ROM 22 in advance, is a value which is previously determined through a test or any other suitable method and is used to judge whether the transistor Q2 suffers a short failure.

In the case in which the transistor Q1 operates normally during power generation periods with the transistor Q2 suffering a short failure, short current flows through the transistor Q2 immediately after the transistor Q1 is turned on. When the transistor Q1 is turned off, the short current flowing through the transistor Q2 is shut off. When the transistor Q2 suffers a short failure, a smaller current (on current) flows through the transistor Q1 as compared with the case in which the transistor Q1 suffers a short failure. Therefore, the current reference value K2 is set to a value which is smaller than current which will flow in the case of a short failure of the transistor Q1 and which enables determination of current that flows due to a short failure of the transistor Q2.

When the CPU 21 judges in S260 that the current I is equal to or greater than the second current reference value K2, the CPU 21 determines that the transistor Q2 has suffered a short failure. In such as case, the CPU 21 increments a time-count counter Time 3 in S270. In S280, the CPU 21 judges whether a third predetermined time T3 has elapsed, on the basis of the time-count counter Time 3.

In the case in which the short failure has not continued for the third predetermined time T3, the CPU 21 judges that the step-up circuit 100 is normal, and returns to S200. The judgment in S280 as to elapsed time is performed in order to exclude the case in which a short failure having once occurred has been resolved naturally within the predetermined time.

When the CPU 21 judges that the third predetermined time T3 has elapsed, the CPU determines that the step-up circuit 100 is anomalous. In this case, in step 290, the CPU 21 outputs a warning signal (notification signal) to the warning lamp, as in the case of S240. In subsequent step S300, the CPU 21 performs the same processing as in S250 in order to switch the motor-driven power steering apparatus to a manual steering mode. After the above-described processing, the present control routine is ended.

When the CPU 21 judges in S260 that the current I is less than the second current reference value K2, both the transistors Q1 and Q2 are free from a short failure and are normal. In this case, the CPU 21 resets the time-count counters Time 2 and Time 3 to zero in S310, performs ordinary step-up control and assist control in S320, and then returns to S200.

In the present embodiment as well, the controller 20 serves as the respective means described in relation to the second embodiment and further serves as judgment means. Further, the controller 20 and the current detector 180 constitute status parameter detection means.

Accordingly, the twenty-second embodiment achieves the following effects.

(1) In the present embodiment, the controller 20 and the current detector 180 constitute status parameter detection means for detecting the current I flowing through the transistor Q1, which is a status parameter of the step-up circuit 100; and the controller 20 serves as judgment means for comparing the current I with the first and second current reference values K1 and K2 (judgment values) so as to judge whether or not the step-up circuit 100 is normal (S210 and S260).

Further, the controller 20 serves as step-up circuit control means in order to stop the step-up control for the step-up circuit 100 on the basis of the result of the judgment (S250 and S300).

As a result, when the step-up circuit 100 suffers a failure, the step-up control for the step-up circuit 100 can be stopped.

(2) The same effect as that of the sixteenth embodiment mentioned in section (2) of the description for the sixteenth embodiment is achieved (see S240 and S290).

(3) In the present embodiment, when the step-up circuit 100 is not normal (in particular, when the current I flowing through the transistor Q1 is equal to or greater than the first current reference value K1), the controller 20 determines that the transistor Q1 suffers a short failure (see S210). In this case, the controller 20 operates in the same manner as in the case of the seventeenth embodiment, in order to stop the supply of electrical power to the step-up circuit 100 and the windings of the motor 6.

As a result, for the same reasons described in relation to the effect mentioned in section (3) of the description for the nineteenth embodiment, the same effect as that of the nineteen embodiment mentioned in section (3) of the description for the nineteenth embodiment is achieved.

(4) In the present embodiment, when the current I flowing through the transistor Q1 is less than the first current reference value K1 (a judgment value) and is equal to or greater than the second current reference value K2 (another judgment value), the controller 20 determines that the transistor Q2 suffers a short failure (see S260). In this case, the controller 20 operates in the same manner as in the case of the seventeenth embodiment, in order to stop the supply of electrical power to the step-up circuit 100 and the windings of the motor 6.

As a result, as described in the above section (3), the same effect as that of the nineteenth embodiment mentioned in section (3) of the description for the nineteenth embodiment is achieved.

(5) In the twenty-second embodiment, after elapse of the second predetermined time T2 is detected in S230, the supply of electrical power to the step-up circuit 100 and the motor 6 is stopped.

As result, the case in which a short failure of the transistor Q1 is resolved within the second predetermined time T2 and the case of erroneous judgment can be excluded, so that subsequent step-up control and assist control can be performed properly.

(6) In the twenty-second embodiment, after elapse of the third predetermined time T3 is detected in S270, the supply of electrical power to the step-up circuit 100 and the motor 6 is stopped.

As a result, the case in which a short failure of the transistor Q2 is resolved within the third predetermined time T3 and the case of erroneous judgment can be excluded, so that subsequent step-up control and assist control can be performed properly.

(7) In the twenty-second embodiment, the controller 20 and the current detector 180 (status parameter detection means) detect the current I flowing through the transistor Q1 (first switching element) as a status parameter; and the controller 20 (judgment means) judges that the step-up circuit 100 suffers a failure by comparing the current I with the first and second current reference values K1 and K2 (judgment values). As a result, anomalous states of the transistors Q1 and Q2 can be judged.

22-2. Modification of Twenty-Second Embodiment

Next, a modification of the twenty-second embodiment will be described with reference to FIG. 37.

Figure 37:
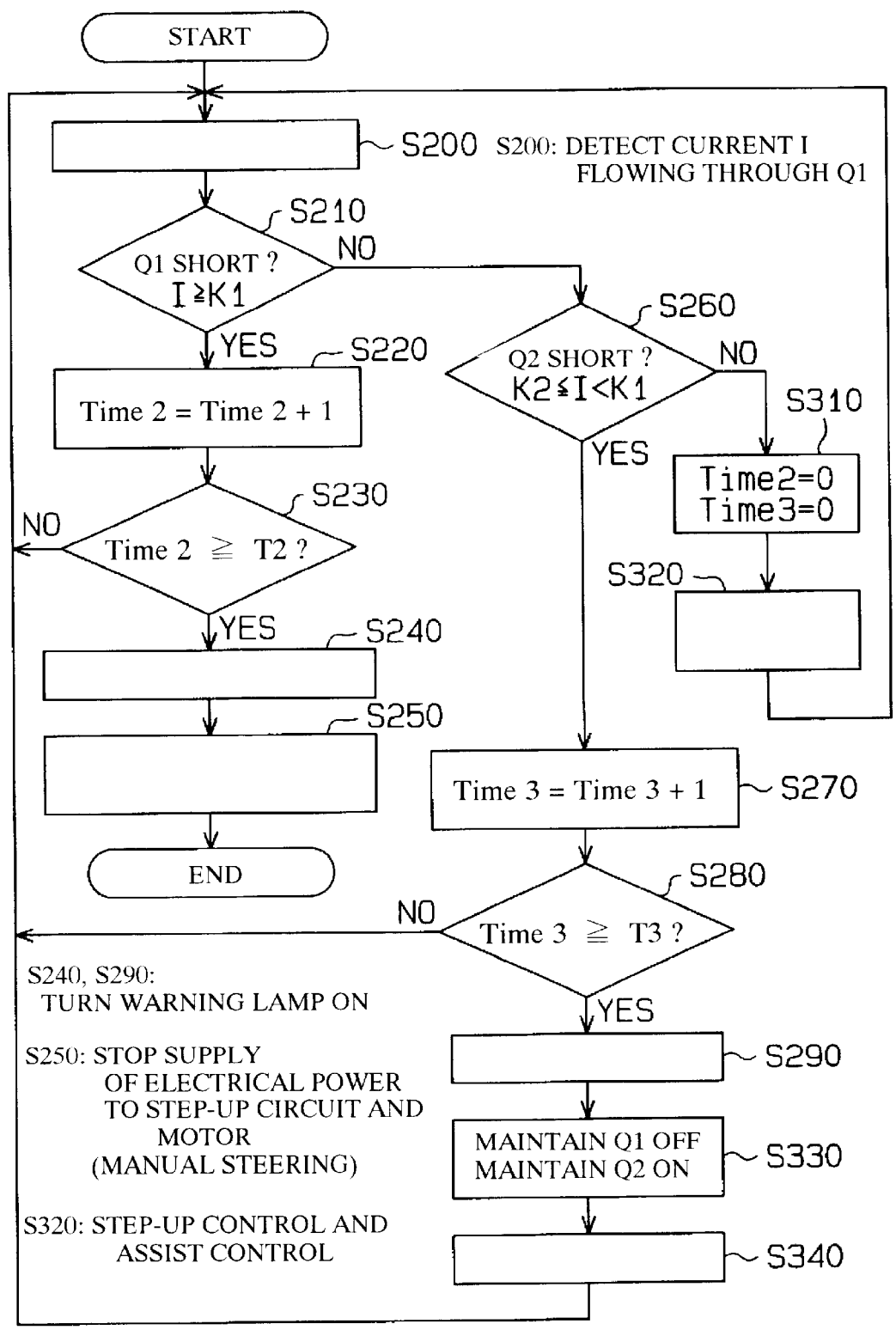
FIG. 37 is a flowchart showing control processing performed by the CPU in a modification of the twenty-second embodiment.

This modification differs from the twenty-second embodiment in that the routine which the CPU 21 of the controller 20 performs for assist control and step-up control for the step-up circuit 100 has been modified as shown in FIG. 37.

As shown in FIG. 37, the routine of the present modification differs from the previously described control routine (see FIG. 36) in that, instead of the processing in S300, processing in S330 and S340 is performed.

In S330, the CPU 21 maintains the transistor Q1 off continuously, and maintains the transistor Q2 on continuously. This processing turns the transistor Q1 off and the transistor Q2 on from the controller side, even though the transistor Q2 suffers a short failure in actuality.

As result, even when the step-up control for the step-up circuit 100 is stopped, assist control at the battery voltage (12 V, in the present embodiment) is possible. Therefore, assist control at the battery voltage is performed. Therefore, during regeneration periods, regenerative current can flow to the battery B via the transistor Q2.

In the present modification, the same effects as those of the twenty-second embodiment mentioned in sections (1) to (3) and (5) to (7) of the description for the twenty-second embodiment are achieved. In addition, when the transistor Q2 suffers a short failure, assist control at battery voltage can be performed.

Twenty-Third to Thirtieth Embodiments

The above-described sixteenth to twenty-second embodiments are directed to embodiments of control to be performed when the step-up circuit 100 itself breaks while the above-described step-up control is being performed. By contrast, twenty-third to thirtieth embodiments are directed to embodiments of control to be performed when an ignition switch of the vehicle is turned on in order to perform initial check and determine whether the step-up circuit 100 is in an anomalous state.

In order to simplify the description, the twenty-third to thirtieth embodiments will be described on the assumption that "step-up control" in S520, which will be described later, is the step-up control having been described in relation to the second embodiment. However, the present invention is not limited thereto. The twenty-third to thirtieth embodiments can be realized even when any of the step-up controls of the first through fifteenth embodiments is employed.

23-1. Twenty-Third Embodiment

Figure 38:
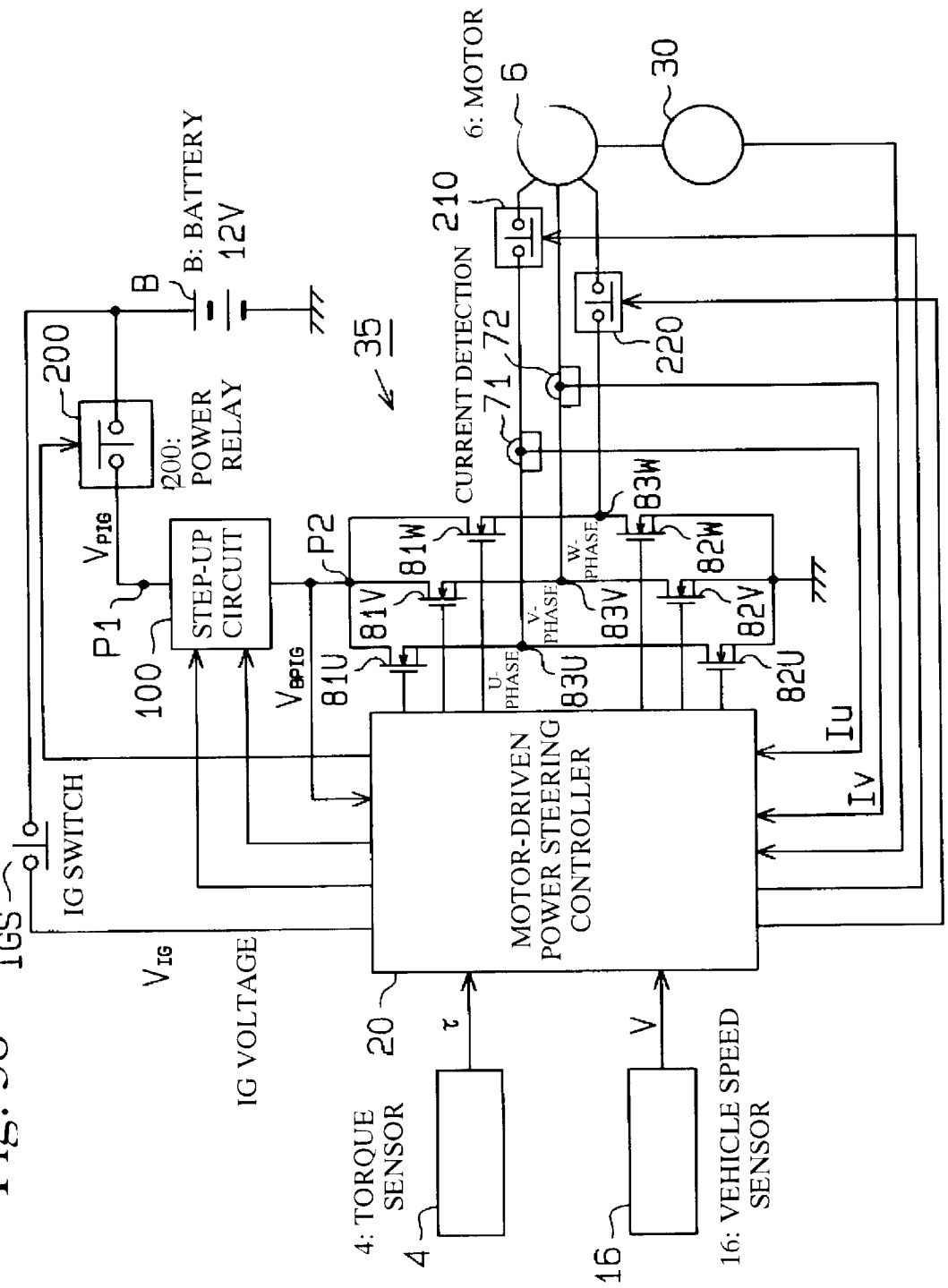
FIG. 38 is a control block diagram of a motor-driven power steering apparatus according to a twenty-third embodiment.

The twenty-third embodiment will be described with reference to FIGS. 38 to 40.

Although not mentioned in the first to twenty-second embodiments, an ignition switch IGS is provided on the vehicle. In the twenty-third embodiment as well, an ignition switch IGS is provided as shown in FIG. 38, and when the ignition switch IGS is turned on, electrical power is supplied to the controller 20.

Figure 31:
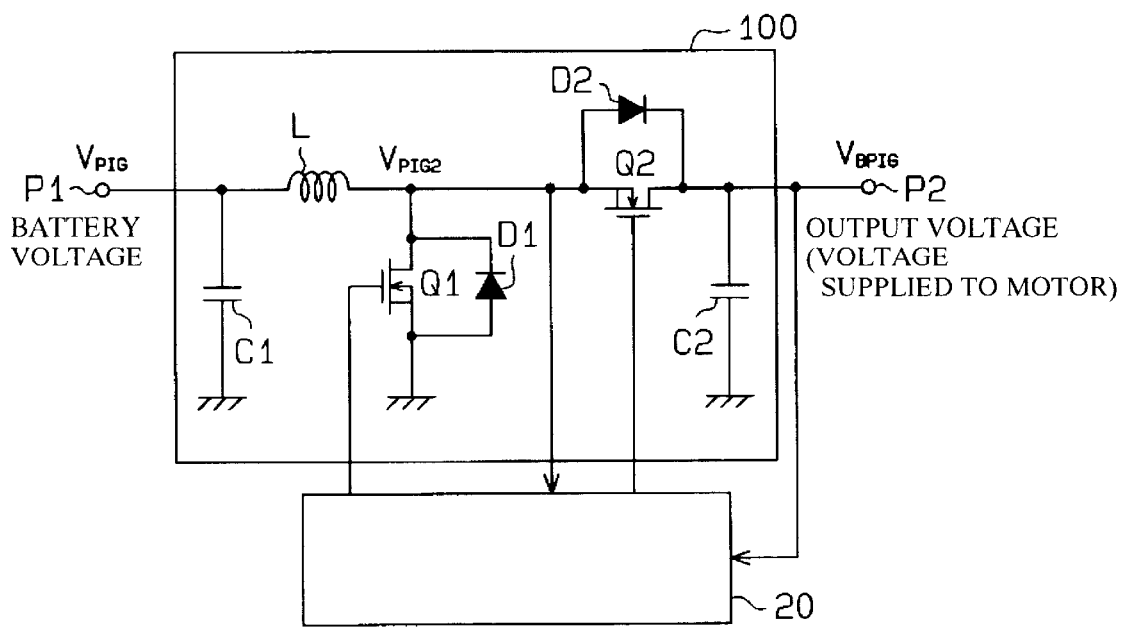
FIG. 31 is a circuit diagram of a step-up circuit according to a nineteenth embodiment.
Figure 39:
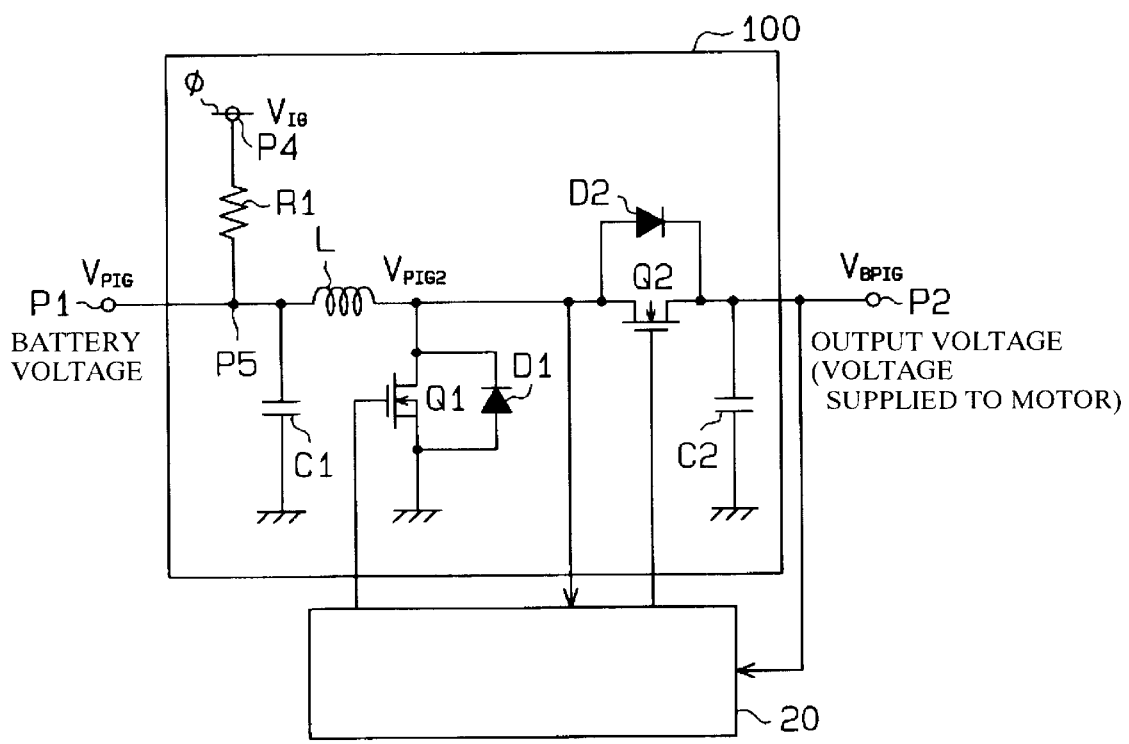
FIG. 39 is a circuit diagram of a step-up circuit used in the twenty-third embodiment, a twenty-fourth embodiment, and a twenty-fifth embodiment.

The twenty-third embodiment differs from the nineteenth embodiment in that, as shown in FIG. 39, the following configuration is added to the configuration of the nineteenth embodiment (see FIG. 31). Note that FIG. 39 is a circuit diagram of the step-up circuit 100.

When the ignition switch IGS is turned on, an ignition voltage $V_{IG}$ is applied to an ignition circuit φ. In the present embodiment, the ignition voltage $V_{IG}$ is the same as the battery voltage. A resistor R1 is connected between a connection point P4 of the ignition circuit φ and a connection point P5 between the application point P1 and the coil L. The resistor R1 has a high resistance so that only a small amount of current flows between the connection points P4 and P5. The resistor R1 forms a pull-up circuit.

Figure 40:
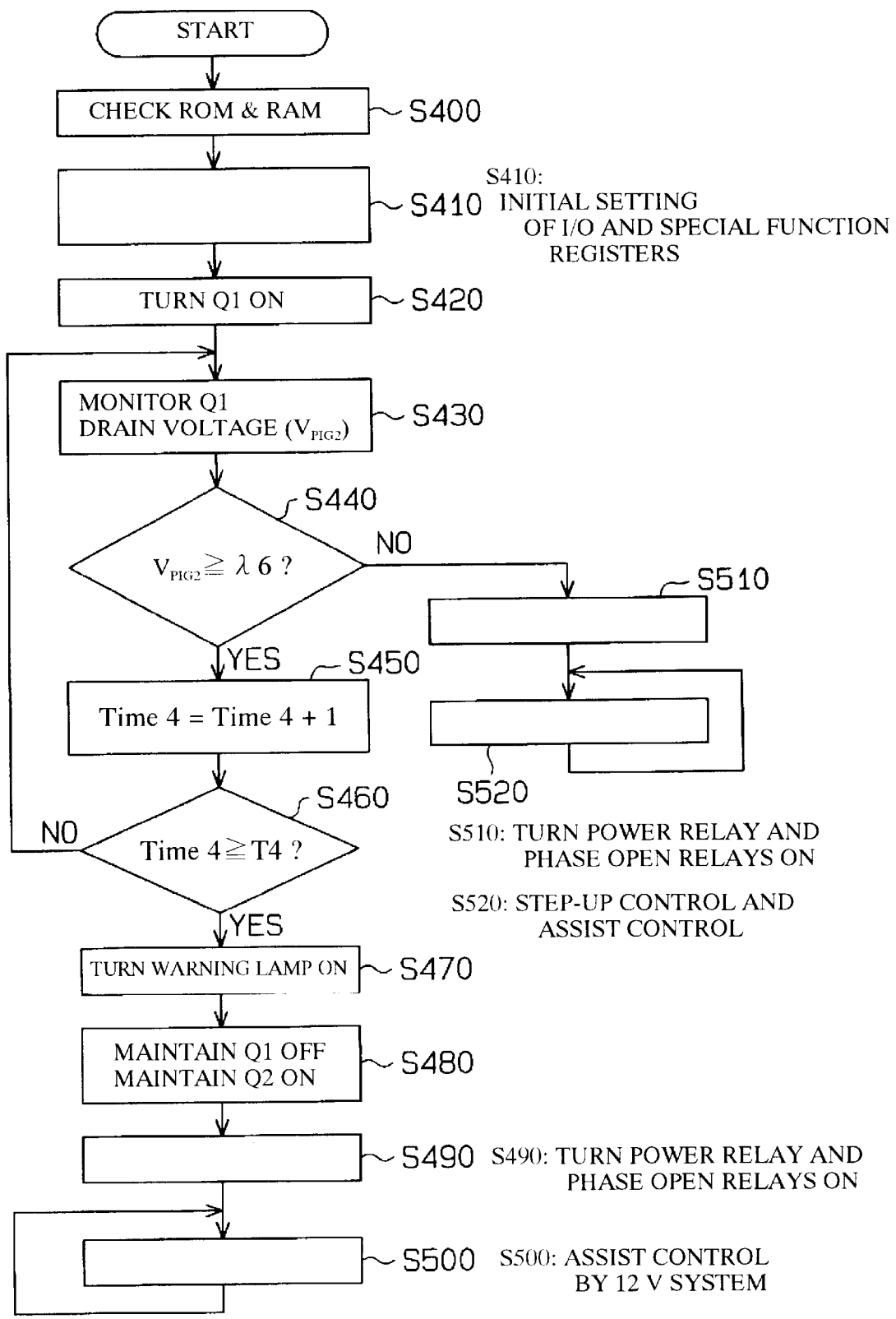
FIG. 40 is a flowchart showing control processing performed by the CPU in the twenty-third embodiment.

In the present embodiment, when the ignition switch IGS is turned on, the controller 20 executes a control program shown in FIG. 40, which includes an initial check routine. This control program is stored in the ROM 22 in advance. Note that before the ignition switch IGS is turned on, each of the power relay 200 and the phase open relays 210 and 220 is in an off state.

When the ignition switch IGS is turned on, in S400, the CPU 21 checks the ROM 22 and the RAM 23. Meanwhile, when the ignition switch IGS is turned on, the ignition voltage $V_{IG}$ equal to the battery voltage is applied to the ignition circuit φ. As a result, even when the power relay 200 is not in an on state, the drain voltage $V_{PIG2}$ of the step-up circuit 100 is pulled up to the battery voltage.

In S410, the CPU 21 initially sets various registers, such as special function registers, and an unillustrated interface circuit of the controller 20. In S420, the controller 20 outputs a continuous on signal to the transistor Q1, and in step 430, the controller 20 detects (reads) the drain voltage $V_{PIG2}$ of the transistor Q1.

In S440, the controller 20 judges whether the drain voltage $V_{PIG2}$ of the transistor Q1 is equal to or greater than a sixth reference value λ6 (>0). The sixth reference value λ6, which is stored in the ROM 22 in advance, is a value which is previously determined through a test or any other suitable method and is used to judge whether the transistor Q1 suffers an open failure.

That is, when the transistor Q1 does not suffer an open failure, upon application of the above-described continuous on signal, the transistor Q1 enters an on state, so that the drain voltage $V_{PIG2}$ of the transistor Q1 decreases. Since the decreased drain voltage $V_{PIG2}$ is less than the sixth reference value λ6, the transistor Q1 is judged not to suffer an open failure.

Meanwhile, when the transistor Q1 suffers an open failure, the transistor Q1 does not enter an on state, despite application of the above-described continuous on signal, so that the drain voltage $VP_{PIG2}$ of the transistor Q1 does not drop. Therefore, when the drain voltage $VPIG_2$ is equal to or greater than the sixth reference value λ6, the transistor Q1 is judged to suffer an open failure.

When the CPU 21 judges in S440 that the transistor Q1 does not suffer an open failure, the CPU 21 proceeds to S510. In S510, the CPU 21 turns the power relay 200 and the phase open relays 210 and 220 on. In subsequent step S520, the CPU 21 performs step-up control and assist control.

Meanwhile, when the CPU 21 judges in S440 that the transistor Q1 suffers an open failure, the CPU 21 proceeds to S450, and increments a time-count counter Time 4. In subsequent step S460, the CPU 21 judges whether a fourth predetermined time T4 has elapsed, on the basis of the time-count counter Time 4.

In the case in which the open failure has not continued for the fourth predetermined time T4, the CPU 21 judges that the step-up circuit 100 is normal, and returns to S430. The judgment in S460 as to elapsed time is performed in order to exclude the case in which an open failure having once occurred has been resolved naturally within the predetermined time.

When the CPU 21 judges in S460 that the fourth predetermined time T4 has elapsed, the CPU determines that the step-up circuit 100 is anomalous. In this case, in step 470, the CPU 21 outputs a warning signal (notification signal) to an illustrated warning lamp provided on an instrument panel or the like to thereby turning the waning lamp on.

In subsequent step S480, the CPU 21 maintains the transistor Q1 off continuously, and maintains the transistor Q2 on continuously.

This processing turns the transistor Q1 off from the controller side, even though the transistor Q1 suffers an open failure in actuality. The purpose of turning the transistor Q2 on in S480 is to enable regenerative current to flow to the battery B during regeneration periods.

In S490, the CPU 21 turns the power relay 200 and the phase open relays 210 and 220 on. In subsequent step S500, the CPU 21 performs step-up control and assist control as in S520.

Specifically, even when the step-up control for the step-up circuit 100 is stopped, assist control at the battery voltage is possible. Therefore, assist control at the battery voltage is performed. Accordingly, during regeneration periods, regenerative current can flow to the battery B via the transistor Q2.

In the present embodiment, the controller 20 serves as the respective means described in relation to the second embodiment and further serves as status parameter detection means, first failure judgment means, and first element control means. Further, the sixth reference value λ6 serves as a first failure judgment value. The resistor R1 serves as a first resistor.

The power relay 200 serves as first open-close means; and the phase open relays 210 and 220 serve as second open-close means.

The twenty-third embodiment achieves the following effects in addition to the effects of the second embodiment.

(1) The twenty-third embodiment includes the power relay 200 (first open-close means), which is connected to the application point P1 (battery-voltage supply section) of the step-up circuit 100 and is turned on and off by means of the controller 20 (step-up circuit control means). Further, the twenty-third embodiment includes a pull-up circuit which includes the resistor R1 (first resistor) connected to the connection point P5 between the application point P1 and the drain of the transistor Q1 (first switching element) and which receives the ignition voltage $V_{IG}$ when the ignition switch IGS is turned on.

When the ignition switch IGS is turned on, the controller 20 serves as first element control means so as to turn the transistor Q1 on before turning the power relay 200 on. Further, the controller 20 serves as drain voltage detection means for detecting the drain voltage $V_{PIG2}$ of the transistor Q1 (first switching element) and as first failure judgment means for comparing the drain voltage $V_{PIG2}$ with the sixth reference value λ6 (first failure judgment value) so as to judge whether or not the step-up circuit 100 is normal.

As a result, the judgment as to whether or not the step-up circuit 100 is normal can be performed at the stage of initial check after the ignition switch IGS is turned on.

(2) The twenty-third embodiment includes the phase open relays 210 and 220 (second open-close means) for on-off control of supply of electrical power to the motor 6.

When the controller 20, serving as the first failure judgment means, judges that the step-up circuit 100 suffers a failure, the controller 20 serves as the step-up circuit control means and turns the power relay 200 and the phase open relay 210 and 220 on (see S490). Moreover, the controller 20 maintains the transistor Q1 (first switching element) off continuously, and maintains the transistor Q2 (second switching element) on continuously (see S480).

As a result, although assist control cannot be performed by use of boosted voltage obtained through step-up control for the step-up circuit 100, assist control can be performed at the battery voltage, and during regeneration periods, regenerative current can be absorbed by the battery B.

(3) In the present embodiment, when the step-up circuit 100 is not normal, this is reported by means of a warning lamp (reporting means) (see S470). As a result, the failure of the step-up circuit 100 can be reported to a driver of the vehicle.

(4) In the twenty-third embodiment, the controller 20 performs the processing in S470 and S480 only when the controller 20 judges in s450 that the fourth predetermined time T4 has elapsed. This operation can exclude the case in which an open failure of the transistor Q1 is resolved within the fourth predetermined time T4.

23-2. Modification of Twenty-Third Embodiment

Next, a modification of the twenty-third embodiment will be described with reference to FIG. 41.

Figure 41:
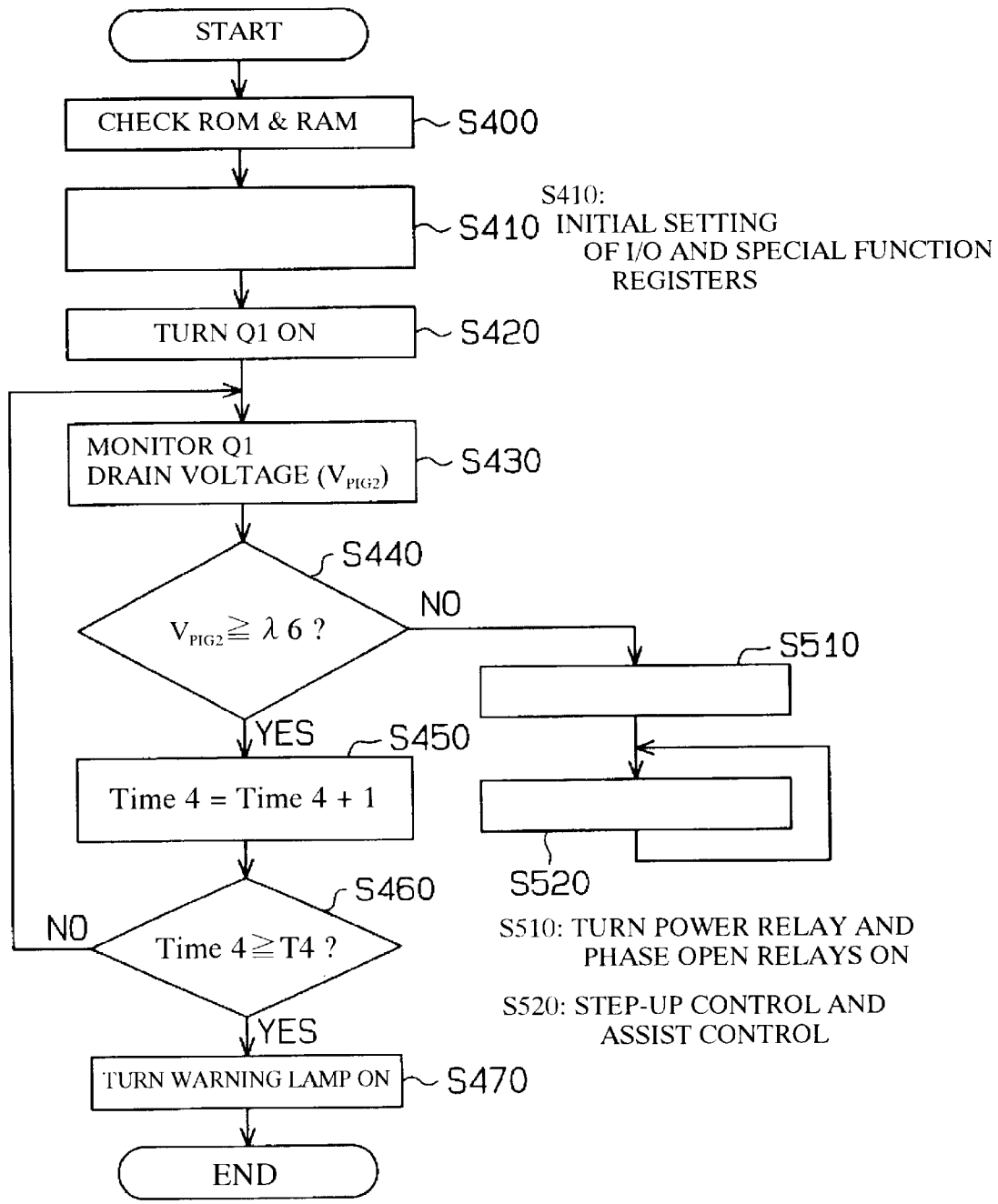
FIG. 41 is a flowchart showing control processing performed by the CPU in a modification of the twenty-third embodiment.

FIG. 41 is a flowchart showing control processing performed by the CPU 21 in the present modification.

The present modification is identical to the twenty-third embodiment in terms of hardware configuration, but differs from the twenty-third embodiment in terms of control routine.

That is, among the steps of the flowchart shown in FIG. 40, S480 to S500 are omitted. After completion of the processing in S470, the CPU 21 ends the control routine.

As a result, when the transistor Q1 suffers an open failure, the power relay 200 and the phase open relays 210 and 220 are not turned on, but are maintained off.

This modification achieves the following effect in addition to the effects of the twenty-third embodiment mentioned in sections (1), (3), and (4) of the description for the twenty-third embodiment.

(1) In the present modification, when the transistor Q1 is judged to have suffered an open failure, the power relay 200 and the phase open relays 210 and 220 are not turned on, but are maintained off.

Therefore, when the transistor Q1 suffers an open failure; i.e., when the step-up circuit 100 suffers a failure, the failsafe mechanism operates.

24. Twenty-Fourth Embodiment

The present modification is identical to the twenty-third embodiment in terms of hardware configuration, and is similar to the modification of the twenty-third embodiment in terms of control routine shown in FIG. 41; however, a portion of the control routine has been modified.

Figure 42:
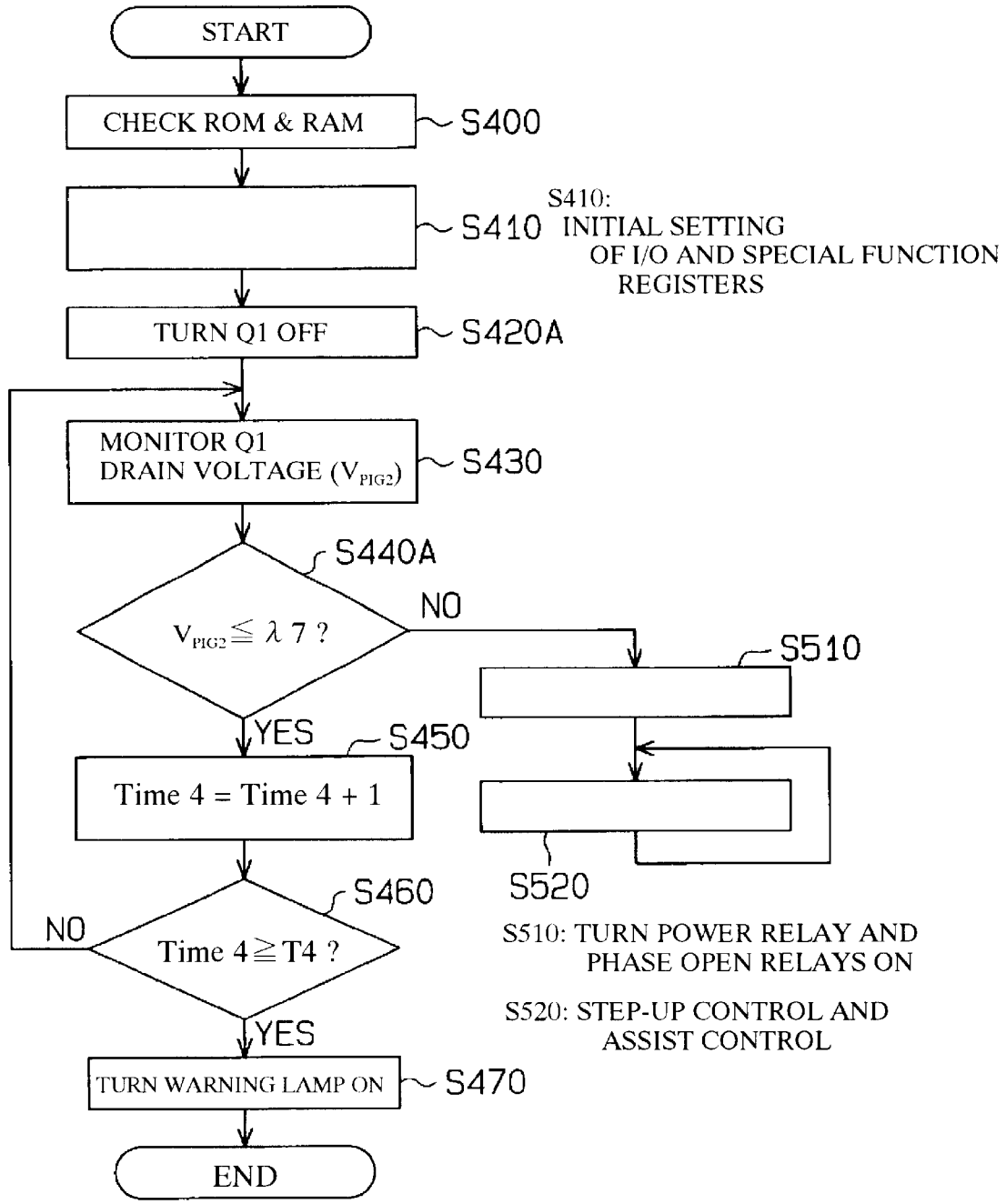
FIG. 42 is a flowchart showing control processing performed by the CPU in the twenty-fourth embodiment.

That is, as shown in FIG. 42, in place of the processing of S420, processing in S420A is performed; and in place of the processing of S440, processing in S440A is performed.

In S420A, the CPU 21 outputs a continuous off signal to the transistor Q1.

In S440A, the CPU 21 judges whether the drain voltage $V_{PIG2}$ of the transistor Q1 detected in S430 is equal to or less than a seventh reference value $\lambda 7$ (>0). The seventh reference value $\lambda 7$, which is stored in the ROM 22 in advance, is a value which is previously determined through a test or any other suitable method and is used to judge whether the transistor Q1 suffers a short failure.

That is, when the transistor Q1 does not suffer a short failure, upon application of the above-described continuous off signal, the transistor Q1 enters an off state, so that the drain voltage $V_{PIG2}$ of the transistor Q1 is pulled up to the battery voltage.

Since the increased drain voltage $V_{PIG2}$ is greater than the seventh reference value $\lambda 7$, the transistor Q1 is judged not to suffer a short failure.

Meanwhile, when the transistor Q1 suffers a short failure, the transistor Q1 does not enter an off state despite application of the above-described continuous off signal, so that the drain voltage $V_{PIG2}$ of the transistor Q1 decreases to the ground potential. Therefore, when the drain voltage $V_{PIG2}$ is equal to or less than the seventh reference value $\lambda 7$, the transistor Q1 is judged to suffer a short failure.

The twenty-fourth embodiment achieves the following effects in addition to the effects of the second embodiment and the effect of the twenty-third embodiment mentioned in section (3) of the description for the twenty-third embodiment.

(1) The twenty-fourth embodiment includes the power relay 200 (first open-close means), which is connected to the application point P1 (battery-voltage supply section) of the step-up circuit 100 and is turned on and off by means of the controller 20 (step-up circuit control means). Further, the twenty-fourth embodiment includes a pull-up circuit which includes the resistor R1 (first resistor) connected to the connection point P5 between the application point P1 and the drain of the transistor Q1 (first switching element) and which receives the ignition voltage $V_{IG}$ when the ignition switch IGS is turned on.

When the ignition switch IGS is turned on, the controller 20 serves as first element control means so as to turn the transistor Q1 off before turning the power relay 200 on. Further, the controller 20 serves as drain voltage detection means for detecting the drain voltage $V_{PIG2}$ of the transistor Q1 (first switching element) and as first failure judgment means for comparing the drain voltage $V_{PIG2}$ with the seventh reference value $\lambda 7$ (first failure judgment value) so as to judge whether or not the step-up circuit 100 is normal.

As a result, the judgment as to whether or not the step-up circuit 100 is normal can be performed at the stage of initial check after the ignition switch IGS is turned on.

(2) In the twenty-fourth embodiment, the warning lamp (reporting means) is driven only when the controller 20 judges in S460 that the fourth predetermined time T4 has elapsed. This operation can exclude the case in which a short failure of the transistor Q1 is resolved within the fourth predetermined time T4.

(3) In the present modification, when the transistor Q1 is judged to have suffered a short failure, the power relay 200 and the phase open relays 210 and 220 are not turned on, but are maintained off.

Therefore, when the transistor Q1 suffers a short failure; i.e., when the step-up circuit 100 suffers a failure, the failsafe mechanism operates.

25. Twenty-Fifth Embodiment

Figure 43:
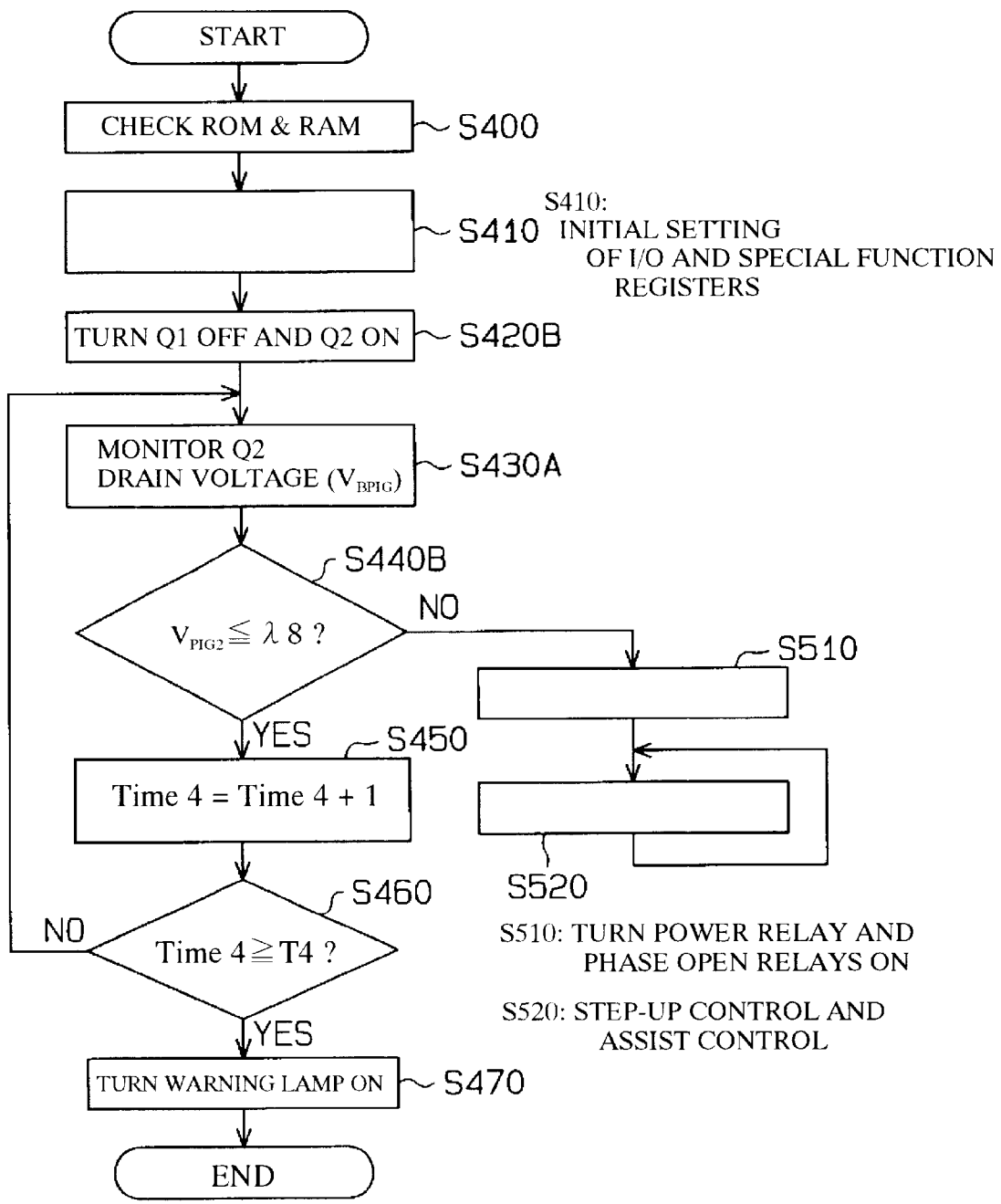
FIG. 43 is a flowchart showing control processing performed by the CPU in the twenty-fifth embodiment.

FIG. 43 is a flowchart showing control processing performed by the CPU 21 in the present embodiment.

The present embodiment is identical to the twenty-third embodiment in terms of hardware configuration, and is similar to the modification of the twenty-third embodiment in terms of control routine shown in FIG. 41; however, a portion of the control routine has been modified.

That is, in place of the processing of S420, processing in S420B is performed; in place of the processing of S430, processing in S430A is performed; and in place of the processing of S440, processing in S440B is performed.

In S420B, the CPU 21 outputs a continuous off signal to the transistor Q1, and outputs a continuous on signal to the transistor Q2.

In S430A, the CPU 21 detects the drain voltage V of the transistor Q2 (output voltage $V_{BPIG}$).

In S440B, the CPU 21 judges whether the drain voltage of the transistor Q2; i.e., the output voltage $V_{BPIG}$ detected in S430A, is equal to or less than an eighth reference value $\lambda 8$ (>0). The eighth reference value $\lambda 8$, which is stored in the ROM 22 in advance, is a value which is previously determined through a test or any other suitable method and is used to judge whether the transistor Q2 suffers an open failure.

In the state in which the transistor Q1 is maintained off continuously, the drain voltage $V_{PIG2}$ of the transistor Q1 is pulled up to the battery voltage by means of the pull-up circuit. In this state, when the transistor Q2 does not suffer an open failure, upon application of the above-described continuous on signal thereto, the drain voltage of the transistor Q2 (i.e., the output voltage $V_{BPIG}$) increases to the battery voltage. Since the increased drain voltage $V_{BPIG}$ is greater than the eighth reference value $\lambda 8$, the transistor Q2 is judged not to suffer an open failure.

Meanwhile, when the transistor Q2 suffers an open failure, the transistor Q2 does not enter an on state despite application of the above-described continuous on signal, so that the drain voltage of the transistor Q2 (output voltage $V_{BPIG}$) does not increase to the battery voltage. Therefore, when the drain voltage of the transistor Q2 (output voltage $V_{BPIG}$) is equal to or less than the eighth reference value $\lambda 8$, the transistor Q2 is judged to suffer an open failure.

The twenty-fifth embodiment achieves the following effects in addition to the effects of the second embodiment and the effects of the twenty-third embodiment mentioned in sections (3) and (4) of the description for the twenty-third embodiment.

(1) The twenty-fifth embodiment includes the power relay 200 (first open-close means), which is connected to the application point P1 (battery-voltage supply section) of the step-up circuit 100 and is turned on and off by means of the controller 20 (step-up circuit control means). Further, the twenty-fifth embodiment includes a pull-up circuit which includes the resistor R1 (first resistor) connected to the connection point P5 between the application point P1 and the drain of the transistor Q1 (first switching element) and which receives the ignition voltage $V_{IG}$ when the ignition switch IGS is turned on.

When the ignition switch IGS is turned on, the controller 20 serves as first element control means so as to turn the transistor Q1 off and turn the transistor Q2 on before turning the power relay 200 on.

Further, the controller 20 serves as drain voltage detection means for detecting the drain voltage of the transistor Q2 (second switching element) (output voltage $V_{BPIG}$) and as first failure judgment means for comparing the drain voltage (output voltage) $V_{BPIG}$ with the eighth reference value $\lambda 8$ (first failure judgment value) so as to judge whether or not the step-up circuit 100 is normal.

As a result, the judgment as to whether or not the step-up circuit 100 is normal can be performed at the stage of initial check after the ignition switch IGS is turned on.

(2) In the present modification, when the transistor Q2 is judged to have suffered an open failure, the power relay 200 and the phase open relays 210 and 220 are not turned on, but are maintained off. Therefore, when the transistor Q2 suffers an open failure; i.e., when the step-up circuit 100 suffers a failure, the failsafe mechanism operates.

26. Twenty-Sixth Embodiment

The twenty-sixth embodiment will be described with reference to FIGS. 44 and 45.

The present embodiment is similar to the twenty-third embodiment; however, the present embodiment has a partially modified configuration and performs partially modified control.

Figure 44:
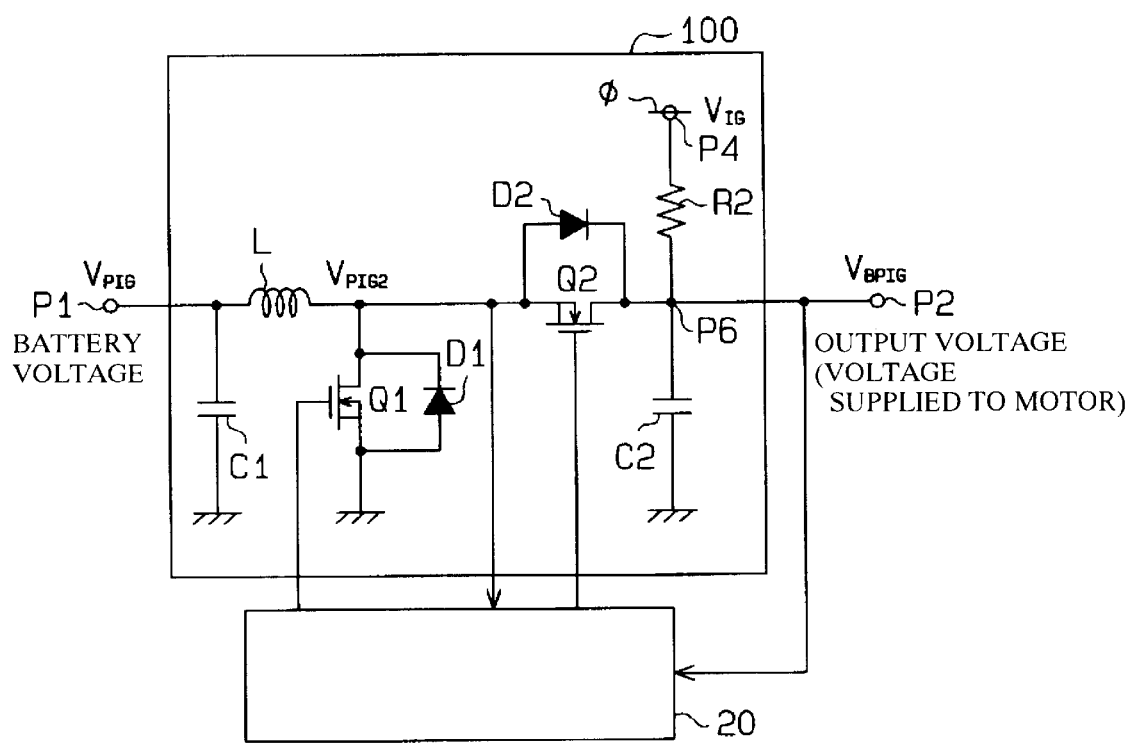
FIG. 44 is a circuit diagram of a step-up circuit used in twenty-sixth to twenty-ninth embodiments.

Specifically, as shown in FIG. 44, a resistor R2 for forming a pull-up circuit is connected to a connection point P6 between the drain of the transistor Q2 and the voltage application point P2. The resistor R2 has a high resistance so that only a small amount of current flows between the connection points P4 and P6.

The control routine of the present embodiment differs from the twenty-third embodiment in that, in place of the processing of S420, processing in S420B is performed; and in place of the processing pf S440, processing in S440A is performed.

In S420B, the CPU 21 outputs a continuous off signal to the transistor Q1, and outputs a continuous on signal to the transistor Q2.

In S440A, the CPU 21 judges whether the drain voltage $V_{PIG2}$ of the transistor Q1 detected in S430 is equal to or less than a seventh reference value $\lambda 7$ (>0).

In the case in which both the transistors Q1 and Q2 are normal, with the transistor Q1 being maintained off continuously and the transistor Q2 being maintained on continuously, the drain voltage $V_{PIG2}$ of the transistor Q1 is pulled up to the battery voltage by means of the pull-up circuit. In other words, the drain voltage $V_{PIG2}$ of the transistor Q1 increases to the battery voltage. Since the increased drain voltage $V_{PIG2}$ is greater than the seventh reference value $\lambda 7$, the transistor Q1 is judged not to suffer a short failure.

Meanwhile, when the transistor Q1 suffers a short failure, the drain voltage $V_{PIG2}$ of the transistor Q1 does not increase to the battery voltage, but decreases to the ground potential. Therefore, when the drain voltage $V_{PIG2}$ is equal to or less than the seventh reference value $\lambda 7$, the transistor Q1 is judged to suffer a short failure.

In the present embodiment, the controller 20 serves as the respective means described in relation to the second embodiment and further serves as status parameter detection means, second failure judgment means, and second element control means. Further, the seventh reference value $\lambda 7$ serves as a second failure judgment value. The resistor R2 serves as a second resistor.

The power relay 200 serves as first open-close means; and the phase open relays 210 and 220 serve as second open-close means.

The twenty-sixth embodiment achieves the following effects in addition to the effects of the second embodiment, the effects of the twenty-third embodiment mentioned in sections (3) and (4) of the description for the twenty-third embodiment, and the effects of the twenty-fourth embodiment mentioned in sections (2) and (3) of the description for the twenty-fourth embodiment.

(1) The twenty-sixth embodiment includes the power relay 200 (first open-close means), which is connected to the application point P1 (battery-voltage supply section) of the step-up circuit 100 and is turned on and off by means of the controller 20 (step-up circuit control means). Further, the twenty-sixth embodiment includes a pull-up circuit which includes the resistor R2 (second resistor) connected to the connection point P6 between the drain of the transistor Q2 (second switching element) and the voltage application point P2 and which receives the ignition voltage $V_{IG}$ when the ignition switch IGS is turned on.

When the ignition switch IGS is turned on, the controller 20 serves as second element control means so as to turn the transistor Q1 (first switching element) off and turn the transistor Q2 (second switching element) on before turning the power relay 200 on. Further, the controller 20 serves as drain voltage detection means for detecting the drain voltage $V_{PIG2}$ of the transistor Q1 (first switching element) and as second failure judgment means for comparing the drain voltage $V_{PIG2}$ with the seventh reference value $\lambda 7$ (second failure judgment value) so as to judge whether or not the step-up circuit 100 is normal.

As a result, the judgment as to whether or not the step-up circuit 100 is normal can be performed at the stage of initial check after the ignition switch IGS is turned on.

27-1. Twenty-Seventh Embodiment

The twenty-seventh embodiment will be described with reference to FIG. 46.

The present embodiment has the same configuration as that of the twenty-sixth embodiment, but performs partially modified control.

Figure 45:
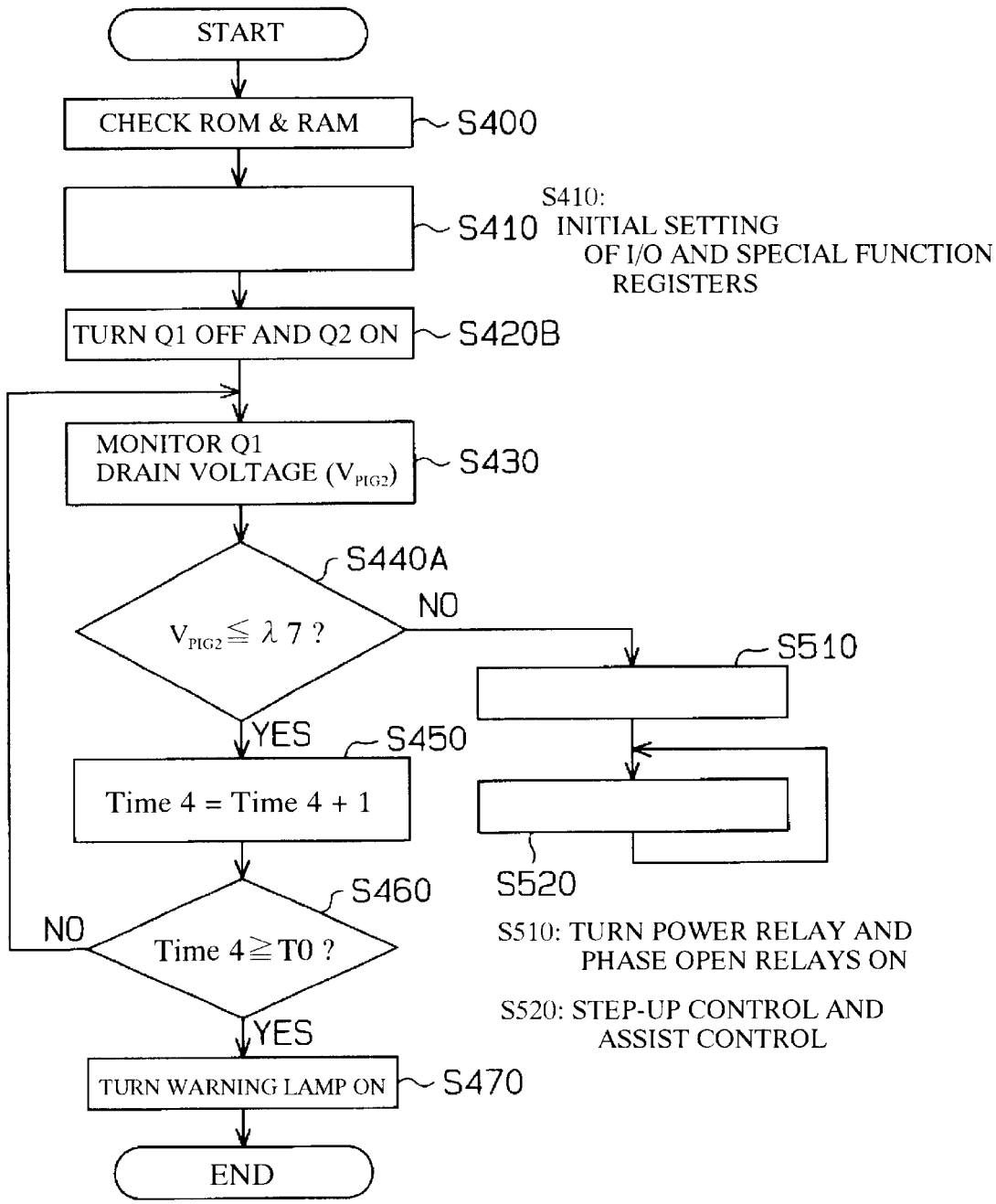
FIG. 45 is a flowchart showing control processing performed by the CPU in the twenty-sixth embodiment.

That is, among the steps of the flowchart of the twenty-sixth embodiment shown in FIG. 45, the processing in S420B has been replaced with processing in S420C; and the processing in S440A has been replaced with processing in S440C.

In S420C, the CPU 21 outputs continuous off signals to the transistors Q1 and Q2 at the same time.

In S440C, the CPU 21 judges whether the drain voltage $V_{PIG2}$ of the transistor Q1 detected in S430 is equal to or less than a ninth reference value λ9 (>0). The ninth reference value λ9, which is stored in the ROM 22 in advance, is a value which is previously determined through a test or any other suitable method and is used to judge whether the transistor Q2 suffers a short failure.

In the case in which both the transistors Q1 and Q2 are normal, with the transistors Q1 and Q2 being maintained off continuously, the drain voltage of the transistor Q2 (output voltage $V_{BPIG}$) is pulled up to the battery voltage by means of the pull-up circuit.

In other words, the drain voltage of the transistor Q2 (output voltage $V_{BPIG}$) increases to the battery voltage.

Further, at this time, since the transistor Q2 is maintained off, the drain voltage $V_{PIG2}$ of the transistor Q1 does not increase. Since the drain voltage $V_{PIG2}$ at that time is less than the ninth reference value λ9, the CPU 21 determines that the transistor Q2 does not suffer a short failure and proceeds to S510.

Meanwhile, when the transistor Q2 suffers a short failure, the drain voltage $V_{PIG2}$ of the transistor Q1 increases to the battery voltage. Therefore, when the drain voltage $V_{PIG2}$ is equal to or greater than the ninth reference value λ9, the CPU 21 determines that the transistor Q2 suffers a short failure.

In the present embodiment, the controller 20 serves as the respective means described in relation to the second embodiment and further serves as status parameter detection means, second failure judgment means, and second element control means. Further, the ninth reference value λ9 serves as a second failure judgment value. The resistor R2 serves as a second resistor.

The power relay 200 serves as first open-close means; and the phase open relays 210 and 220 serve as second open-close means.

The twenty-seventh embodiment achieves the following effects in addition to the effects of the second embodiment, and the effect of the twenty-third embodiment mentioned in section (3) of the description for the twenty-third embodiment.

(1) The twenty-seventh embodiment includes the power relay 200 (first open-close means), which is connected to the application point P1 (battery-voltage supply section) of the step-up circuit 100 and is turned on and off by means of the controller 20 (step-up circuit control means). Further, the twenty-seventh embodiment includes a pull-up circuit which includes the resistor R2 (second resistor) connected to the connection point P6 between the drain of the transistor Q2 (second switching element) and the voltage application point P2 and which receives the ignition voltage $V_{IG}$ when the ignition switch IGS is turned on.

When the ignition switch IGS is turned on, the controller 20 serves as second element control means so as to turn the transistor Q1 (first switching element) and the transistor Q2 (second switching element) off simultaneously before turning the power relay 200 on. Further, the controller 20 serves as drain voltage detection means for detecting the drain voltage $V_{PIG2}$ of the transistor Q1 (first switching element) and as second failure judgment means for comparing the drain voltage $V_{PIG2}$ with the ninth reference value λ9 (second failure judgment value) so as to judge whether or not the step-up circuit 100 is normal.

As a result, the judgment as to whether or not the step-up circuit 100 is normal can be performed at the stage of initial check after the ignition switch IGS is turned on.

(2) In the twenty-seventh embodiment, the warning lamp (reporting means) is driven only when the controller 20 judges in S460 that the fourth predetermined time T4 has elapsed. This operation can exclude the case in which a short failure of the transistor Q2 is resolved within the fourth predetermined time T4.

(3) The twenty-seventh embodiment includes the phase open relays 210 and 220 (second open-close means) for on-off control of supply of electrical power to the motor 6.

When the controller 20, serving as the second failure judgment means, judges that the step-up circuit 100 suffers a failure, the controller 20 serves as the step-up circuit control means and turns the power relay 200 and the phase open relay 210 and 220 on (see S490). Moreover, the controller 20 maintains the transistor Q1 (first switching element) off continuously, and maintains the transistor Q2 (second switching element) on continuously (see S480).

As a result, although assist control cannot be performed by use of boosted voltage obtained through step-up control for the step-up circuit 100, assist control cannot be performed at the battery voltage, and during regeneration periods, regenerative current can be absorbed by the battery B.

27-2. Modification of Twenty-Seventh Embodiment

Figure 47:
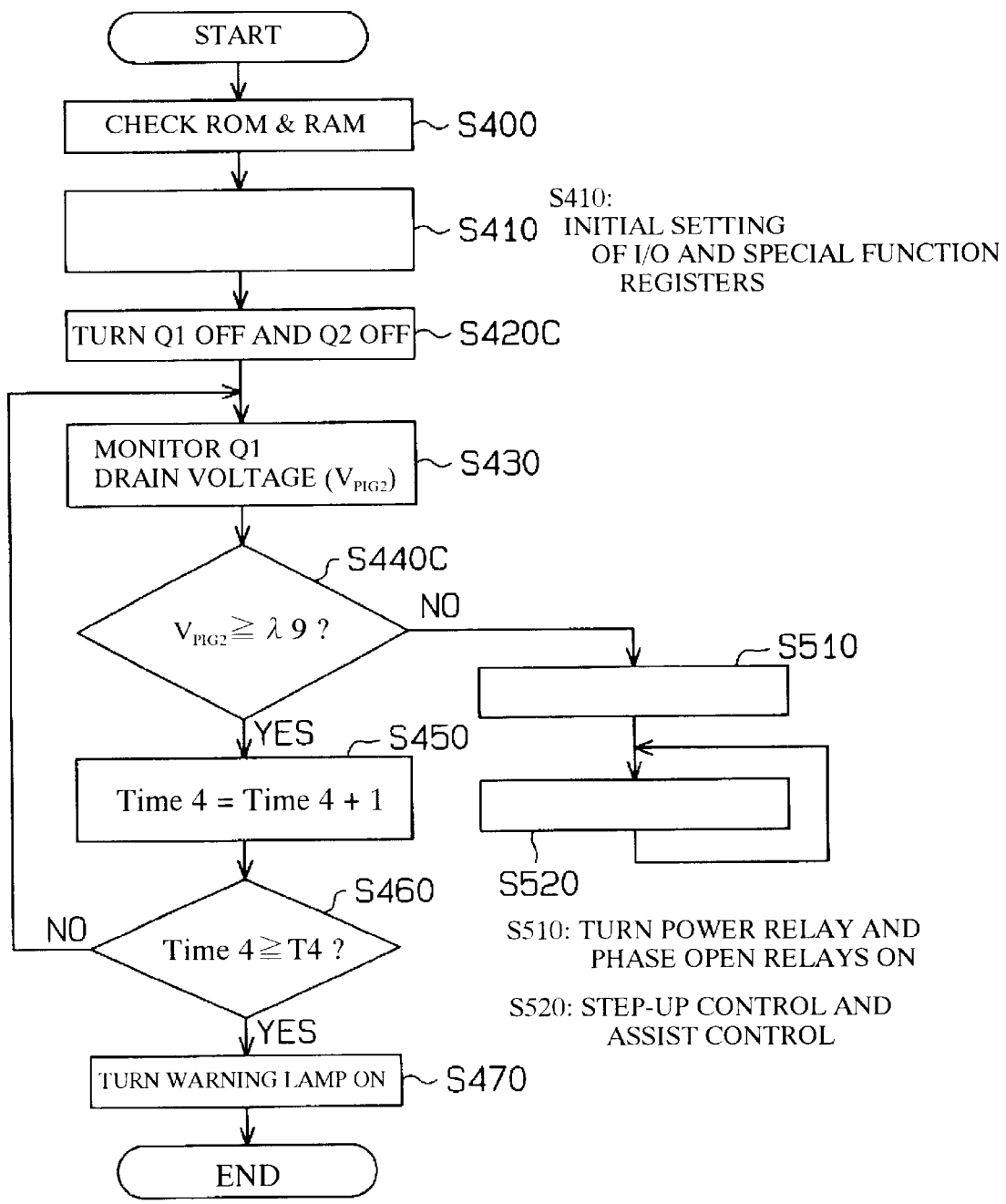
FIG. 47 is a flowchart showing control processing performed by the CPU in a modification of the twenty-seventh embodiment.

FIG. 47 shows a modification of the twenty-seventh embodiment. The present modification is identical to the twenty-seventh embodiment in terms of hardware configuration but differs therefrom in terms of control routine as follows.

Figure 46:
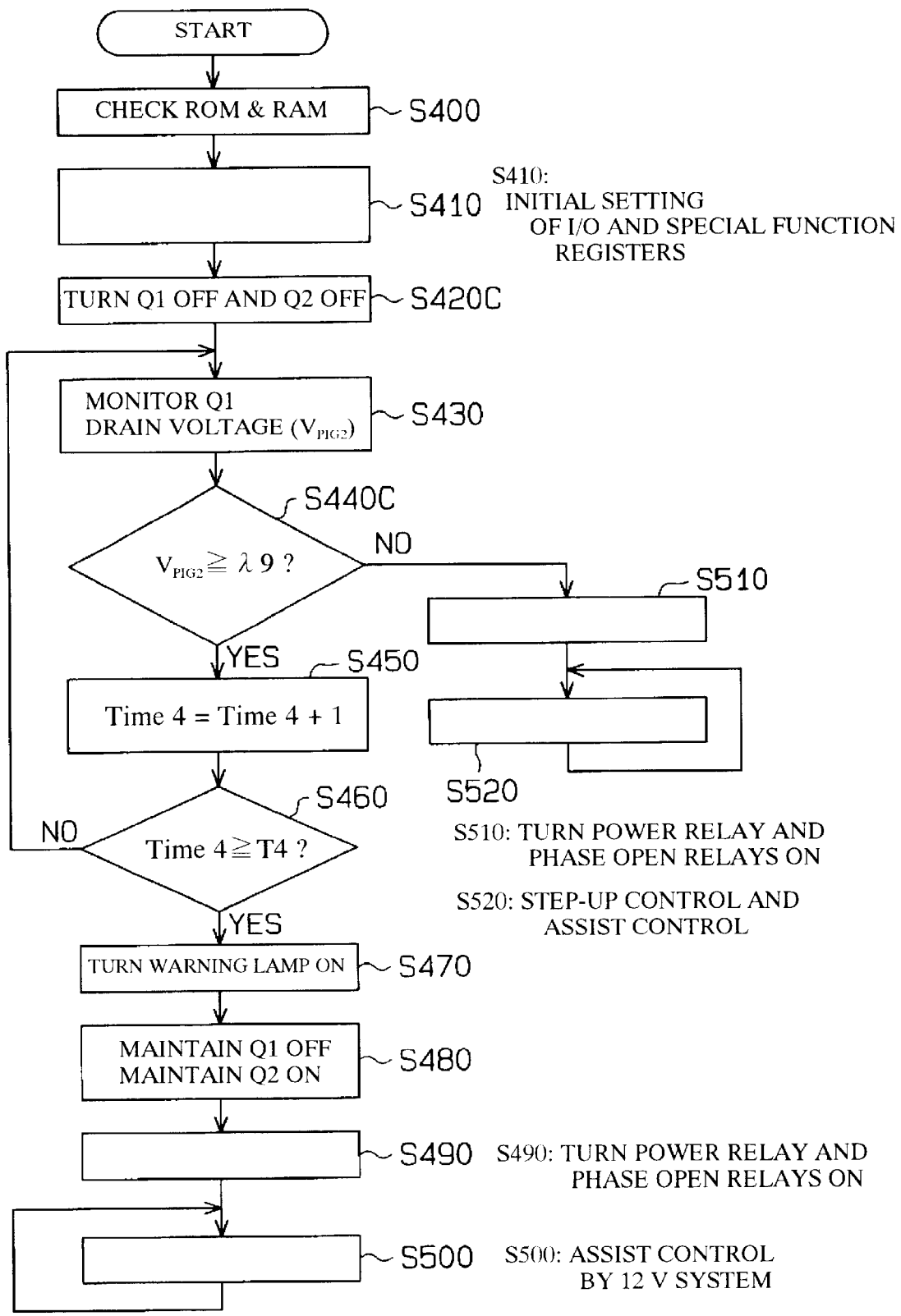
FIG. 46 is a flowchart showing control processing performed by the CPU in a modification of the twenty-seventh embodiment.

That is, among the steps of the flowchart shown in FIG. 46, S480 to S500 are omitted. After completion of the processing in S470, the CPU 21 ends the control routine.

As a result, when the transistor Q2 suffers a short failure, the power relay 200 and the phase open relays 210 and 220 are not turned on, but are maintained off.

This modification achieves the following effect in addition to the effects of the second embodiment, the effect of the twenty-third embodiment mentioned in section (3) of the description for the twenty-third embodiment, and the effects of the twenty-seventh embodiment mentioned in sections (1) and (2) of the description for the twenty-seventh embodiment.

(1) In the present modification, when the CPU 21 judges in S460 that the fourth predetermined time T4 has elapsed; i.e., when the transistor Q1 has suffered an open failure, the power relay 200 and the phase open relays 210 and 220 are not turned on, but are maintained off.

Therefore, when the transistor Q2 suffers a short failure; i.e., when the step-up circuit 100 suffers a failure, the failsafe mechanism operates.

28. Twenty-Eighth Embodiment

Figure 48:
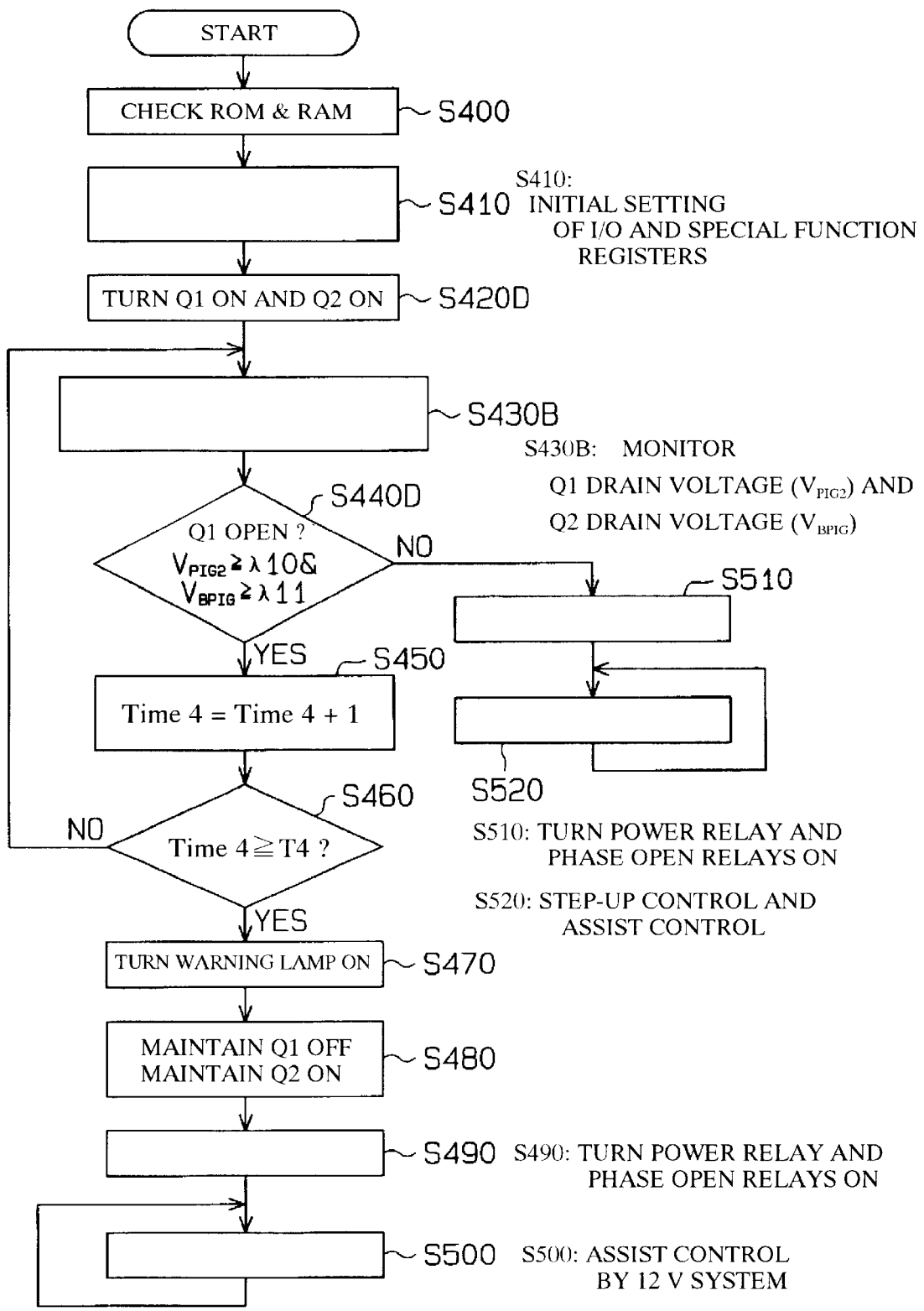
FIG. 48 is a flowchart showing control processing performed by the CPU in the twenty-eighth embodiment.

FIG. 48 is a flowchart showing control processing performed by the CPU 21 in the present embodiment.

The present embodiment is identical to the twenty-seventh embodiment in terms of hardware configuration, but differs therefrom in terms of control routine, as will be described below.

That is, in place of the processing operations in S420C, S430, and S440C, processing operations in S420D, S430B, and S440D are performed.

In S420D, the CPU 21 outputs a continuous on signal to the transistors Q1 and Q2 at the same time. In S430B, the CPU 21 detects the drain voltage $VP_{PIG2}$ of the transistor Q1 and the drain voltage of the transistor Q2 (output voltage $V_{BPIG}$).

In S440D, the CPU 21 judges whether the required conditions of the drain voltage $V_{PIG2}$ being equal to or greater than a tenth reference value λ10 (>0) and the drain voltage (output voltage) $V_{BPIG}$ being equal to or greater than an eleventh reference value λ11 (>0) are satisfied.

The eighth reference values λ10 and λ11, which are stored in the ROM 22 in advance, are values which are previously determined through a test or any other suitable method and are used to judge whether the transistor Q1 suffers an open failure.

In the case in which both the transistors Q1 and Q2 are normal, with the transistors Q1 and Q2 being maintained on continuously, both the drain voltages decrease to zero (ground potential) even though the drain of the transistor Q2 is pulled up to the battery voltage.

Therefore, when the drain voltage $V_{PIG2}$ is less than the tenth reference value λ10 and the drain voltage (output voltage) $V_{BPIG}$ is less than the eleventh reference value λ11, the CPU 21 determines that the transistor Q1 does not suffer an open failure and proceeds to S510.

Meanwhile, when the transistor Q1 suffers an open failure, the drain voltage $V_{PIG2}$ of the transistor Q1 and the drain voltage of the transistor Q2 (output voltage $V_{BPIG}$) do not decrease to zero. In other words, since the drain voltage $V_{PIG2}$ exceeds the tenth reference value λ10 and the drain voltage (output voltage) $V_{BPIG}$ exceeds the eleventh reference value λ11, the CPU 21 determines that the transistor Q1 suffers an open failure and proceeds to S450.

In the present embodiment, the controller 20 serves as the respective means described in relation to the second embodiment and further serves as status parameter detection means, second failure judgment means, and second element control means. Further, the tenth and eleventh reference values λ10 and λ11 serve as second failure judgment values. The resistor R2 serves as a second resistor.

The power relay 200 serves as first open-close means; and the phase open relays 210 and 220 serve as second open-close means.

The twenty-eighth embodiment achieves the following effects in addition to the effects of the second embodiment, the effects of the twenty-third embodiment mentioned in sections (3) to (5) of the description for the twenty-third embodiment, and the effect of the twenty-seventh embodiment mentioned in section (3) of the description for the twenty-seventh embodiment.

(1) The twenty-eighth embodiment includes the power relay 200 (first open-close means), which is connected to the application point P1 (battery-voltage supply section) of the step-up circuit 100 and is turned on and off by means of the controller 20 (step-up circuit control means). Further, the twenty-eighth embodiment includes a pull-up circuit which includes the resistor R2 (second resistor) connected to the connection point P6 between the drain of the transistor Q2 (second switching element) and the voltage application point P2 and which receives the ignition voltage $V_{IG}$ when the ignition switch IGS is turned on.

When the ignition switch IGS is turned on, the controller 20 serves as second element control means so as to turn the transistor Q1 (first switching element) and the transistor Q2 (second switching element) on simultaneously before turning the power relay 200 on. Further, the controller 20 serves as drain voltage detection means for detecting the drain voltage $V_{PIG2}$ of the transistor Q1 (first switching element) and the drain voltage of the transistor Q2 (output voltage $V_{BPIG}$). Furthermore, the controller 20 serves as second failure judgment means for comparing the drain voltage $VP_{PIG2}$ with the tenth reference value λ10 (second failure judgment value) and comparing the drain voltage (output voltage) $V_{BPIG}$ with the eleventh reference value λ11 (second failure judgment value) so as to judge whether or not the step-up circuit 100 is normal.

As a result, the judgment as to whether or not the step-up circuit 100 is normal can be performed at the stage of initial check after the ignition switch IGS is turned on.

28-2. Modification of Twenty-Eighth Embodiment

Figure 49:
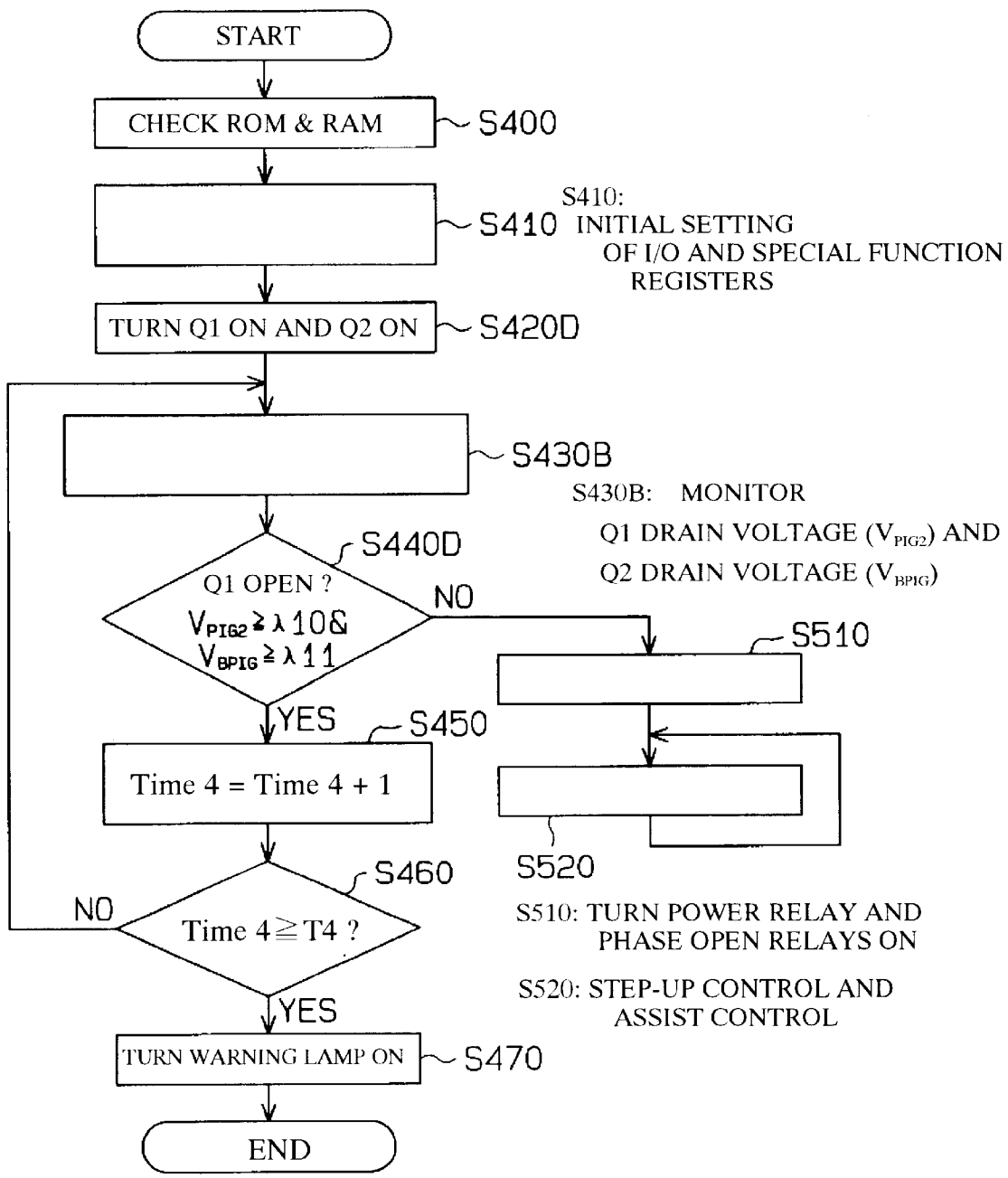
FIG. 49 is a flowchart showing control processing performed by the CPU in a modification of the twenty-eighth embodiment.

FIG. 49 shows a modification of the twenty-eighth embodiment. The present modification is identical to the twenty-eighth embodiment in terms of hardware configuration but differs therefrom in terms of control routine as follows.

That is, among the steps of the flowchart shown in FIG. 48, S480 to S500 are omitted. After completion of the processing in S470, the CPU 21 ends the control routine.

As a result, when the transistor Q2 suffers a short failure, the power relay 200 and the phase open relays 210 and 220 are not turned on, but are maintained off.

This modification achieves the following effects in addition to the effects of the second embodiment, the effects of the twenty-third embodiment mentioned in sections (3) and (4) of the description for the twenty-third embodiment, and the effect of the twenty-eighth embodiment mentioned in section (1) of the description for the twenty-eighth embodiment.

(1) In the present modification, when the CPU 21 judges in S460 that the fourth predetermined time T4 has elapsed; i.e., when the transistor Q1 has suffered an open failure, the power relay 200 and the phase open relays 210 and 220 are not turned on, but are maintained off.

Therefore, when the transistor Q2 suffers a short failure, the failsafe mechanism operates.

29. Twenty-Ninth Embodiment

The present embodiment has the same configuration as the modification of the twenty-eighth embodiment, but performs a partially modified control.

Figure 50:
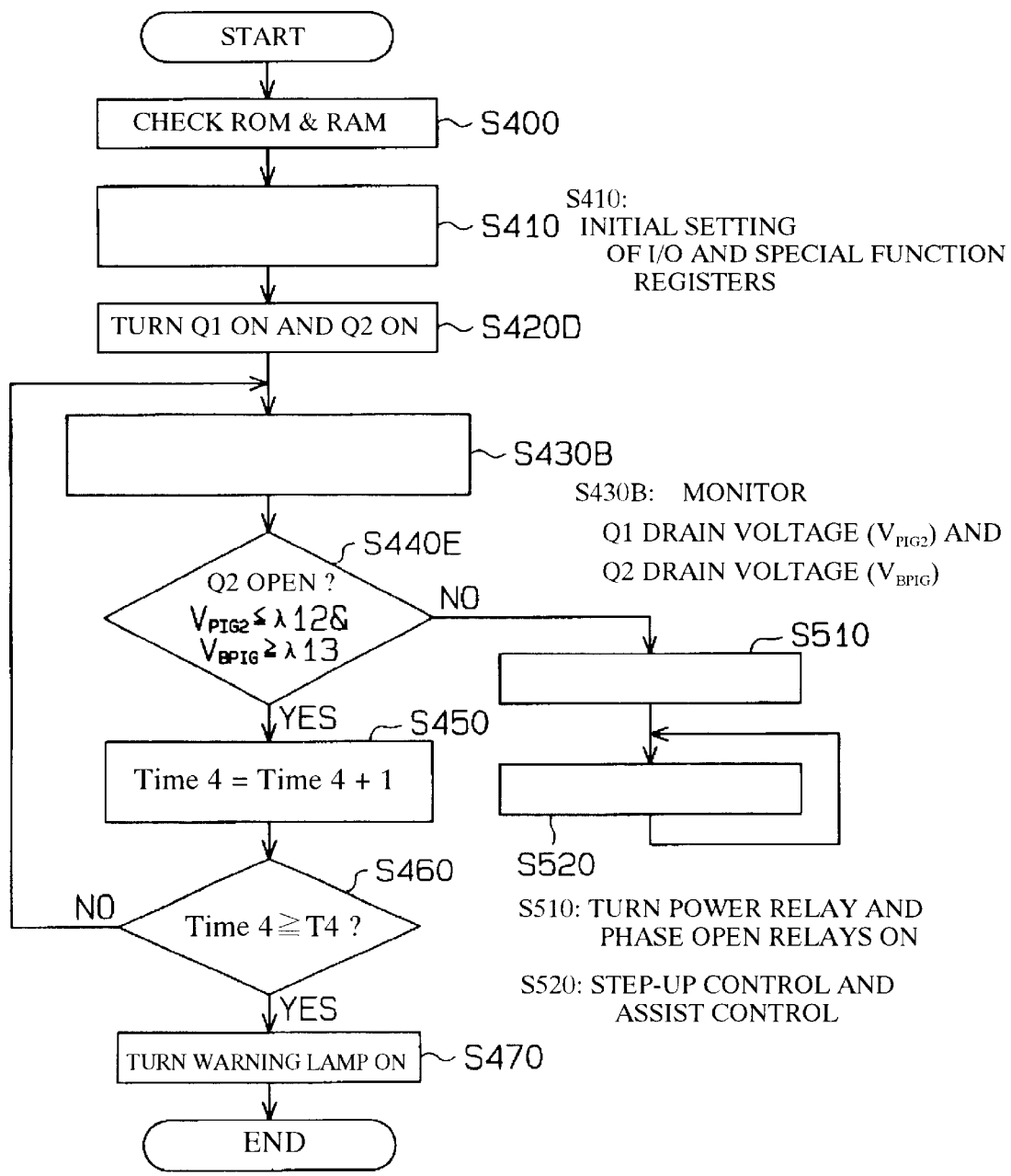
FIG. 50 is a flowchart showing control processing performed by the CPU in the twenty-ninth embodiment.
Figure 51:
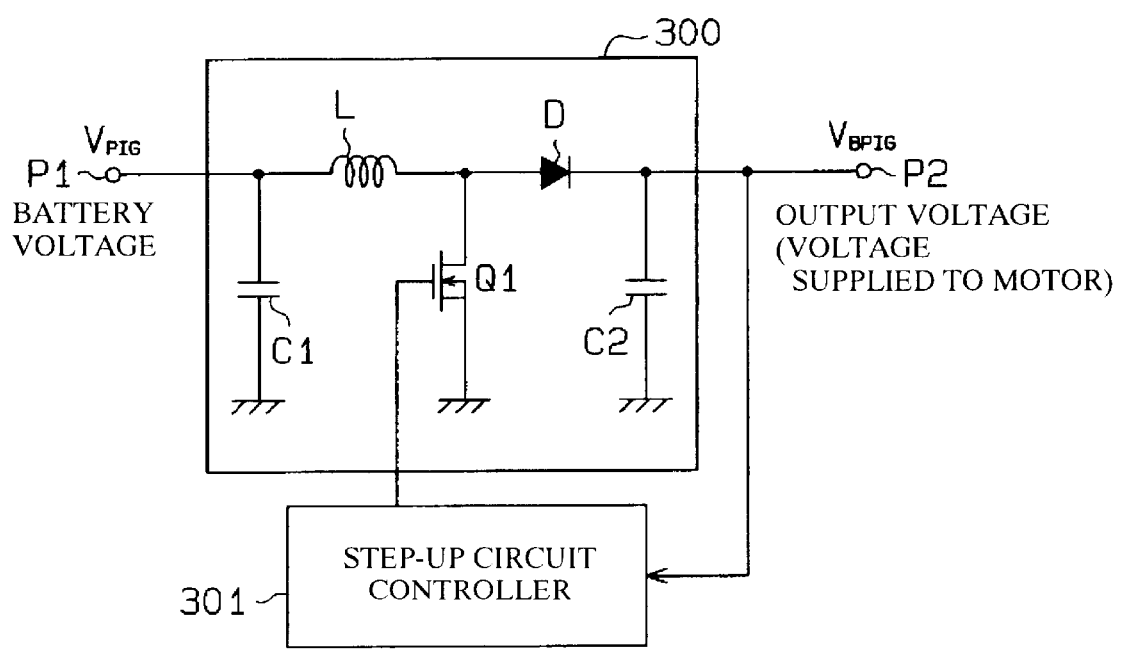
FIG. 51 is a circuit diagram of a conventional step-up circuit.
Figure 52:
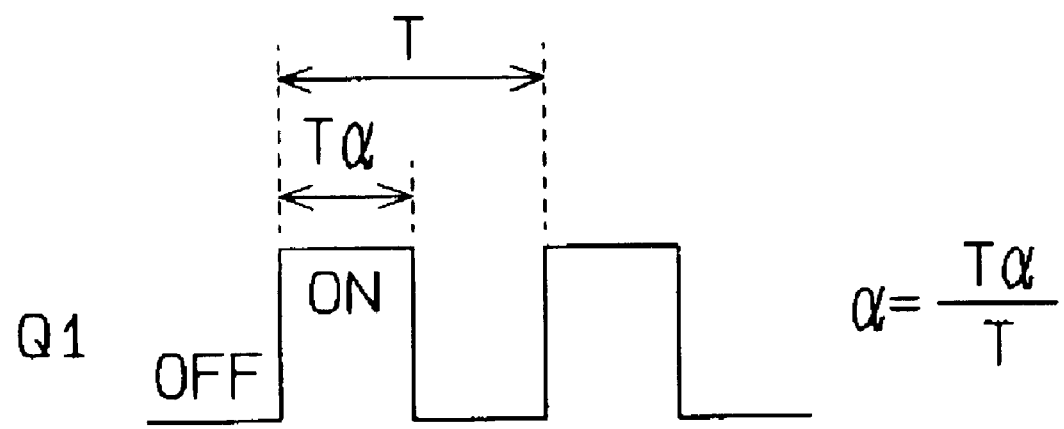
FIG. 52 is a diagram showing a waveform of a drive pulse applied to the transistor shown in FIG. 51.

Specifically, as shown in FIG. 50, the processing in S440D of the control routine of the twenty-eighth embodiment shown in FIG. 49 has been replaced with processing in S440E.

In S440E, the CPU 21 judges whether the required conditions of the drain voltage $V_{PIG2}$ being equal to or less than a twelfth reference value λ12 (>0) and the drain voltage (output voltage) $V_{BPIG}$ being equal to or greater than a thirteen reference value λ13 (>0) are satisfied.

The twelfth and thirteenth reference values λ12 and λ13, which are stored in the ROM 22 in advance, are values which are previously determined through a test or any other suitable method and are used to judge whether the transistor Q2 suffers an open failure.

In the case in which both the transistors Q1 and Q2 are normal, with the transistors Q1 and Q2 being maintained on continuously, both the drain voltages decrease to zero (ground potential) even though the drain of the transistor Q2 is pulled up to the battery voltage.

Therefore, the conditions of the drain voltage $VP_{PIG2}$ being equal to or less than the twelfth reference value λ12 (>0) and the drain voltage (output voltage) $V_{BPIG}$ being equal to or greater than the thirteen reference value λ13 (>0) are not satisfied. Therefore, the CPU 21 determines that the transistor Q2 is normal and proceeds to S510.

Meanwhile, when the transistor Q2 suffers an open failure, the drain voltage $V_{PIG2}$ of the transistor Q1 decreases to zero (ground potential), and the drain voltage (output voltage) $V_{BPIG}$ of the transistor Q2 does not decrease to zero (ground potential) and is maintained at the battery voltage.

Therefore, since the drain voltage $V_{PIG2}$ becomes equal to or less than the twelfth reference value λ12 and the drain voltage (output voltage) $V_{BPIG}$ exceeds the thirteenth reference value λ13, the CPU 21 determines that the transistor Q2 suffers an open failure, and proceeds to S450.

In the present embodiment, the controller 20 serves as the respective means described in relation to the second embodiment and further serves as status parameter detection means, second failure judgment means, and second element control means. Further, the twelfth and thirteenth reference values λ12 and λ13 serve as second failure judgment values. The resistor R2 serves as a second resistor.

The power relay 200 serves as first open-close means; and the phase open relays 210 and 220 serve as second open-close means.

The twenty-ninth embodiment achieves the following effect in addition to the effects of the second embodiment, the effect of the twenty-third embodiment mentioned in section (3) of the description for the twenty-third embodiment, and the effect of the twenty-eighth embodiment mentioned in section (1) of the description for the twenty-eighth embodiment.

(1) In the twenty-ninth embodiment, the warning lamp (reporting means) is driven only when the controller 20 judges in S460 that the fourth predetermined time T4 has elapsed. This operation can exclude the case in which an open failure of the transistor Q2 is resolved within the fourth predetermined time T4.

Note that the embodiments of the present invention may be modified as follows.

(a) In the embodiments, a motor control signal is produced on the basis of steering torque τ and vehicle speed V. However, the motor control signal may be produced on the basis of steering torque τ only.

(b) In the seventh to ninth embodiments, the CPU 21 determines the load state of the motor 6 on the basis of steering torque τ. However, these embodiments may be modified in such a manner that the CPU 21 determines the load state of the motor 6 on the basis of q-axis command current Iq* (motor control signal) set by means of the command current setting section 54.

In this case, the controller 20, serving as load state judgment means, determines the load state of the motor 6 on the basis of the q-axis command current Iq* (motor control signal).

(c) In the seventh to ninth embodiments, a DC brushless motor is used for the motor 6. However, a DC brush motor may be used for the motor 6. In this case, the CPU 21 is modified in such a manner that an assist command current computation section and a current control section, both being well known, are provided in stages subsequent to the addition section 53. The assist command current computation section computes an assist command current value (motor control signal) on the basis of a command torque τ*. The current control section performs PWM computation in such a manner that the detected motor current becomes equal to the assist command current value. In accordance with the result of the computation, the motor 6 is driven via a conventional drive circuit for driving a brush motor.

When such a brush motor is used, the load state of the motor 6 may be determined on the basis of the above-mentioned assist command current value.

In this case, the controller 20, serving as load state judgment means, determines the load state of the motor 6 on the basis of the assist command current value (motor control signal).

(d) In the first trough fourteenth embodiments, the CPU 21 performs PID control for the step-up circuit 100 by means of the PID control section 120. However, these embodiments may be modified in such a manner that, in place of the PID control section, a PI control section is provided in order to perform PI control for the step-up circuit 100.

The PI control section performs proportional (P) and integral (I) processing in order to decrease the difference between a target output voltage (20 V in the embodiments) and the output voltage $V_{BPIG}$ detected by the A/D conversion section 150, and calculates the controlled variable of the transistors Q1 and Q2. On the basis of the controlled variable computed by means of the PI control section, the PWM computation section 130 computes a duty ratio α corresponding to the controlled variable, which is then converted to duty-ratio drive signals to be applied to the transistors Q1 and Q2 of the step-up circuit 100.

(e) In the first trough fourteenth embodiments, the CPU 21 performs PID control for the step-up circuit 100 by means of the PID control section 120. However, these embodiments may be modified in such a manner that, in place of the PID control section, a PD control section is provided in order to perform PD control for the step-up circuit 100.

The PD control section performs proportional (P) and differential (D) processing in order to decrease the difference between a target output voltage (20 V in the embodiments) and the output voltage $V_{BPIG}$ detected by the A/D conversion section 150, and calculates the controlled variable of the transistors Q1 and Q2. On the basis of the controlled variable computed by means of the PI control section, the PWM computation section 130 computes a duty ratio α corresponding to the controlled variable, which is then converted to duty-ratio drive signals to be applied to the transistors Q1 and Q2 of the step-up circuit 100.

(f) In the sixth, ninth, and fifteenth embodiments, duty ratio restriction is employed for PWM control of switching elements in order to prevent the duty ratio from exceeding a predetermined limit. However, such duty ratio restriction may be employed in other embodiments. In such a case, the guard function section 140 is provided in order to restrict duty ratio, to thereby prevent breakage of the step-up circuit 100 in both power generation and regeneration periods.

(g) In the first through fourteenth embodiments, the CPU 21 performs PID control for the step-up circuit 100 by means of the PID control section 120. However, these embodiments may be modified in such a manner that, in place of the PID control section, a P control section is provided in order to perform P control for the step-up circuit 100.

The P control section performs proportional (P) processing in order to decrease the difference between a target output voltage (20 V in the embodiments) and the output voltage $V_{BPIG}$ detected by the A/D conversion section 150, and calculates the controlled variable of the transistors Q1 and Q2. On the basis of the controlled variable computed by means of the PI control section, the PWM computation section 130 computes a duty ratio α corresponding to the controlled variable, which is then converted to duty-ratio drive signals to be applied to the transistors Q1 and Q2 of the step-up circuit 100.

(h) In the sixteenth to twenty-ninth embodiments, when the step-up circuit 100 is in an anomalous state, the warning lamp is turned on in accordance with a warning signal. However, these embodiments may be modified in such a manner that a notification signal is output not only to the warning lamp but also to other reporting means such as a buzzer or display in order to produce a beep or to display a warning message.

(i) In the sixteenth to twenty-ninth embodiments, when the step-up circuit 100 is in an anomalous state, the warning lamp is turned on after elapse of a predetermined period of time (first predetermined time T1 to fourth predetermined time T4). However, the warning lamp may be turned on immediately after detection of an anomalous state.

(j) In the sixteenth to twenty-ninth embodiments, the step-up circuit 100 is judged to be in an anomalous state when a predetermined period of time (first predetermined time T1 to fourth predetermined time T4) has elapsed after judgment in the relevant step (S10, S10A, S110, S120, S130, S210, S260).

However, these embodiments may be modified in such a manner that the CPU 21 turns on the warning lamp or performs other necessary steps in order to cope with an anomalous state of the step-up circuit 100, as described in the respective embodiments, immediately after the anomalous judgment in the respective steps, without waiting for elapse of the predetermined period of time (first predetermined time T1 to fourth predetermined time T4).

Obviously, numerous modifications and variations of the present invention are possible in light of the above teachings. It is therefore to be understood that within the scope of the appended claims, the present invention may be practiced otherwise than as specifically described herein.

What is claimed is:

1. A motor-driven power steering apparatus for a vehicle, comprising:
    a steering mechanism for steering the vehicle in accordance with operation of a steering wheel;
    a motor mechanically coupled to the steering mechanism and generating assisting force to be imparted to the steering mechanism;
    control signal generation means for generating a motor control signal on the basis of at least steering torque applied to the steering wheel;
    motor drive means for driving the motor in accordance with the motor control signal;
    a step-up circuit provided in a current supply circuit extending from a battery to the motor drive means, the step-up circuit including a step-up coil whose one end is connected to the battery for reception of battery voltage, a first switching element connected between the other end of the step-up coil and the ground, a second switching element connected between the other end of the step-up coil and an output terminal, and a capacitor connected between the output terminal and the ground and smoothing output voltage which is produced by means of the step-up coil and appears at the output terminal; and
    step-up circuit control means for detecting the output voltage and controlling the first and second switching elements on the basis of difference between a target output voltage and the detected output voltage in such a manner that during power generation periods, at least the first switching element is turned on and off in order to increase the output voltage supplied to the motor through step-up operation, and during regeneration periods, at least the second switching element is turned on and off.

2. A motor-driven power steering apparatus according to claim 1, wherein the first and second switching elements are each constituted by a field effect transistor.

3. A motor-driven power steering apparatus according to claim 1, wherein the step-up circuit control means turns the first and second switching elements on and off alternately on the basis of the difference between the target output voltage and the detected output voltage in such a manner that during power generation periods, the output voltage supplied to the motor is increased through step-up operation, and during regeneration periods, regenerative current output from the motor flows to the battery.

4. A motor-driven power steering apparatus according to claim 2, wherein the step-up circuit control means turns the first and second switching elements on and off alternately on the basis of the difference between the target output voltage and the detected output voltage in such a manner that during power generation periods, the output voltage supplied to the motor is increased through step-up operation, and during regeneration periods, regenerative current output from the motor flows to the battery.

5. A motor-driven power steering apparatus according to claim 1, further comprising:
    steering state judgment means for determining, on the basis of the difference between the target output voltage and the detected output voltage, whether the motor is in a power generation state or in a regeneration state, wherein
        the step-up circuit control means turns at least one of the first and second switching elements on and off on the basis of the state of the motor determined by the steering state judgment means.

6. A motor-driven power steering apparatus according to claim 2, further comprising:
    steering state judgment means for determining, on the basis of the difference between the target output voltage and the detected output voltage, whether the motor is in a power generation state or in a regeneration state, wherein
        the step-up circuit control means turns at least one of the first and second switching elements on and off on the basis of the state of the motor determined by the steering state judgment means.

7. A motor-driven power steering apparatus according to claim 5, wherein the step-up circuit control means turns only the first switching element on and off when the steering state judgment means determines that the motor is in a power generation state, and turns the first and second switching elements on and off alternately when the steering state judgment means determines that the motor is in a regeneration state.

8. A motor-driven power steering apparatus according to claim 5, wherein the step-up circuit control means turns only the first switching element on and off when the steering state judgment means determines that the motor is in a power generation state, and turns only the second switching element on and off when the steering state judgment means determines that the motor is in a regeneration state.

9. A motor-driven power steering apparatus according to claim 5, wherein the step-up circuit control means turns the first and second switching elements on and off alternately when the steering state judgment means determines that the motor is in a power generation state, and turns only the second switching element on and off when the steering state judgment means determines that the motor is in a regeneration state.

10. A motor-driven power steering apparatus according to claim 6, further comprising a bootstrap circuit including a bootstrap capacitor and connected to a line extending between the battery and the drain of the first switching element, the bootstrap circuit being connected to a gate of the second switching element as a drive power source for the second switching element in order to apply electrical potential of the bootstrap capacitor to the gate of the second switching element, wherein when the steering state judgment means determines that the motor is in a power generation state, the step-up circuit control means turns the first and second switching elements on and off alternately; and when the steering state judgment means determines that the motor is in a regeneration state, the step-up circuit control means turns the second switching element on and off and turns the first switching element on and off at a predetermined duty ratio in alternating periods of constant intervals.

11. A motor-driven power steering apparatus according to claim 6, further comprising a bootstrap circuit including a bootstrap capacitor and connected to a line extending between the battery and the drain of the first switching element, the bootstrap circuit being connected to a gate of the second switching element as a drive power source for the second switching element in order to apply electrical potential of the bootstrap capacitor to the gate of the second switching element, wherein when the steering state judgment means determines that the motor is in a power generation state, the step-up circuit control means turns the first and second switching elements on and off alternately; and when the steering state judgment means determines that the motor is in a regeneration state, the step-up circuit control means performs PWM control in order to turn only the second switching element on and off at a duty ratio and restricts the duty ratio so as not to exceed a predetermined duty ratio.

12. A motor-driven power steering apparatus according to claim 6, further comprising load state judgment means for determining a load status of the motor, wherein
the step-up circuit control means turns at least one of the first and second switching elements on and off on the basis of the steering state as detected by the steering state judgment means and the load state of the motor as determined by the load state judgment means.

13. A motor-driven power steering apparatus according to claim 12, wherein when the steering state judgment means determines that the motor is in a power generation state, the step-up circuit control means turns only the first switching element on and off and maintains the second switching element off continuously if the load state judgment means determines that the motor is in a light load state, and turns the first and second switching elements on and off alternately if the load state judgment means determines that the motor is in a heavy load state; and when the steering state judgment means determines that the motor is in a regeneration state, the step-up circuit control means turns only the second switching element on and off.

14. A motor-driven power steering apparatus according to claim 12, further comprising a bootstrap circuit including a bootstrap capacitor and connected to a line extending between the battery and the drain of the first switching element, the bootstrap circuit being connected a gate of the second switching element as a drive power source for the second switching element in order to apply electrical potential of the bootstrap capacitor to the gate of the second switching element, wherein when the steering state judgment means determines that the motor is in a power generation state, the step-up circuit control means turns only the first switching element on and off and maintains the second switching element off continuously if the load state judgment means determines that the motor is in a light load state, and turns the first and second switching elements on and off alternately if the load state judgment means determines that the motor is in a heavy load state; and when the steering state judgment means determines that the motor is in a regeneration state, the step-up circuit control means turns the second switching element on and off and turns the first switching element on and off at a fixed duty ratio in alternating periods of constant intervals.

15. A motor-driven power steering apparatus according to claim 12, further comprising a bootstrap circuit including a bootstrap capacitor and connected to a line extending between the battery and the drain of the first switching element, the bootstrap circuit being connected a gate of the second switching element as a drive power source for the second switching element in order to apply electrical potential of the bootstrap capacitor to the gate of the second switching element, wherein when the steering state judgment means determines that the motor is in a power generation state, the step-up circuit control means turns only the first switching element on and off and maintains the second switching element off continuously if the load state judgment means determines that the motor is in a light load state, and turns the first and second switching elements on and off alternately if the load state judgment means determines that the motor is in a heavy load state; and when the steering state judgment means determines that the motor is in a regeneration state, the step-up circuit control means performs PWM control in order to turn only the second switching element on and off at a duty ratio and restricts the duty ratio so as not to exceed a predetermined duty ratio.

16. A motor-driven power steering apparatus according to claim 6, further comprising a bootstrap circuit including a bootstrap capacitor and connected to the drain of the second switching element, the bootstrap circuit being connected a gate of the second switching element as a drive power source for the second switching element in order to apply electrical potential of the bootstrap capacitor to the gate of the second switching element, wherein when the steering state judgment means determines that the motor is in a power generation state, the step-up circuit control means turns the first and second switching elements on and off alternately; and when the steering state judgment means determines that the motor is in a regeneration state, the step-up circuit control means turns only the second switching element on and off.

17. A motor-driven power steering apparatus according to claim 1, wherein the step-up circuit control means includes:
target output voltage setting means for setting a target output voltage of the step-up circuit;
control computation means for performing at least computation for proportional control on the basis of the difference between the target output voltage and the detected output voltage and for outputting a computed value; and
PWM computation means for performing PWM computation on the basis of the computed value so as to determine a duty ratio, wherein
the first and second switching elements are turned on and off in accordance with the determined duty ratio; and
the target output voltage setting means changes the target output voltage in accordance with an operation state parameter indicative of an operation state of the vehicle or the motor.

18. A motor-driven power steering apparatus according to claim 1, wherein the step-up circuit control means includes:
target output voltage setting means for setting a target output voltage of the step-up circuit;
control computation means for performing at least computation for proportional control on the basis of the difference between the target output voltage and the detected output voltage and for outputting a computed value; and
PWM computation means for performing PWM computation on the basis of the computed value so as to determine a duty ratio, wherein the first and second switching elements are turned on and off in accordance with the determined duty ratio; and the step-up circuit control means restricts the duty ratio so as not to exceed a predetermined duty ratio.

19. A motor-driven power steering apparatus according to claim 1, further comprising:

status parameter detection means for detecting a parameter indicative of states of the step-up circuit; and judgment means for comparing the parameter detected by the status parameter detection means with a judgment value and judging whether or not the step-up circuit is normal, wherein the step-up circuit control means stops step-up control for the step-up circuit when the judgment means judges that the step-up circuit is not normal.

20. A motor-driven power steering apparatus according to claim 19, further comprising:

first open-close means connected to a battery-voltage supply section of the step-up circuit and turned on and off by the step-up circuit control means; and second open-close means for controlling supply of electrical power to the motor, wherein when the judgment means judges that the step-up circuit suffers a failure, the step-up circuit control means turns the first and second open-close means off.

21. A motor-driven power steering apparatus according to claim 19, wherein when the judgment means judges that the step-up circuit suffers a failure, the step-up circuit control means maintains the first switching element off continuously and maintains the second switching element on continuously.

22. A motor-driven power steering apparatus according to claim 2, further comprising:

first open-close means connected to a battery-voltage supply section of the step-up circuit and turned on and off by the step-up circuit control means; and a circuit which includes a first resistor connected to a connection point between the drain of the first switching element and the battery-voltage supply section and which receives an ignition voltage when an ignition switch is turned on, wherein the step-up circuit control means includes:

first element control means, operated when the ignition switch is turned on, for turning at least the first switching element on or off before the first open-close means is turned on;

drain voltage detection means for detecting drain voltage of the first or second switching element; and first failure judgment means for comparing the drain voltage with a first failure judgment value and determining whether the step-up circuit suffers a failure.

23. A motor-driven power steering apparatus according to claim 22, further comprising:

second open-close means for controlling supply of electrical power to the motor, wherein when the first failure judgment means judges that the step-up circuit suffers a failure, the step-up circuit control means turns the first and second open-close means off.

24. A motor-driven power steering apparatus according to claim 22, further comprising:

second open-close means for controlling supply of electrical power to the motor, wherein when the first failure judgment means judges that the step-up circuit suffers a failure, the step-up circuit control means turns the first and second open-close means on, maintains the first switching element off continuously, and maintains the second switching element on continuously.

25. A motor-driven power steering apparatus according to claim 2, further comprising:

first open-close means connected to a battery-voltage supply section of the step-up circuit and turned on and off by the step-up circuit control means;

a circuit which includes a second resistor connected to the drain of the second switching element and which receives an ignition voltage when an ignition switch is turned on, wherein the step-up circuit control means includes:

second element control means, operated when the ignition switch is turned on, for turning the first and second switching elements on simultaneously, turning the first and second switching elements off simultaneously, or turning the first switching element off and the second switching element on, before the first open-close means is turned on;

drain voltage detection means for detecting drain voltage of at least the first switching element; and second failure judgment means for comparing the drain voltage with a second failure judgment value and determining whether the step-up circuit suffers a failure.

26. A motor-driven power steering apparatus according to claim 25, further comprising:

second open-close means for controlling supply of electrical power to the motor, wherein when the second failure judgment means judges that the step-up circuit suffers a failure, the step-up circuit control means turns the first and second open-close means off.

27. A motor-driven power steering apparatus according to claim 25, further comprising:

second open-close means for controlling supply of electrical power to the motor, wherein when the second failure judgment means judges that the step-up circuit suffers a failure, the step-up circuit control means turns the first and second open-close means on, maintains the first switching element off continuously, and maintains the second switching element on continuously.

* * * * *